(12) United States Patent
Zheng et al.

(10) Patent No.: US 8,744,360 B2
(45) Date of Patent: Jun. 3, 2014

(54) ADAPTIVE BEAM FORMING WITH MULTI-USER DETECTION AND INTERFERENCE REDUCTION IN SATELLITE COMMUNICATION SYSTEMS AND METHODS

(75) Inventors: Dunmin Zheng, Vienna, VA (US); Peter D. Karabinis, Cary, NC (US)

(73) Assignee: ATC Technologies, Inc., Reston, VA (US)

( * ) Notice: Subject to any disclaimer, the term of this patent is extended or adjusted under 35 U.S.C. 154(b) by 305 days.

(21) Appl. No.: 12/689,590

(22) Filed: Jan. 19, 2010

(65) Prior Publication Data

US 2010/0184370 A1    Jul. 22, 2010

Related U.S. Application Data

(62) Division of application No. 11/324,711, filed on Jan. 3, 2006, now Pat. No. 7,813,700.

(60) Provisional application No. 60/641,560, filed on Jan. 5, 2005.

(51) Int. Cl.
*H04B 1/00* (2006.01)
*H04B 15/00* (2006.01)

(52) U.S. Cl.
USPC ......... 455/63.1; 455/501; 455/12.1; 455/137; 455/296

(58) Field of Classification Search
USPC .............. 455/296–312, 561, 562.1, 132–141, 455/63.1–65, 12.1–13.4, 25, 500–504
See application file for complete search history.

(56) References Cited

U.S. PATENT DOCUMENTS

| | | |
|---|---|---|
| 3,829,777 A | 8/1974 | Muratani et al. |
| 3,835,392 A | 9/1974 | Mahner et al. |

(Continued)

FOREIGN PATENT DOCUMENTS

| | | |
|---|---|---|
| CN | 1190508 A | 8/1998 |
| CN | 1253430 A | 5/2000 |

(Continued)

OTHER PUBLICATIONS

Biglieri et al. "Multiuser Detection Schemes Applied to Regional GEO Satellite Mobile Systems" *Signal Processing Advances in Wireless Communications, First IEEE Signal Processing Workshop* 293-296 (1997).

(Continued)

*Primary Examiner* — Edward Urban
*Assistant Examiner* — Rui Hu
(74) *Attorney, Agent, or Firm* — Myers Bigel Sibley & Sajovec, P.A.

(57) ABSTRACT

Satellite communications methods include receiving communications signals including co-channel interference at a space-based component from a plurality of wireless terminals in a satellite footprint over a satellite frequency band and reducing interference in the communication signals by (a) performing co-channel interference reduction on the communications signals to generate a plurality of interference reduced signals and (b) performing multiple access interference cancellation on the interference reduced signals. An interference reducing detector for a satellite communications system includes an interference reducer configured to perform co-channel interference reduction on communications signals to generate a plurality of interference reduced signals, and a detector configured to perform multiple access interference cancellation on the interference reduced signals. Satellite communications systems and satellite gateways including interference reducing detectors are also disclosed.

25 Claims, 24 Drawing Sheets

(56) References Cited

U.S. PATENT DOCUMENTS

| | | | |
|---|---|---|---|
| 4,052,670 A | 10/1977 | Watanabe et al. | |
| 4,099,121 A | 7/1978 | Fang | |
| 4,599,734 A | 7/1986 | Yamamoto | |
| 4,660,045 A | 4/1987 | Clark | |
| 4,688,259 A | 8/1987 | Edridge | |
| 4,901,307 A | 2/1990 | Gilhousen et al. | |
| 4,931,802 A | 6/1990 | Assal et al. | |
| 5,073,900 A | 12/1991 | Mallinckrodt | |
| 5,086,301 A | 2/1992 | English et al. | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,579,304 A | 11/1996 | Sugimoto et al. | |
| 5,584,046 A | 12/1996 | Martinez et al. | |
| 5,592,471 A | 1/1997 | Briskman | |
| 5,602,833 A | 2/1997 | Zehavi | |
| 5,612,703 A | 3/1997 | Mallinckrodt | |
| 5,619,525 A | 4/1997 | Wiedeman et al. | |
| 5,631,898 A | 5/1997 | Dent | |
| 5,722,049 A | 2/1998 | Hassan et al. | |
| 5,724,666 A | 3/1998 | Dent | |
| 5,736,959 A | 4/1998 | Patterson et al. | |
| 5,757,767 A | 5/1998 | Zehavi | |
| 5,761,605 A | 6/1998 | Tawil et al. | |
| 5,765,098 A | 6/1998 | Bella | |
| 5,790,070 A | 8/1998 | Natarajan et al. | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,905,946 A | 5/1999 | Lilleberg et al. | |
| 5,907,541 A | 5/1999 | Fairholm et al. | |
| 5,926,470 A | 7/1999 | Tiedemann | |
| 5,926,758 A | 7/1999 | Grybos et al. | |
| 5,937,332 A | 8/1999 | Karabinis | |
| 5,940,753 A | 8/1999 | Mallinckrodt | |
| 5,943,324 A | 8/1999 | Ramésh et al. | |
| 5,991,273 A * | 11/1999 | Abu-Dayya | 370/252 |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,032,041 A | 2/2000 | Wainfan et al. | |
| 6,052,560 A | 4/2000 | Karabinis | |
| 6,052,586 A | 4/2000 | Karabinis | |
| 6,061,387 A | 5/2000 | Yi | |
| 6,067,047 A | 5/2000 | Cook et al. | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,108,565 A * | 8/2000 | Scherzer | 455/562.1 |
| 6,128,486 A | 10/2000 | Keskitalo et al. | |
| 6,134,437 A | 10/2000 | Karabinis et al. | |
| 6,138,012 A | 10/2000 | Krutz et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,249,518 B1 * | 6/2001 | Cui | 370/347 |
| 6,253,080 B1 | 6/2001 | Wiedeman et al. | |
| 6,256,496 B1 | 7/2001 | Dintelmann et al. | |
| 6,256,497 B1 | 7/2001 | Chambers | |
| 6,259,730 B1 | 7/2001 | Solondz | |
| 6,324,405 B1 | 11/2001 | Young et al. | |
| 6,339,611 B1 | 1/2002 | Antonio et al. | |
| 6,339,707 B1 | 1/2002 | Wainfan et al. | |
| 6,418,147 B1 | 7/2002 | Wiedeman | |
| 6,430,418 B1 | 8/2002 | Nivens et al. | |
| 6,442,385 B1 | 8/2002 | Marko | |
| 6,449,461 B1 | 9/2002 | Otten | |
| 6,466,566 B1 | 10/2002 | De Gaudenzi et al. | |
| 6,501,788 B1 | 12/2002 | Wang et al. | |
| 6,515,980 B1 | 2/2003 | Bottomley | |
| 6,522,865 B1 | 2/2003 | Otten | |
| 6,574,270 B1 | 6/2003 | Madkour et al. | |
| 6,580,705 B1 | 6/2003 | Riazi et al. | |
| 6,615,030 B1 | 9/2003 | Saito et al. | |
| 6,628,919 B1 | 9/2003 | Curello et al. | |
| 6,628,921 B1 | 9/2003 | Vaddiparty et al. | |
| 6,636,734 B1 | 10/2003 | Berger et al. | |
| 6,642,883 B2 | 11/2003 | Jacomb-Hood et al. | |
| 6,684,057 B2 | 1/2004 | Karabinis | |
| 6,731,614 B1 | 5/2004 | Ohlson et al. | |
| 6,735,437 B2 | 5/2004 | Mayfield et al. | |
| 6,771,986 B1 | 8/2004 | Oh | |
| 6,775,251 B1 | 8/2004 | Wiedeman | |
| 6,785,543 B2 | 8/2004 | Karabinis | |
| 6,801,565 B1 * | 10/2004 | Bottomley et al. | 375/148 |
| 6,823,170 B1 | 11/2004 | Dent | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,934,511 B1 | 8/2005 | Lovinggood et al. | |
| 6,937,857 B2 | 8/2005 | Karabinis | |
| 6,950,625 B2 | 9/2005 | Regulinski et al. | |
| 6,956,814 B1 | 10/2005 | Campanella | |
| 6,975,666 B2 | 12/2005 | Affes et al. | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,012,977 B2 | 3/2006 | Madkour et al. | |
| 7,020,462 B1 | 3/2006 | Wesel | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,079,505 B2 | 7/2006 | Okunishi et al. | |
| 7,079,607 B2 | 7/2006 | Brunel | |
| 7,092,452 B2 | 8/2006 | Taylor et al. | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,167,716 B2 | 1/2007 | Kim | |
| 7,174,127 B2 | 2/2007 | Otten et al. | |
| 7,181,161 B2 | 2/2007 | Karabinis | |
| 7,200,368 B1 | 4/2007 | Hottinen et al. | |
| 7,200,379 B2 | 4/2007 | Edwards et al. | |
| 7,203,490 B2 | 4/2007 | Karabinis | |
| 7,209,515 B2 | 4/2007 | Kilfoyle et al. | |
| 7,218,931 B2 | 5/2007 | Karabinis | |
| 7,221,722 B2 * | 5/2007 | Thomas et al. | 375/346 |
| 7,295,807 B2 | 11/2007 | Karabinis | |
| 7,305,211 B2 | 12/2007 | Dent | |
| 7,340,213 B2 | 3/2008 | Karabinis et al. | |
| 7,415,001 B2 | 8/2008 | Naguleswaran et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,460,828 B2 | 12/2008 | Dodel | |
| 7,460,832 B2 | 12/2008 | Lee et al. | |

(56) References Cited

U.S. PATENT DOCUMENTS

| | | |
|---|---|---|
| 7,555,261 B2 | 6/2009 | O'Neill |
| 7,558,568 B2 | 7/2009 | Karabinis |
| 7,574,206 B2 | 8/2009 | Karabinis |
| 7,577,400 B2 | 8/2009 | Karabinis et al. |
| 7,580,672 B2 | 8/2009 | Rowitch |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,375 B1 | 11/2009 | Clark et al. |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,748 B2 | 4/2010 | Dutta |
| 7,787,572 B2 * | 8/2010 | Scharf et al. .................. 375/346 |
| 8,098,683 B2 | 1/2012 | Kent et al. |
| 2001/0003443 A1 | 6/2001 | Velazquez et al. |
| 2001/0007552 A1 | 7/2001 | Schiff et al. |
| 2002/0067761 A1 * | 6/2002 | Kong et al. .................... 375/148 |
| 2002/0090942 A1 | 7/2002 | Karabinis et al. |
| 2002/0122408 A1 | 9/2002 | Mullins |
| 2002/0128045 A1 | 9/2002 | Chang et al. |
| 2002/0137457 A1 | 9/2002 | Nivens et al. |
| 2002/0146979 A1 | 10/2002 | Regulinski et al. |
| 2002/0151273 A1 | 10/2002 | Marko |
| 2002/0168972 A1 | 11/2002 | Justiss et al. |
| 2002/0177465 A1 | 11/2002 | Robinett |
| 2003/0003815 A1 | 1/2003 | Yamada |
| 2003/0008614 A1 | 1/2003 | Hanson et al. |
| 2003/0022625 A1 | 1/2003 | Otten et al. |
| 2003/0022636 A1 | 1/2003 | Ylitalo et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0078001 A1 | 4/2003 | Thompson et al. |
| 2003/0095585 A1 | 5/2003 | Huh et al. |
| 2003/0138065 A1 | 7/2003 | Mills et al. |
| 2003/0149986 A1 | 8/2003 | Mayfield et al. |
| 2003/0153308 A1 | 8/2003 | Karabinis |
| 2003/0174788 A1 | 9/2003 | Li et al. |
| 2003/0190889 A1 | 10/2003 | Nguyen et al. |
| 2003/0191887 A1 | 10/2003 | Oates et al. |
| 2003/0198305 A1 | 10/2003 | Taylor et al. |
| 2003/0236081 A1 | 12/2003 | Braun |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0147220 A1 | 7/2004 | Vaddiparty et al. |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0209585 A1 * | 10/2004 | Wang et al. ................ 455/226.1 |
| 2004/0228314 A1 | 11/2004 | Ros et al. |
| 2004/0240525 A1 | 12/2004 | Karabinis et al. |
| 2004/0246927 A1 | 12/2004 | Wei et al. |
| 2004/0246928 A1 | 12/2004 | Choi et al. |
| 2004/0259497 A1 | 12/2004 | Dent |
| 2004/0266338 A1 | 12/2004 | Rowitch |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0068230 A1 | 3/2005 | Munoz et al. |
| 2005/0079816 A1 | 4/2005 | Singh et al. |
| 2005/0090256 A1 | 4/2005 | Dutta |
| 2005/0107057 A1 * | 5/2005 | Sun ............................. 455/272 |
| 2005/0118948 A1 | 6/2005 | Karabinis et al. |
| 2005/0128985 A1 | 6/2005 | Liberti, Jr. et al. |
| 2005/0136836 A1 | 6/2005 | Karabinis et al. |
| 2005/0157672 A1 | 7/2005 | Dodel |
| 2005/0163198 A1 | 7/2005 | Wei et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0180364 A1 | 8/2005 | Nagarajan et al. |
| 2005/0181786 A1 | 8/2005 | Karabinis et al. |
| 2005/0201449 A1 | 9/2005 | Churan |
| 2005/0207477 A1 | 9/2005 | Monsen |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0259724 A1 | 11/2005 | Bergstrom et al. |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0272370 A1 | 12/2005 | Schiff |
| 2005/0281321 A1 | 12/2005 | Bergstrom |
| 2005/0282493 A1 | 12/2005 | Chuprun et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040659 A1 | 2/2006 | Karabinis |
| 2006/0053436 A1 | 3/2006 | Allwein et al. |
| 2006/0072449 A1 * | 4/2006 | Kent et al. ..................... 370/203 |
| 2006/0072513 A1 | 4/2006 | Kent et al. |
| 2006/0073797 A1 | 4/2006 | Kent et al. |
| 2006/0083202 A1 | 4/2006 | Kent et al. |
| 2006/0094420 A1 | 5/2006 | Karabinis |
| 2006/0111041 A1 | 5/2006 | Karabinis |
| 2006/0111056 A1 | 5/2006 | Dutta |
| 2006/0115026 A1 | 6/2006 | MacLeod |
| 2006/0135058 A1 | 6/2006 | Karabinis |
| 2006/0135070 A1 | 6/2006 | Karabinis |
| 2006/0165120 A1 | 7/2006 | Karabinis |
| 2006/0172710 A1 | 8/2006 | Cahana et al. |
| 2006/0189275 A1 | 8/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0058701 A1 | 3/2007 | Wang et al. |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |

(56) References Cited

U.S. PATENT DOCUMENTS

| | | | |
|---|---|---|---|
| 2007/0192805 A1 | 8/2007 | Dutta et al. | |
| 2007/0202816 A1 | 8/2007 | Zheng | |
| 2007/0232298 A1 | 10/2007 | Karabinis | |
| 2007/0243866 A1 | 10/2007 | Karabinis | |
| 2007/0281612 A1 | 12/2007 | Benjamin et al. | |
| 2007/0293214 A1 | 12/2007 | Ansari et al. | |
| 2008/0008264 A1 | 1/2008 | Zheng | |
| 2008/0032671 A1 | 2/2008 | Karabinis | |
| 2008/0032690 A1 | 2/2008 | Karabinis | |
| 2008/0113666 A1 | 5/2008 | Monte et al. | |
| 2008/0119190 A1 | 5/2008 | Karabinis | |
| 2008/0160993 A1 | 7/2008 | Levin et al. | |
| 2008/0182572 A1 | 7/2008 | Tseytlin et al. | |
| 2008/0214207 A1 | 9/2008 | Karabinis | |
| 2008/0214222 A1 | 9/2008 | Atarashi et al. | |
| 2008/0219209 A1* | 9/2008 | Liu et al. | 370/328 |
| 2008/0268836 A1 | 10/2008 | Karabinis et al. | |
| 2009/0003414 A1* | 1/2009 | Yellin | 375/147 |
| 2009/0011704 A1 | 1/2009 | Karabinis | |
| 2009/0029696 A1 | 1/2009 | Karabinis | |
| 2009/0042509 A1 | 2/2009 | Karabinis et al. | |
| 2009/0042516 A1 | 2/2009 | Karabinis | |
| 2009/0075645 A1 | 3/2009 | Karabinis | |
| 2009/0088151 A1 | 4/2009 | Karabinis | |
| 2009/0104903 A1 | 4/2009 | Karabinis | |
| 2009/0131046 A1 | 5/2009 | Karabinis et al. | |
| 2009/0137203 A1 | 5/2009 | Karabinis et al. | |
| 2009/0156154 A1 | 6/2009 | Karabinis et al. | |
| 2009/0170427 A1 | 7/2009 | Karabinis | |
| 2009/0170428 A1 | 7/2009 | Karabinis | |
| 2009/0170429 A1 | 7/2009 | Karabinis | |
| 2009/0186622 A1 | 7/2009 | Karabinis | |
| 2009/0231187 A1 | 9/2009 | Churan | |
| 2009/0264120 A1 | 10/2009 | Karabinis | |
| 2009/0296628 A1 | 12/2009 | Karabinis | |
| 2009/0305697 A1 | 12/2009 | Karabinis et al. | |
| 2009/0312013 A1 | 12/2009 | Karabinis | |
| 2009/0316759 A1* | 12/2009 | Zeira | 375/141 |
| 2010/0009677 A1 | 1/2010 | Karabinis et al. | |
| 2010/0015971 A1 | 1/2010 | Good et al. | |
| 2010/0029269 A1 | 2/2010 | Karabinis | |
| 2010/0035604 A1 | 2/2010 | Dutta et al. | |
| 2010/0035605 A1 | 2/2010 | Karabinis | |
| 2010/0035606 A1 | 2/2010 | Karabinis | |
| 2010/0039967 A1 | 2/2010 | Karabinis et al. | |
| 2010/0041394 A1 | 2/2010 | Karabinis | |
| 2010/0041395 A1 | 2/2010 | Karabinis | |
| 2010/0041396 A1 | 2/2010 | Karabinis | |
| 2010/0048201 A1 | 2/2010 | Karabinis | |
| 2010/0054160 A1 | 3/2010 | Karabinis | |
| 2010/0120419 A1 | 5/2010 | Zheng et al. | |

FOREIGN PATENT DOCUMENTS

| | | |
|---|---|---|
| CN | 133988 A | 3/2003 |
| EP | 0 506 255 A2 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |

OTHER PUBLICATIONS

D'Amours et al. "Reduced Complexity Multistage Detection Algorithms for Satellite Communications Systems Employing DS-CDMA" *Canadian Conference on Electrical and Computer Engineering: IEEE* 3:1671-1674 (2003).

Gaudenzi et al. "Advances in Satellite CDMA Transmission for Mobile and Personal Communications" *Proceedings of the IEEE* 84(1) 18-39 (1996).

Munoz et al. "Cancellation of external and multiple access interference in CDMA systems using antenna arrays" *Signal Processing* 61(2):113-129 (1997).

Zheng et al. "Adaptive Beam-Forming with Interference Suppression and Multi-User Detection in Satellite Systems with Terrestrial Reuse of Frequencies" *Vehicular Technology Conference* [online] 2637-2641 (2005) <http://www.eurasip.org/content/Eusipco/IST05/papers/153.pdf>.

International Search Report and Written Opinion for PCT/US2005/046810; Date of mailing Aug. 10, 2006.

Supplemental International Search Report and Written Opinion for PCT/US2005/046810; Date of mailing Aug. 31, 2006.

Translation of Chinese Office Action for corresponding application No. 200580045897.9 mailed Jul. 4, 2011.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

English translation of Chinese Office Action for corresponding Chinese Application No. 201010536553.0, Date of Action Mar. 28, 2013.

European Search Report Corresponding to European Patent Application No. 10 176 170.8; Dated: Oct. 16, 2013; 5 Pages.

European Search Report Corresponding to European Patent Application No. 10 176 167.4; Dated: Oct. 16, 2013; 5 Pages.

European Search Report Corresponding to European Patent Application No. 10 176 171.6; Dated: Oct. 24, 2013; 5 Pages.

* cited by examiner

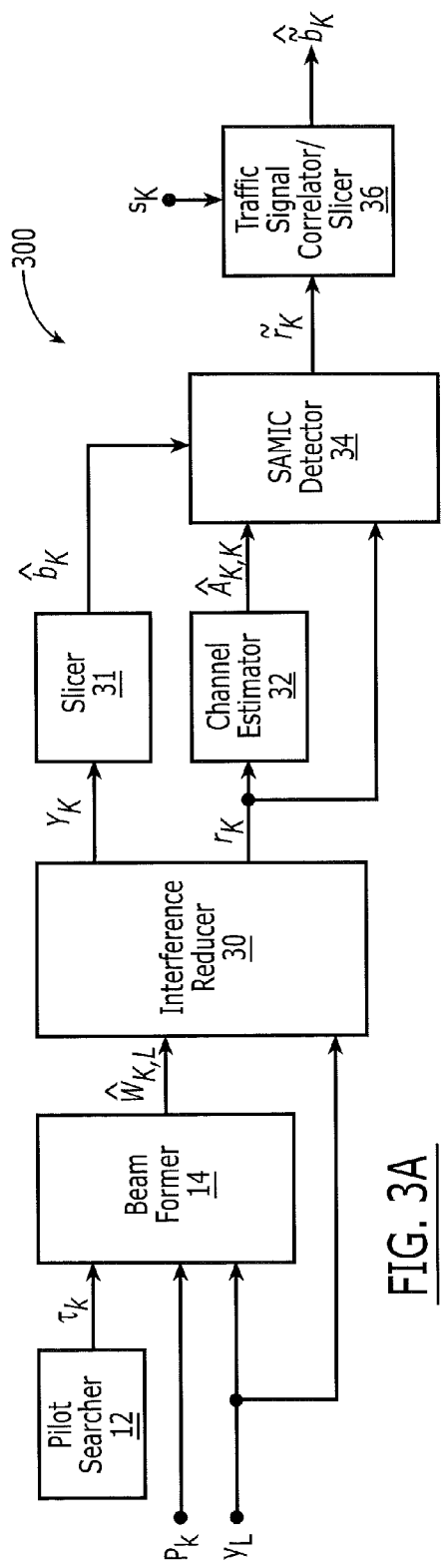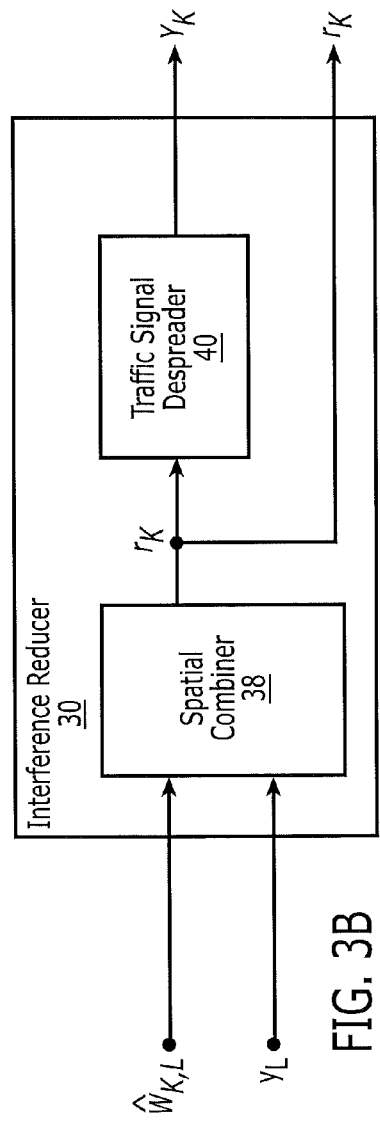
FIG. 3A
FIG. 3B

ADAPTIVE BEAM FORMING WITH MULTI-USER DETECTION AND INTERFERENCE REDUCTION IN SATELLITE COMMUNICATION SYSTEMS AND METHODS

CLAIM OF PRIORITY

This application is a divisional application of U.S. application Ser. No. 11/324,711 filed Jan. 3, 2006, now U.S. Pat. No 7,813,700 which claims the benefit of provisional Application No. 60/641,560, filed Jan. 5, 2005, entitled "Adaptive Beam-Forming with Interference Suppression and Multi-User Detection in Satellite Systems with Terrestrial Reuse of Frequencies," the disclosure of which is hereby incorporated by reference herein as if set forth in its entirety.

FIELD OF THE INVENTION

The present invention relates to interference reduction in communications systems. In particular, the present invention relates to interference reduction in satellite communications systems and methods with terrestrial frequency use/re-use of satellite band frequencies.

BACKGROUND

Satellite communications systems and methods are widely used for radiotelephone communications. Satellite communications systems and methods generally employ at least one space-based component, such as one or more satellites, that is/are configured to wirelessly communicate with a plurality of wireless terminals.

A satellite communications system or method may utilize a single antenna beam or antenna pattern covering an entire area served by the system. Alternatively, or in combination with the above, in cellular satellite communications systems and methods, multiple beams (cells or antenna patterns) are provided, each of which can serve a substantially distinct geographic area in an overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with wireless terminals over a bidirectional communications pathway, with wireless terminal communications signals being communicated from the satellite to a wireless terminal over a downlink or forward link (also referred to as a forward service link), and from the wireless terminal to the satellite over an uplink or return link (also referred to as a return service link).

The overall design and operation of cellular satellite communications systems and methods are well known to those having skill in the art, and need not be described further herein. Moreover, as used herein, the term "wireless terminal" includes devices which include a radio frequency transceiver, such as cellular and/or satellite radiotelephones; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "wireless terminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion over one or more terrestrial and/or extraterrestrial locations. A wireless terminal also may be referred to herein as a "radiotelephone," "radioterminal," "mobile terminal," "mobile user terminal," "user device" or simply as a "terminal". Furthermore, as used herein, the term "space-based" component includes one or more satellites and/or one or more other objects/platforms (e.g., airplanes, balloons, unmanned vehicles, space crafts, missiles, etc.) that have a trajectory above the earth at any altitude. In addition, as used herein the term "canceling" or "cancellation" as relating to interference canceling or cancellation means complete elimination of at least one component/element of the interference and/or at least a reduction of at least one component/element of the interference.

A terrestrial network that is configured to provide wireless communications by using and/or reusing at least some of the frequencies authorized for use by a satellite system can enhance the availability, efficiency and/or economic viability of the satellite system. Specifically, it is known that it may be difficult for satellite communications systems to reliably serve densely populated areas, because satellite signals may be blocked by high-rise structures and/or may not effectively penetrate into buildings. As a result, the satellite spectrum may be underutilized or unutilized in such areas. The terrestrial use and/or reuse of at least some of the satellite system frequencies can reduce or eliminate this potential problem.

Moreover, a capacity measure of an overall system, including a terrestrially-based and a space-based network, may be increased by the introduction of terrestrial frequency use/reuse of at least some of the frequencies authorized for use by the space-based network, since terrestrial frequency use/reuse may be much denser than that of a satellite-only (space-based network only) system. In fact, capacity may be enhanced where it may be most needed, i.e., in densely populated urban/industrial/commercial areas. As a result, the overall system may become more economically viable, as it may be able to serve a larger subscriber base more effectively and reliably.

One example of terrestrial reuse of satellite frequencies is described in U.S. Pat. No. 5,937,332 to Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing the effective downlink/uplink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Radioterminals for a satellite communications system or method having a terrestrial communications capability by terrestrially using and/or reusing at least some of the frequencies of a satellite frequency band that is also used, at least in part, by the radioterminals for space-based communications, wherein the radioterminals are configured to communicate terrestrially and via a space-based component by using substantially the same air interface for both terrestrial and space-based communications, may be more cost effective and/or aesthetically appealing than other alternatives. Conventional dual band/dual mode wireless terminal alternatives, such as the well known Thuraya, Iridium and/or Globalstar dual mode satellite/terrestrial wireless terminals, duplicate some components (as a result of the different frequency bands and/or air interface protocols between satellite and terrestrial communications), which may lead to increased cost, size and/or weight of the wireless terminal. See U.S. Pat. No. 6,052,560 to Karabinis, entitled Satellite System Utilizing a Plurality of Air Interface Standards and Method Employing Same.

Satellite communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite communications systems and methods may employ interference cancellation techniques to allow increased terrestrial use/reuse of satellite frequencies. For example, as described in U.S. Pat. No. 6,684,057 to Karabinis, cited above, a satellite communications frequency can be reused terrestrially by an ancillary terrestrial network even within the same satellite cell that is using the satellite communications frequency for space-based communications, using interference cancellation techniques. Moreover, the ancillary terrestrial network can use a modified range of satellite band forward link frequencies for transmission, to reduce interference with at least some out-of-band receivers. A modified range of satellite band forward link frequencies that is used by the ancillary terrestrial network can include only a subset of the satellite band forward link frequencies to provide a guard band between frequencies used by the ancillary terrestrial network and frequencies used by out-of-band receivers, can include power levels that monotonically decrease as a function of increasing/decreasing frequency and/or can include two or more contiguous slots per frame that are left unoccupied and/or are transmitted at reduced maximum power. Time division duplex operation of the ancillary terrestrial network may also be provided over at least a portion of the satellite band return link frequencies. Full or partial reverse mode operation of the ancillary terrestrial network also may be provided, where at least some of the forward link and return link frequencies are interchanged with the conventional satellite forward link and return link frequencies. See the Abstract of U.S. Pat. No. 6,684,057.

SUMMARY

Satellite communications methods according to embodiments of the invention include receiving at a space-based component a plurality of multiple access signals from a plurality of terminals in a footprint of the space-based component over a frequency band of the space-based component, the plurality of multiple access signals including interference that is dependent on signals transmitted by the terminals and interference that is independent of signals transmitted by the terminals; and reducing interference of the plurality of multiple access signals by first reducing the interference that is independent of the signals transmitted by the terminals followed by canceling the interference that is dependent on the signals transmitted by the terminals.

Some methods further include receiving/transmitting wireless communications signals at an ancillary terrestrial component from/to a plurality of terminals in the satellite footprint over the satellite frequency band. The space-based component may also receive the wireless communications signals as interference to the multiple access signals.

Receiving multiple access signals at a space-based component from a plurality of terminals in a satellite footprint over a satellite frequency band may include receiving multiple access signals using an antenna including a plurality of antenna feed elements that may be configured to provide antenna patterns that differ in spatial orientations therebetween and wherein at least some of the antenna feed elements may also be configured to receive electro-magnetic energy over at least two different polarization orientations.

Reducing interference that is independent of the signals transmitted by the terminals may include performing co-channel interference reduction on a multiple access signal, including a pilot signal and an information signal, transmitted by a terminal and received by a plurality of antenna feed elements. Such interference reduction may include processing of the pilot signal and determining a set of weights for the plurality of antenna feed elements based on the processing of the pilot signal.

Methods according to some embodiments of the invention may further include generating at least one pilot signal error based on the processing of the pilot signal.

The set of weights for the plurality of antenna feed elements may be selected to reduce a mean squared measure of the pilot signal error thereby providing an interference reduced received pilot signal, and some methods according to the invention further include applying the set of weights to signals received by the plurality of antenna feed elements to obtain an interference reduced received information signal.

Performing multiple access interference cancellation (or at least interference reduction) on the interference reduced received information signal may include determining a set of channel estimates based on interference reduced received information signals and/or interference reduced received pilot signals, generating a set of received information estimates (e.g., bit estimates) from the interference reduced received information signals, and performing multiple access interference cancellation (or at least interference reduction) on the interference reduced received information signals using the set of channel estimates and the information estimates.

Performing multiple access interference cancellation on the interference reduced received information signals using the channel estimates and the information estimates may include generating second interference reduced received information signals and/or second interference reduced received pilot signals. Moreover, methods according to embodiments of the invention may further include determining a set of second channel estimates based on the second interference reduced received information signals and/or second interference reduced received pilot signals, generating a set of second received information estimates from the second interference reduced received information signals, and performing multiple access interference cancellation on the second interference reduced received information signals using the second channel estimates and the second information estimates.

Some methods further include receiving at the space-based component using at least two antenna patterns that differ in at least a polarization orientation.

Generating a set of received information estimates from the interference reduced received information signals may include correlating the interference reduced received information signals with a set of known signal spreading codes used by the plurality of terminals.

Performing multiple access interference cancellation on the interference reduced received information signals may include generating a plurality of interference reduced information estimates, and some methods may further include performing multiple access interference cancellation using the plurality of interference reduced information estimates.

Methods according to further embodiments of the invention may further include re-transmitting the multiple access signals to a satellite gateway, and reducing interference in the multiple access signals may be performed at the satellite gateway which may be terrestrially-based. Further, performing multiple access interference cancellation on the interference reduced received information signals may be performed at the satellite gateway.

Some methods may further include repeatedly reducing the interference that may be dependent on the transmissions of the plurality of terminals communicating with the space-based component over the geographic area until a predetermined criterion may be met. The predetermined criterion may include a bit error rate.

A cellular satellite system according to further embodiments of the invention includes a space-based component and a plurality of terminals that are configured to transmit a respective plurality of multiple access signals, comprising pilot signals and information signals, over a satellite frequency band in a satellite footprint; the space-based component configured to receive the plurality of multiple access signals over the satellite frequency band, the space-based component also receiving interference along with the plurality of multiple access signals in the satellite frequency band, and an interference reducer that is responsive to the space-based component, and that is configured to sequentially perform co-channel interference reduction and multiple access interference cancellation on the plurality of multiple access signals.

Some systems may further include an ancillary terrestrial network including a plurality of terminals wherein the ancillary terrestrial network and/or the terminals are/is configured to transmit wireless communications signals over the satellite frequency band in the satellite footprint.

The space-based component may include an antenna having a plurality of antenna feed elements, and the space-based component may be configured to receive the plurality of multiple access signals using the antenna.

The interference reducer may be further configured to perform co-channel interference reduction on the multiple access signals received from the plurality of terminals, by processing pilot signals transmitted by the plurality of terminals and received by the space-based component and determining a set of weights for the antenna feed elements based on the processing of the pilot signals.

The interference reducer may be further configured to generate at least one pilot signal error based on the processing of the pilot signals.

The interference reducer may be further configured to determine a set of weights for the antenna feed elements to reduce a mean squared measure of the at least one pilot signal error thereby providing an interference reduced pilot signal.

The interference reducer may be further configured to apply the set of weights to signals received by the plurality of antenna feed elements to obtain an interference reduced received information signal.

The interference reducer may be further configured to determine a set of channel estimates based on interference reduced received information signals and/or interference reduced pilot signals, generate a set of received information estimates (e.g., bit estimates) from the interference reduced received information signals, and perform multiple access interference cancellation on the interference reduced received information signals using the set of channel estimates and the information estimates to thereby generate second interference reduced received information signals.

The interference reducer may be further configured to determine a set of second channel estimates based on the second interference reduced received information signals, to generate a set of second received bit estimates from the second interference reduced received information signals, and to perform multiple access interference cancellation on the second interference reduced received information signals using the second channel estimates and the second bit estimates.

The space-based component may be configured to receive multiple access signals using at least two antenna patterns that differ in spatial orientation therebetween and/or wherein at least two antenna patterns differ in a polarization orientation.

The interference reducer may be further configured to generate a plurality of interference reduced bit estimates from the interference reduced received information signals, and to perform multiple access interference cancellation using the plurality of interference reduced bit estimates.

The space-based component may be further configured to re-transmit the multiple access signals to a satellite gateway, and the interference reducer may be located at the satellite gateway, which may be terrestrially-based.

A satellite wireless terminal system according to further embodiments of the invention includes a space-based component configured to receive multiple access wireless communications signals from a plurality of wireless terminals in a satellite footprint over a satellite frequency band, an interference reducer responsive to the space-based component and configured to perform co-channel interference reduction on the multiple access wireless communications signals to thereby generate a plurality of interference reduced received information signals, and a detector responsive to the interference reducer and configured to perform multiple access interference cancellation on the interference reduced received information signals.

Systems according to some embodiments of the invention may further include an ancillary terrestrial network including a plurality of transmitters configured to transmit a plurality of wireless communications signals over the satellite frequency band in the satellite footprint, the space-based component also receiving the wireless communications signals as interference along with the multiple access wireless communications signals.

The space-based component may include an antenna having a plurality of antenna feed elements, and the space-based component may be configured to receive the plurality of multiple access wireless communications signals using the antenna.

The interference reducer may be further configured to perform co-channel interference reduction on a multiple access wireless communications signal by processing at least one pilot signal transmitted by a wireless terminal and determining a set of weights for a respective set of antenna feed elements based on the processing of the at least one pilot signal.

The interference reducer may be further configured to generate at least one pilot signal error based on the processing.

The interference reducer may be further configured to select a set of signal weights for the antenna feed elements to reduce a mean squared measure of the at least one pilot signal error.

The interference reducer may be further configured to apply the set of signal weights to signals received by a plurality of antenna feed elements to obtain an interference reduced received information signal.

The detector may be further configured to determine a set of channel estimates based on interference reduced received information signals, generate a set of received bit estimates from the interference reduced received information signals, and perform multiple access interference cancellation on the interference reduced received information signals using the set of channel estimates and the bit estimates to thereby generate second interference reduced received information signals.

The detector may be further configured to determine a set of second channel estimates based on the second interference reduced received information signals, to generate a set of second received bit estimates from the second interference reduced received information signals, and to perform multiple access interference cancellation on the second interference reduced received information signals using the second channel estimates and the second bit estimates.

The space-based component may be further configured to receive signals using at least two antenna patterns that differ in at least a polarization and/or spatial orientation.

The detector may be further configured to generate a plurality of interference reduced bit estimates from the interference reduced received information signals, and to perform multiple access interference cancellation using the plurality of interference reduced bit estimates.

The space-based component may be further configured to re-transmit the multiple access signals to a satellite gateway, and the interference reducer may be located at the satellite gateway, which may be terrestrially-based.

Systems according to some embodiments of the invention may further include a satellite gateway, and the interference reducer may be located at the space-based component, the detector may be located at the satellite gateway, and the space-based component may be further configured to transmit the interference reduced received information signals to the satellite gateway.

Some embodiments of the invention provide an interference reducing detector for a satellite communications system including a space-based component configured to receive multiple access wireless communications signals including co-channel interference from a plurality of wireless terminals in a satellite footprint over a satellite frequency band, the interference reducing detector including an interference reducer responsive to the space-based component and configured to perform co-channel interference reduction on the multiple access wireless communication signals to generate a plurality of interference reduced received information signals, and a detector configured to perform multiple access interference cancellation on the interference reduced received information signals.

The interference reducer of the interference reducing detector may be further configured to perform co-channel interference reduction on the multiple access wireless communications signals received from the plurality of wireless terminals by processing pilot signals transmitted by the plurality of wireless terminals and determining sets of weights for a respective set of antenna feed elements based on the processing of the pilot signals.

The interference reducer of the interference reducing detector may be further configured to generate at least one pilot signal error based on the processing.

The interference reducer of the interference reducing detector may be further configured to select a set of signal weights for the antenna feed elements to reduce a mean squared measure of the at least one pilot signal error.

The interference reducer of the interference reducing detector may be further configured to apply the set of signal weights to signals received by a plurality of antenna feed elements to obtain a plurality of interference reduced received information signals.

The detector of the interference reducing detector may be further configured to determine a set of channel estimates based on the interference reduced received information signals, generate a set of received bit estimates from the interference reduced received information signals, and perform multiple access interference cancellation on the interference reduced received information signals using the set of channel estimates and the bit estimates to thereby generate second interference reduced received information signals.

The detector of the interference reducing detector may be further configured to determine a set of second channel estimates based on the second interference reduced received information signals, generate a set of second received bit estimates from the second interference reduced received information signals, and perform multiple access interference cancellation on the second interference reduced received information signals using the second channel estimates and the second bit estimates.

The space-based component may be further configured to receive signals using at least two antenna patterns that differ in at least a spatial and/or polarization orientation.

The detector of the interference reducing detector may be further configured to generate a plurality of interference reduced bit estimates from the interference reduced received information signals, and to perform multiple access interference cancellation using the plurality of interference reduced bit estimates.

The space-based component may be further configured to re-transmit the multiple access wireless communication signals to a satellite gateway, and the interference reducer may be located at the satellite gateway, which may be terrestrially-based.

The interference reducer of the interference reducing detector may be located at the space-based component and the detector may be located remotely from the space-based component.

Some embodiments of the invention provide a gateway for a satellite wireless terminal system that may include a space-based component that is configured to receive multiple access wireless communications signals from a plurality of wireless terminals in a satellite footprint over a satellite frequency band, the gateway including an interference reducer responsive to the space-based component and configured to perform co-channel interference reduction on the multiple access wireless communications signals to generate a plurality of interference reduced received information signals, and a detector that is configured to perform multiple access interference cancellation on the interference reduced received information signals.

The interference reducer of the gateway may be further configured to perform co-channel interference reduction on the multiple access wireless communications signals by processing pilot signals transmitted by the plurality of wireless terminals and determining sets of weights for a set of antenna feed elements based on the processing of the pilot signals.

The interference reducer of the gateway may be further configured to generate at least one pilot signal error based on the processing.

The interference reducer may be further configured to select a set of signal weights for the antenna feed elements to reduce a mean squared measure of the at least one pilot signal error.

The interference reducer of the gateway may be further configured to apply the sets of signal weights to signals received by a plurality of antenna feed elements to obtain the plurality of interference reduced received information signals.

The detector of the gateway may be further configured to determine a set of channel estimates based on the interference reduced received information signals, generate a set of received bit estimates from the interference reduced received information signals, and perform multiple access interference cancellation on the interference reduced received information signals using the set of channel estimates and the bit estimates to thereby generate second interference reduced received information signals.

The detector of the gateway may be further configured to determine a set of second channel estimates based on the second interference reduced received information signals, generate a set of second received bit estimates from the second interference reduced received information signals, and perform multiple access interference cancellation on the second interference reduced received information signals using the second channel estimates and the second bit estimates.

The space-based component may be further configured to receive signals using at least two antenna patterns that differ in at least a spatial and/or polarization orientation.

The detector of the gateway may be further configured to generate a plurality of interference reduced bit estimates from the interference reduced received information signals, and to perform multiple access interference cancellation using the plurality of interference reduced bit estimates.

A method of reducing interference according to some embodiments of the invention includes receiving, at a space-based component, components of a signal using at least first and second antenna patterns that differ in a spatial orientation and a polarization orientation, providing the components of the signal to an interference reducer, and processing the components of the signal at the interference reducer to reduce a level of interference of the signal.

A method of communicating between a space-based component and a radioterminal according to some embodiments of the invention includes transmitting a first signal to the radioterminal over a first antenna pattern of the space-based component, and transmitting a second signal to the radioterminal over at least a second antenna pattern of the space-based component, wherein the second signal differs from the first signal by at least a time delay value. The first antenna pattern may differ from the second antenna pattern by a spatial orientation and/or a polarization orientation.

A method of communicating with a space-based component according to some embodiments of the invention includes receiving at a radioterminal a first signal over a first antenna pattern of the space-based component and at least one second signal over at least a second antenna pattern of the space-based component, and processing the first signal and the at least one second signal at the radioterminal to improve at least one communications performance measure. The at least one second signal may differ from the first signal by at least a time delay value.

According to some embodiments of the invention, a communications method for a wireless communications system including a space-based component and an ancillary terrestrial network includes providing control channel and traffic channel communications from the ancillary terrestrial network to a plurality of first radioterminals using a first set of frequencies authorized for use by the space-based component to provide control channel and/or traffic channel communications more than a second set of frequencies authorized for use by the space-based component to provide control channel and/or traffic channel communications, and providing control channel and traffic channel communications from the space-based component to a plurality of second radioterminals within a geographic area using the second set of frequencies. In some embodiments, the ancillary terrestrial network may not use the second set of frequencies.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 3A-3B are block diagrams of an interference reducer and constituent components according to embodiments of the invention.

DETAILED DESCRIPTION OF EMBODIMENTS OF THE INVENTION

Figure 1:
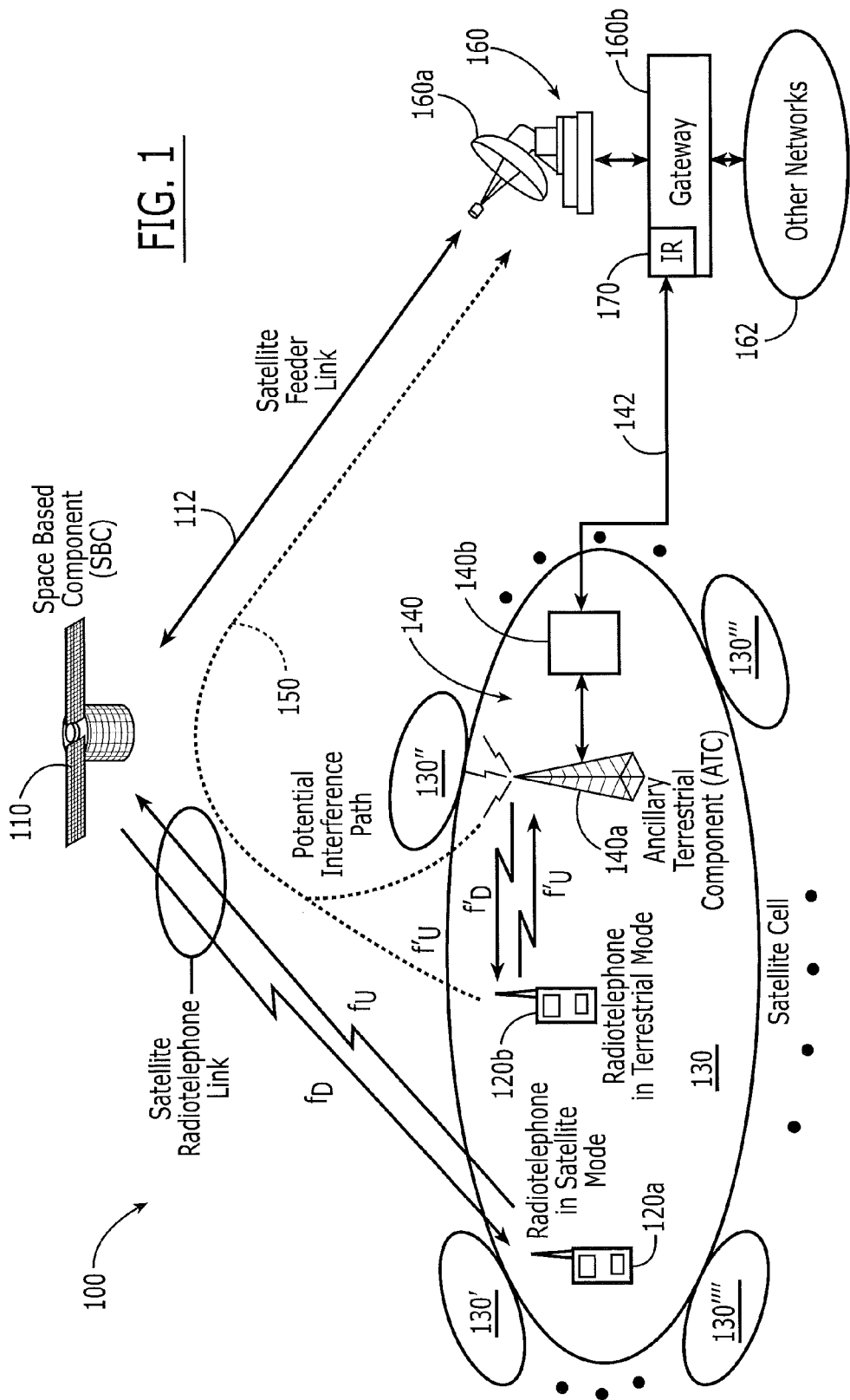
FIG. 1 is a schematic diagram of a cellular satellite communications system and methods according to embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first and second may be used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Moreover, as used herein, "substantially the same" band(s) means that two to more bands being compared substantially overlap, but that there may be some areas of non-overlap, for example at a band end and/or elsewhere. "Substantially the same" air interface(s) means that two or more air interfaces being compared are similar but need not be identical. For example, a first air interface (i.e., a satellite air interface) may include some differences relative to a second air interface (i.e., a terrestrial air interface) to, for example, account for one or more different characteristics of a communications/propagation environment and/or to address other performance aspects and/or system concerns associated with the first and/or second air interface.

For example, a different vocoder rate may be used for satellite communications compared to the vocoder rate that may be used for terrestrial communications (e.g., for terrestrial communications, audio signals may be encoded ("vocoded") at a rate of approximately 9 to 13 kbps or higher, whereas for satellite communications a vocoder rate of approximately 2 to 4 kbps may be used). Likewise, a different forward error correction code, different interleaving depth, and/or different spread-spectrum codes may also be used, for example, for satellite communications compared to a code, interleaving depth, and/or spread spectrum codes (i.e., Walsh codes, short codes, long codes, and/or frequency hopping codes) that may be used for terrestrial communications.

The terrestrial use/reuse of satellite-band service-link frequencies has been proposed to, and accepted by, the Federal Communications Commission (FCC) and Industry Canada (IC). See, e.g., Report and Order and Notice of Proposed Rulemaking, FCC 03-15, "Flexibility for Delivery of Communications by Mobile Satellite Service Providers in the 2 GHz Band, the L-Band, and the 1.6/2.4 Bands", IB Docket No. 01-185, Adopted: Jan. 29, 2003, Released: Feb. 10, 2003, and Industry Canada, Spectrum Management and Telecommunications Policy DGTP-006-04 "Spectrum and Licensing Policy to Permit Ancillary Terrestrial Mobile Services as Part of Mobile-Satellite Service Offerings," May 2004. Also see, e.g., Memorandum Opinion and Order and Second Order on Reconsideration, FCC 05-30, IB Docket No. 01-185; Adopted: Feb. 10, 2005, Released: Feb. 25, 2005.

Some embodiments of the invention may perform adaptive signal processing, including beam-forming (i.e., antenna pattern shaping), interference suppression, channel estimation and multi-user detection in a Mobile Satellite System (MSS) environment with terrestrial use/reuse of the satellite band frequencies. Beam-forming, based on a Minimum Mean-Squared Error (MMSE) performance index, for example, may be used to increase a signal-to-noise plus interference ratio of MSS links in an environment characterized by significant terrestrial reuse of the satellite service link frequencies. Elements of an ancillary terrestrial network which use/re-use satellite band frequencies are referred to herein as Ancillary Terrestrial Components (ATCs).

Embodiments of the invention can mitigate both ATC-induced and non-ATC-induced interference (that may be co-frequency/co-channel and/or out-of-channel/band) and Multiple-Access Interference (MAI) in a Mobile Satellite System (MSS) environment. In addition, significant performance improvements may be obtained by using both space and time processing of signals received at the satellite. In some embodiments, a pilot-based MMSE algorithm may be used to adaptively form a beam (i.e., antenna pattern) for a user by processing a set of antenna feed element signals. Following beam-forming (i.e., antenna pattern forming), pilot signals may be used to estimate parameters of user channels. A Sequential ATC and MAI Interference Canceller (SAMIC) in accordance with embodiments of the invention can take advantage of known pilot signal information and preliminary decisions of received information to sequentially perform interference suppression, followed by multi-user detection. The performance of the SAMIC algorithm is illustrated by simulation of a multi-beam geo-stationary satellite system containing a wide deployment of ATC over 50 major markets of the Continental United States (CONUS).

While the term "interference canceller" and related terms such as "interference cancellation" and "interference canceling" are used herein to describe elements, systems and methods according to embodiments of the invention, it will be appreciated that while some interference reduction techniques may be referred to as "interference cancellation," some residual interference may remain in a signal even after "interference cancellation." That is, as with any physical process, complete elimination of interference may be impossible or impractical, even in so-called "optimal" systems.

FIG. 1 is a schematic diagram of cellular satellite communications systems and methods according to embodiments of the invention. As shown in FIG. 1, these cellular satellite communications systems and methods 100 include a Space-Based Component (SBC) 110, such as a geostationary or non-geo-stationary orbiting satellite. The space-based component 110 may be configured to selectively use geographically a set of frequencies and to transmit wireless communications signals to a plurality of wireless terminals, only one of which is illustrated in FIG. 1 (terminal 120a), in a satellite footprint including one or more satellite cells 130-130'''', over one or more satellite forward service link (downlink) frequencies $f_D$. The space-based component 110 may also be configured to receive wireless communications from a plurality of wireless terminals, such as wireless terminal 120a in the satellite cell 130, over one or more satellite return service link (uplink) frequencies $f_u$.

An ancillary terrestrial network (ATN), comprising at least one ancillary terrestrial component (ATC) 140, which may include an antenna 140a and an electronics system 140b, is configured to receive wireless communications signals from, for example, at least one wireless terminal 120b over an uplink frequency, denoted $f'_u$, within the satellite frequency band. The frequency $f'_u$ may be the same as an uplink or downlink frequency used for communicating with the space-based component (SBC) 110 in the satellite cell 130 in which the wireless terminal 120b is located and/or in an adjacent or remotely-located satellite cell 130. Thus, as illustrated in FIG. 1, the wireless terminal 120a may be communicating with the space-based component 110 using a frequency in the satellite frequency band while the wireless terminal 120b may be communicating with the ancillary terrestrial component 140, also using a frequency in the satellite frequency band. As shown in FIG. 1, the space-based component 110 also undesirably receives a component of the wireless communications from the wireless terminal 120b and/or the ATC 140 in the satellite cell 130 as interference. In addition, the space based component 110 may receive a component of wireless communications from a wireless terminal and/or ATC (not shown) located in a different satellite cell over a satellite frequency that may be the same as (and/or overlapping with) $f_U$ and/or $f'_U$.

More specifically, a potential interference path is shown at 150. In this potential interference path 150, the signal transmitted by the wireless terminal 120b and/or the ATC 140 interferes with satellite communications. This interference would generally be strongest when the transmitted signal uses the same carrier frequency as the cell in question (e.g., $f'_U = f_U$), because, in that case, the same return link frequency would be used for space-based component and ancillary terrestrial component communications and, if used over the same satellite cell, no substantial spatial discrimination between satellite cells would appear to exist to reduce a level of interference. Even with spatial separation, however, interference may impair the signal from the first wireless terminal 120a.

Still referring to FIG. 1, embodiments of satellite communications systems/methods 100 can include at least one satellite gateway 160 that can include an antenna 160a and an electronics system 160b. The satellite gateway 160 may be connected to other networks 162, including terrestrial and/or other wired and/or wireless communications networks such as, for example, a public switched telephone network and/or the Internet. The satellite gateway 160 communicates with the space-based component 110 over a satellite feeder link 112. The satellite gateway 160 may also be configured to communicate with ancillary terrestrial components 140 in the ancillary terrestrial network, generally over a terrestrial link 142.

Still referring to FIG. 1, an Interference Reducing (IR), signal processor 170 also may be provided at least partially in the gateway electronics system 160b. In yet other alternatives, the interference reducing signal processor 170 may be provided at least partially in other components of the cellular satellite system/method 100 instead of or in addition to the gateway electronics system 160b. For example, an interference reducing signal processor 170 may be at least partially provided in the space-based component 110. The interference reducing signal processor 170 may be responsive to the space-based component 110 and to the ancillary terrestrial component 140, and may be configured to reduce interference from the wireless communications that are received by the space-based component 110. In particular, the interference reducing signal processor 170 may be configured to reduce interference that is at least partially generated by ATC's such as ATC 140 and wireless terminals such as wireless terminal 120b communicating with the ancillary terrestrial network. In addition, the interference reducing signal processor 170 may also be configured to reduce interference from other transmitters such as, for example, transmitters operating outside the MSS and/or the ATN.

Systems and methods disclosed in this application may be advantageously utilized in a system employing terrestrial use/reuse of satellite-band frequencies. As described above, the Ancillary Terrestrial Network (ATN) uses/reuses the at least some of the satellite-band service link frequencies to provide reliable communications in populous areas where satellite connectivity is unreliable. As a consequence of the terrestrial use/reuse of the satellite-band frequencies, uplink co-channel interference to satellite links may be present and may become harmful, under certain conditions, where there is insufficient discrimination between satellite and terrestrial links. Embodiments of the invention may be advantageously employed in a state-of-the-art Mobile Satellite System (MSS) operating in conjunction with an ancillary terrestrial network that is widely deployed over a plurality of markets over, for example, the Continental United States (CONUS) and/or other geographic areas. Some embodiments of the invention may be particularly applicable to an MSS/ATN system employing a spread-spectrum multiple access communications protocol such as, for example, a cdma2000 1XRTT protocol. Embodiments of the invention, however, may be applied to any communications protocol and/or air interface, as will be recognized by those skilled in the art.

Multiple access interference (MAI) is a type of co-channel interference that may diminish the quality of a signal received at a satellite in a multiple access communications environment. In such an environment, multiple transmitters communicate with a single receiver (such as a satellite receiver) using a shared communications medium/carrier/channel. In general, there are at least three basic multiple access schemes: time division multiple access (TDMA), code division multiple access (CDMA) and frequency division multiple access (FDMA). In an FDMA scheme, different transmitters are assigned different frequency bands on which to transmit. In a TDMA system, different transmitters are assigned different time slots (i.e., time intervals) within a particular frequency band. Thus, in accordance with a TDMA system, a transmitter is assigned to a particular frequency band (as in FDMA), but temporally shares the frequency band in order to improve band utilization. In a general CDMA scheme, multiple transmitters share a single, relatively wide frequency band, but the transmitters may not be limited to particular time slots. Rather, each transmitter is assigned a unique spreading code (or "chipping" code) that is in some embodiments orthogonal to the spreading code used by each of the other transmitters. Information transmitted by each transmitter is modulated using the transmitter's spreading code. Thus, the signal broadcast by a first co-frequency (co-channel) transmitter may ideally appear as noise when added to the signal transmitted by a second co-frequency (co-channel) transmitter. More advanced multiple access systems may combine aspects of FDMA, TDMA and/or CDMA. In general, a receiver in a multiple access system may be required to estimate a signal transmitted by a transmitter that is subject to co-channel MAI due to the signals transmitted by other transmitters in the system.

In conventional third generation (3G) CDMA systems, potential impediments of signal detection generally are (i) multipath fading, and (ii) MAI caused by co-channel transmissions using codes that are not orthogonal to the signal of the desired user. Rake matched filtering can effectively combat multipath fading by coherently combining resolvable multipath replicas of the desired signal. A receiver comprising a multi-element antenna may be configured to combine rake matched filtering with space-time processing of signals to reduce MAI.

A multi-user detection system configured to reduce MAI may be contrasted with a single-user detection technique which detects a desired user signal without regard to the MAI. In accordance with some embodiments of the present invention, a communications receiver may be configured with a first signal processing stage which is operative on a plurality of received signals provided to the communications receiver by a respective plurality of antenna patterns of a space-based component wherein, in general, the plurality of antenna patterns differ therebetween in spatial orientation (i.e., project different gain contours over the service area of the space-based component) and/or may differ therebetween in one or more polarization orientations. In some embodiments, the plurality of antenna patterns are formed by the space-based component using at least one antenna feed element of the space-based component. In some embodiments of the invention, at least one of the plurality of antenna patterns includes at least two polarization-distinct antenna patterns providing a signal to the communications receiver including at least two components, respectively associated with at least two different polarization orientations of the at least one of the plurality of antenna patterns. In some embodiments, the at least two different polarization orientations include a substantially Right Hand Circular Polarization (RHCP) and a substantially Left Hand Circular Polarization (LHCP). In other embodiments of the invention, each one of the plurality of antenna patterns provides a signal including at least two components, respectively associated with at least two different polarization orientations. The first signal processing stage of the communications receiver may operate on the plurality of received signals to reduce a level of interference therein, thereby enabling a second stage of the communications receiver, following the first, to more effectively reduce MAI and perform Multi-User Detection (MUD).

In some embodiments, the communications receiver is configured at one or more satellite gateways. In other embodiments, the communications receiver is configured at a space-based component. In still further embodiments, the communications receiver may be distributed between the space-based component and at least one satellite gateway.

In some embodiments of the invention, the first signal processing stage of the communications receiver, which is operative on a plurality of received signals provided to the communications receiver by a respective plurality of antenna patterns of a space-based component, may be selectively operative on a predetermined plurality of received signals provided to the communications receiver by a respective predetermined plurality of antenna patterns of the space-based component. The predetermined plurality of received signals may, in some embodiments of the invention, be a sub-set of an ensemble of signals received by a respective ensemble of antenna patterns of the space-based component, and the selection of the predetermined plurality of received signals (i.e., the selection of the predetermined plurality of antenna patterns that provide the predetermined plurality of received signals) may be responsive to a received return link control channel signal. A location and/or a geographic area associated with the received return link control channel signal may, in some embodiments of the invention, be used to select the predetermined plurality of antenna patterns that provide the predetermined plurality of received signals.

In some embodiments, the return link control channel signal is configured to occupy a frequency range that is not used/re-used or is minimally used/re-used by an Ancillary Terrestrial Network (ATN) and/or other network, thereby minimizing or reducing a level of interference associated with the return link control channel signal. Accordingly, the return link control channel signal may be received by the space-based component substantially free, or at a reduced level, of interference that may, otherwise, be caused by terrestrial (and/or other) use/reuse of the return link control channel frequencies. The return link control channel signal may be received by the space-based component via one or more space-based component antenna patterns (beams/cells and/or antenna patterns formed by antenna feed elements). Responsive to the one or more space-based component antenna patterns that receive the return link control channel signal and/or responsive to respective return link control channel signal strength and/or signal quality associated with the one or more space-based component antenna patterns that receive the return link control channel signal, a geographic location associated with a source (such as, for example, a radioterminal source) associated with the return link control channel signal may be determined and used to select the predetermined plurality of antenna patterns that provide the predetermined plurality of received signals. Accordingly, relative to a source that emits a return link control channel signal, the space-based component may be configured to determine a geographic location associated with the source and configure a communications receiver to selectively operate on a predetermined plurality of received signals provided to the communications receiver by a respective predetermined plurality of antenna patterns of the space-based component that, for the determined geographic location associated with the source, are determined to be optimum or near optimum in enabling the communications receiver to establish a maximum or near maximum desired signal to interference and/or noise performance measure.

It will be understood that the return link control channel signal may be received by the space-based component using substantially fixed spot beams and/or antenna patterns that may be associated with one or more antenna feed elements (i.e., receive antenna feed elements) of the space-based component. In some embodiments of the invention, forward link control channel signals may also be based on substantially fixed spot beams and/or antenna patterns that may be associated with one or more antenna feed elements (i.e., transmit antenna feed elements) of the space-based component. A forward link control channel signal may be radiated by the space-based component using a first antenna pattern of the space-based component that spans a first geographic service area of the space-based component. The space-based component may also be configured to radiate the forward link control channel signal using a second antenna pattern that spans a second geographic service area of the space-based component that may at least partially overlap with the first geographic area of the space-based component. The forward link control channel signal may be radiated using the second antenna pattern after the forward link control channel signal has been delayed by a first delay value relative to the forward link control channel signal that is radiated by the space-based component using the first antenna pattern. The space-based component may also be configured to radiate the forward link control channel signal using a third antenna pattern that spans a third geographic service area of the space-based component that may at least partially overlap with the first and/or second geographic area of the space-based component. The forward link control channel signal may be radiated using the third antenna pattern after it has been delayed by a second delay value relative to the forward link control channel signal that is radiated by the space-based component using the first antenna pattern.

More generally, the space-based component may also be configured to radiate the forward link control channel signal using an Nth antenna pattern that spans an Nth geographic service area of the space-based component that may at least partially overlap with the first, second, third, . . . , and/or (N−1)th geographic area of the space-based component. The forward link control channel signal may be radiated using the Nth antenna pattern after it has been delayed by a respective (N−1)th delay value relative to the forward link control channel signal that is radiated by the space-based component using the first antenna pattern. In some embodiments of the invention, the delay values (first through (N−1)th) may be substantially predetermined and/or may be substantially distinct. Furthermore, the N components of a signal that may be radiated by the space-based component over N respective antenna patterns may be radiated at N respective power levels that may be different therebetween. The choice of the N respective power levels may, in accordance with some embodiments of the invention, be chosen based on a geographic position of a radioterminal that is to receive and process the N components of the signal and/or in accordance with N respective gain values, in the direction of the radioterminal, associated with N respective space-based component antenna patterns that are used to radiate the N respective power levels. The N respective power levels may also be evaluated subject to a constraint imposed on an aggregate space-based component power to be used in radiating the N components of the signal over the N respective antenna patterns using the N respective power levels. In some embodiments, the radioterminal may also be configured to provide information to the space-based component and/or to a gateway of the space-based component (via a return link control and/or traffic channel) to aid in determining an optimum or near optimum choice of the N respective power levels.

Accordingly, a device that, is configured to receive and process the forward link control channel signal (or any other forward link signal that is radiated by the space-based component in accordance with the principles disclosed hereinabove) may include a receiver element that is configured to increase or maximize a measure of desired signal to noise and/or interference ratio by receiving and processing the signal radiated by the space-based component by the first antenna pattern and at least one delayed version thereof that is radiated by the space-based component by an antenna pattern other than the first. In some embodiments of the invention, the receiver element is a Rake receiver element and/or a transversal filter receiver element, as will be recognized by those skilled in the art. Alternatively or in combination with the above, each one of the N forward link signal components that is radiated by the space-based component may be provided with a unique characteristic (e.g., a unique pilot signal, bit sequence, mid-amble, pre-amble and/or spreading code) that a receiving device (such as a radioterminal) may process to achieve a maximal ratio combining (a maximum or near maximum of a desired signal to noise and/or interference power ratio) with respect to two or more of the forward link signal components that are radiated by the space-based component over two or more respective antenna patterns thereof and received at the receiving device.

It will be understood that any antenna pattern of the space-based component may be a first antenna pattern of the space-based component. It will also be understood that the space-based component may include a plurality of first antenna patterns and that each forward link antenna pattern of the space-based component may be a first antenna pattern of the space-based component. In accordance with some embodiments of the invention, a plurality of first antenna patterns associated with a space-based component may be a number of first antenna patterns that is equal to, or is less than, a total number of antenna patterns associated with the space-based component. The total number of antenna patterns associated with the space-based component may be, in some embodiments of the invention, a total number of beams/cells and/or antenna feed element antenna patterns associated with the space-based component (such as a total number of forward service link beams/cells and/or forward service link antenna feed element antenna patterns associated with the space-based component). In some embodiments of the invention, at least some, and in some embodiments all, of the first antenna patterns of the space-based component are associated with a neighboring/adjacent second, third, . . . and/or Nth antenna pattern, that, as described earlier, radiate respective second, third, . . . and/or Nth delayed versions of an associated forward link signal and/or respective versions, including unique characteristics, of the forward link signal. In some embodiments, the unique characteristics may include different code(s) and/or different bit sequence(s) compared to a code and/or a bit sequence of the associated forward link signal. It will be understood that the techniques described above relative to the forward link control channel signal may be applied to any forward link control channel signal and/or any forward link traffic channel signal.

In some embodiments of the invention, at least one forward link communications channel and/or at least one return link communications channel may be used preferentially for space-based communications and/or may be reserved and used for space-based communications only, while one or more forward link communications channels and/or one or more return link communications channels may be used for space-based and terrestrial communications and/or preferentially for terrestrial communications. Accordingly, the at least one forward link communications channel and/or the at least one return link communications channel that may be reserved and used for space-based communications only and/or preferentially used for space-based communications, may be used to provide space-based communications in geographic areas that are geographically proximate to system elements (ancillary terrestrial components) providing terrestrial communications using/reusing at least some frequencies of the space-based component to thereby reduce or avoid interference that may otherwise be caused by the terrestrial communications to the space-based communications. Accordingly, a communications device that is engaged in terrestrial-mode communications and is at a geographic distance that is substantially at or beyond an edge of a geographic service area of the system elements providing terrestrial communications may be transferred to space-based-mode communications using the at least one forward link communications channel and/or the at least one return link communications channel that are/is reserved and used for space-based communications only and/or is preferentially used for space-based communications. It will be understood that the at least one forward link communications channel and/or the at least one return link communications channel that are/is reserved and used for space-based communications only and/or preferentially used for space-based communications, may also be used to provide space-based communications in geographic areas that are geographically distant to system elements providing terrestrial communications.

Embodiments of the invention may provide systems and methods for reducing Multiple Access Interference (MAI) and other (non-MAI) co-channel interference in a signal received by a space-based component. As noted above, co-channel interference may be generated by terrestrial use/reuse of at least some of the satellite-band (space-based component band) frequencies by an Ancillary Terrestrial Network (ATN) including infrastructure transmitters, such as, for example, base station transmitters and transmitters of user devices.

Modern satellites may use an antenna system including multiple receiving antenna feed elements to form a plurality of service area spot-beams (or antenna patterns). The antenna system may include a large number (L) of antenna feed elements that may be physically arranged in a two dimensional array. Electromagnetic signals transmitted by user devices (e.g., radioterminals) and/or other transmitters are received by each of the L antenna feed elements. The electromagnetic signal received at the lth antenna feed element is referred to as $y_l$. The collection of signals received at the L antenna feed elements is referred to collectively as $y_L$.

A received electromagnetic signal may be represented by a complex value (i.e., a value having both a real component and an imaginary component). Thus, a received electromagnetic signal may be referred to as a "complex signal" and may be analyzed and manipulated using tools of mathematics relating, but not limited, to complex-valued quantities such as constants, variables, functions, vectors and/or matrices.

In an antenna system, a collection of L complex weights ($w_L$) may be applied to a received signal; that is, a complex weight $w_l$ may be applied to the signal $y_l$ received at each of L feed elements of the antenna system. The complex weight applied to a signal $y_l$ received at one feed element may be the same as, or different from, the complex weight $y_l$ applied to a signal received at a different feed element. By making appropriate choices for the complex weights, the signals received at each of the L feed elements may combine substantially constructively or substantially destructively with each other depending on respective azimuth and elevation values from which the signals are received relative to the orientation of the antenna. In general, each set of complex weights may be chosen such that a signal power arriving from a desired direction (azimuth/elevation combination) is maximized, or nearly maximized, at a receiver while a power of one or more signals arriving at the receiver from one or more respective directions that differ from the desired direction is suppressed. Thus, for example, applying a first set of L complex weights to the signals received by the L antenna feed elements may cause the antenna to be relatively responsive to signals received from around a first azimuth/elevation combination and relatively unresponsive to signals received from other azimuth/elevation combinations. A second set of L complex weights may cause the antenna to be relatively responsive to signals received from around a second azimuth/elevation combination and relatively unresponsive to signals received from other azimuth/elevation combinations, and so on.

By choosing appropriate combinations of L complex weights, an antenna may be configured to selectively receive signals from one or more overlapping or non-overlapping service areas, each of which is illuminated by a spot beam defined by a unique set of complex weights. Accordingly, "spot beam" refers to the area around a particular azimuth/elevation combination to which the antenna is responsive based on a given set of L complex weights. A spot beam may therefore define a geographic region. The process of selecting appropriate complex weights in order to define a spot beam having a desired response around a particular azimuth/elevation combination is known as "beam forming."

In some satellite systems such as Thuraya and Inmarsat-4, the signals provided by the satellite's receiving antenna feed elements are digitally processed at the satellite by applying the complex weights to the received complex signals and then forming linear combinations of the signals in the manner described above. In other systems, however, the signals received at the receiving antenna feed elements may be transported to a terrestrial satellite gateway via one or more satellite feeder links, and processed at the satellite gateway in accordance with one or more performance criteria. This is referred to as ground-based beam forming.

In order to reduce co-channel interference, systems and/or methods according to some embodiments of the invention may restrict the use of available frequency bands such that a frequency band employed for satellite communications within a particular satellite cell may not be employed by elements of the ATN (e.g. fixed and/or mobile transmitters) located within the satellite cell. However, in order to increase the utilization of available bandwidth, the frequency band used for satellite communications within a particular satellite cell may be spatially re-used outside the satellite cell. Signals transmitted over the ATN using such re-used frequencies outside the satellite cell (i.e. outside the spot beam) may nevertheless be received as co-channel interference by the satellite along with the intended satellite communications from within the satellite cell (i.e. inside the spot beam). Such interference is referred to herein as ATN-induced or ATC-induced co-channel interference. In some embodiments according to the invention, however, frequencies used for satellite communications within a particular cell may be terrestrially reused with additional interference reduction techniques, such as, for example, the interference reduction techniques discussed in U.S. Pat. No. 6,684,057.

In some embodiments of the invention, pilot signals received at the satellite's receiving antenna feed elements are used to perform adaptive beam-forming to mitigate ATN-induced co-channel interference and/or inter-beam co-channel interference. Then, operating on the reduced-interference samples, an interference reducer removes at least some intra-beam MAI using multi-user detection. The space processing (beam-forming) may be performed in advance of the time processing (multi-user detection) in some embodiments, because it may be difficult (if not impossible) to perform effective signal detection without first reducing the ATN-induced co-channel interference, which may be overwhelming. In some embodiments, the adaptive beam-former uses a priori knowledge of pilot signals transmitted by the satellite user terminals, for example the pilot signal of the cdma2000 return link waveform. Following the beam-forming, the pilot signals are used to estimate multi-user channels. The detector may be a maximum likelihood detector in some embodiments.

Figure 2A:
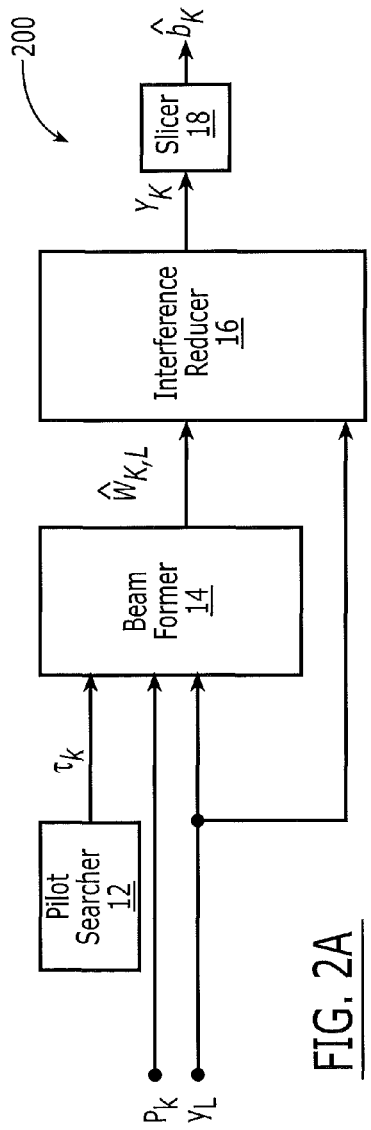
FIGS. 2A-2C are block diagrams of an interference reducer and constituent components according to embodiments of the invention.
Figure 2B:
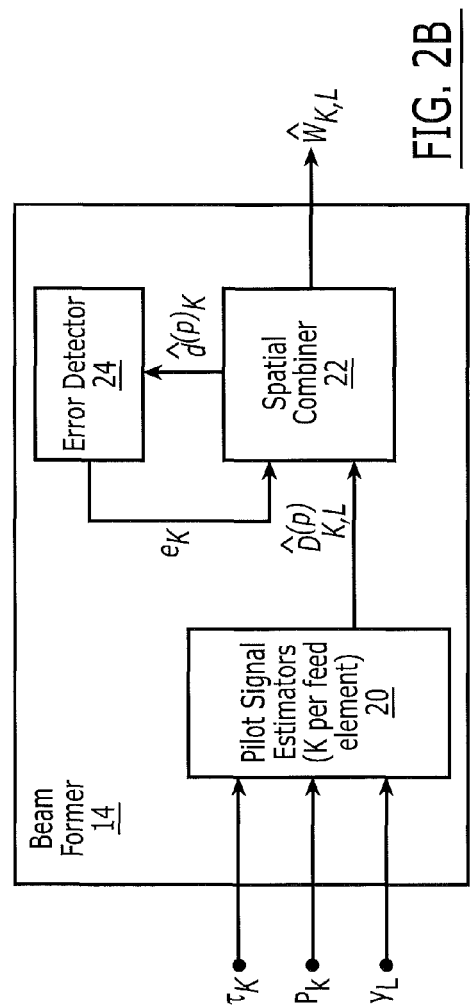
Figure 2C:
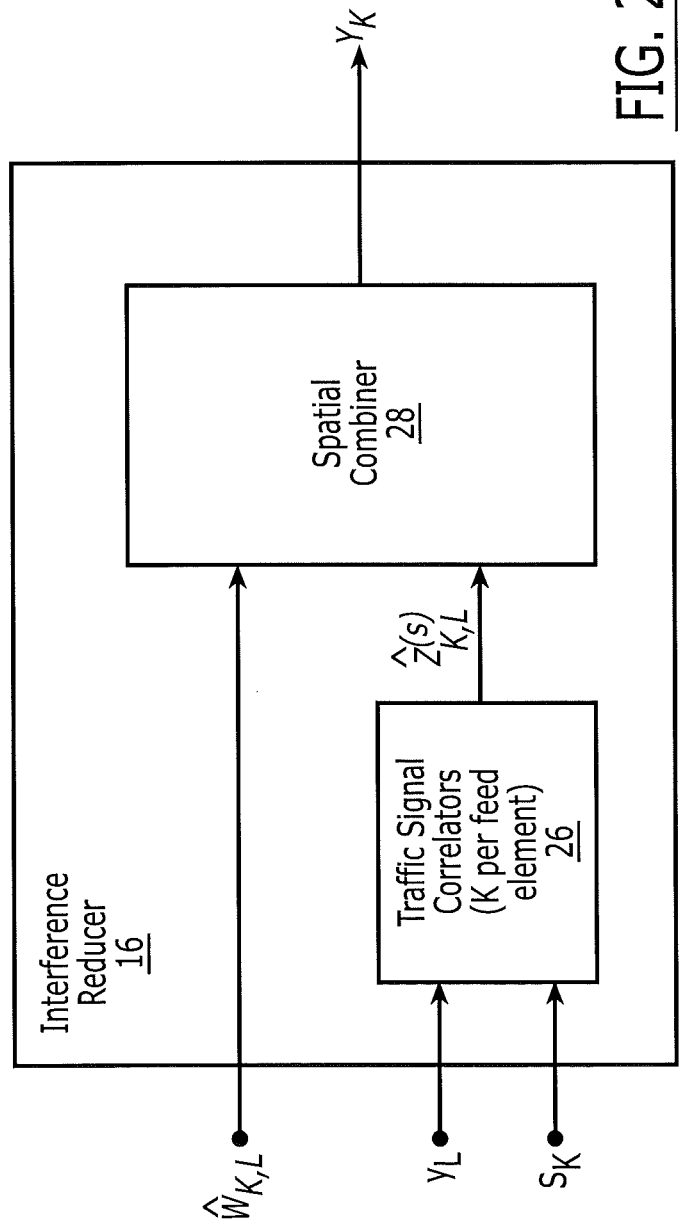

A single user interference reducing detector 200 including an adaptive beam former 14 and an interference reducer 16 according to some embodiments of the invention is illustrated in FIGS. 2A-2C. As shown in FIG. 2A, a beam former 14 receives a vector $y_L$ of L input signals received at L feed elements of an antenna (not shown). The beam former 14 also receives and/or has stored a vector of K pilot signal spreading codes $p_K$. The vector $p_K$ of pilot signal spreading codes includes one pilot signal spreading code for each of K multiple-access transmitters (i.e. satellite users) which transmit multiple-access signals to a satellite or space-based component (SBC) (not shown). Thus, the beam former has a priori knowledge of both the pilot signal and the pilot signal spreading codes with which the known pilot signal is transmitted by each of the K transmitters. This a priori knowledge is used both to locate (in time) the pilot signals as well as to reduce the interference affecting the information signals transmitted by each of the K users (transmitters). The beam former 14 also receives, as an input, delay information $\tau_k$ for each of the K transmitters that is provided by a pilot searcher 12.

The beam former 14 generates an L×K matrix $\hat{W}_{K,L}$ of complex weights $\hat{w}$. That is, the beam former generates a vector $\hat{w}_K$ of L complex weights for each of the K transmitters. As discussed above, each complex weight vector $\hat{w}_K$ defines a set of complex weights which, when applied to the set of L signals received by the L antenna feed elements, forms a beam which reduces co-channel interference in the received pilot signals. For example, the weight vector $\hat{W}_1$ defines a set of L weights which, when applied to the set of L signals received by the L antenna feed elements, forms a beam which reduces interference in the pilot signal received from the first transmitter, and so on. In some embodiments, the complex weight vector $\hat{w}_K$ defines a set of complex weights which, when applied to the set of L signals received by the L antenna feed elements, forms a beam which minimizes co-channel interference in the kth received pilot signal. In some embodiments, the beam former 12 may use a Least Mean Squared Error (LMSE) algorithm to determine a set of complex weights which minimize co-channel interference in the received pilot signals.

The matrix $\hat{W}_{K,L}$ of complex weights is provided to the interference reducer 16 along with the signals $y_L$ received at the L feed elements of the antenna. Interference reducer 16 uses the matrix $\hat{W}_{K,L}$ of complex weights provided by the beam former 14 to generate $Y_K$, a set of K signals (one for each of the K transmitters) having reduced interference. Based on the values of the signals $Y_K$, a "slicer" 18 (e.g., a decision stage) generates an estimate $\hat{b}_K$ of the bits transmitted by each of the K transmitters. In the embodiments of FIG. 2A, the beam former 14 and the interference reducer 16 may be substantially similar, in that both reduce interference. However, beam former 14 is an autonomous element in that it derives a set of coefficients for reducing interference, by processing at least one pilot signal and/or at least one information signal, whereas the interference reducer is not an autonomous element in that it does not derive coefficients; instead, the interference reducer 16 uses coefficients provided by beam former 14 to reduce interference. It is understood, however, that in some embodiments of the invention, the interference reducer 16 may also be configured to derive coefficients, by processing one or more pilot signals and/or one or more information signals, instead of receiving coefficients from the beam former 14 or in combination with receiving coefficients from beam former 14.

A beam former 14, according to some embodiments of the invention, is shown in more detail in FIG. 2B. As illustrated therein, a beam former 14 may include an array 20 of K pilot signal estimators per feed element. The beam former 14 may be configured to receive the L received signals $y_L$, K pilot signal spreading codes $p_K$ and K delay times $\tau_k$. In some embodiments, the beam former 14 may contain the pilot signal spreading codes and may also be configured to determine the K delay times. As used herein an "estimator" may include a de-spreader and an integrator. The de-spreader may perform the function of de-spreading a spread-spectrum signal by multiplying (correlating) the spread-spectrum signal with a spreading code that has been used by a transmitter of the spread-spectrum signal, and the integrator may integrate power of the de-spread spread-spectrum signal over a time interval to derive a measure of energy of the de-spread spread-spectrum signal. The array 20 of pilot signal estimators generates a matrix of L×K pilot signal estimates. That is, the array 20 of pilot signal estimators generates a vector of K pilot signal estimates (one for each of the K received pilot signals) for each of the L antenna feed elements. A spatial combiner 22 combines the L×K pilot signal estimates using an initial set of postulated weights $\hat{W}_{K,L}$ and generates a vector of K pilot signal estimates $\hat{d}_K^{(p)}$. An error detector 24 compares the pilot signal estimates with the known quantities associated with the pilot signals and generates an error vector $e_K$ of K error signals, one for each of the K pilot signals. The error vector $e_K$ is fed back to the spatial combiner 22, which uses the error vector $e_K$ to adjust the value of the postulated weights $\hat{W}_{K,L}$ to a new value based at least on the value of the error vector $e_K$. In some embodiments, the weights may be adjusted until the error vector $e_K$ is minimized in a LMS error sense. Other algorithms may be employed to reduce or minimize the error vector. The process may be repeated until the system converges on a solution of weights $\hat{W}_{K,L}$ that reduces or minimizes a measure of the error vector $e_K$. The solution of weights that satisfies the desired criterion is then provided as an output matrix $\hat{W}_{K,L}$ by the beam former 14. It will be understood that processing to establish an optimum or near optimum matrix of weights may be conducted at the chip level of a spread-spectrum waveform. That is, instead of de-spreading a spread-spectrum waveform, integrating power of the de-spread spread-spectrum waveform and deriving an error quantity based on the de-spread waveform and a measure of energy thereof, a chip-level error quantity may be derived by comparing a level of a chip of a received spread-spectrum waveform with a level of a reference (e.g., a level of a chip of an ideal version of the received spread-spectrum waveform). As such, at least some function(s) of pilot signal estimators 20 may at least partially be eliminated, and the spatial combiner 22 and/or interference reducer 16 may be configured to operate on chip-level (before de-spreading) signals, as will be recognized by those skilled in the art. In such embodiments, a de-spreader may be provided following a beam former and/or interference reducer.

An interference reducer 16 according to some embodiments of the invention is illustrated in greater detail in FIG. 2C. As illustrated therein, an interference reducer 16 may include an array 26 of K traffic signal correlators (de-spreaders) per feed element. That is, the interference reducer 16 may include L×K traffic signal correlators which generate an L×K matrix $Z_{K,L}^{(s)}$ of traffic signal estimates which are provided to a spatial combiner 28. Using the matrix of weights $\hat{W}_{K,L}$ of the beam former 14, the spatial combiner 28 forms a linear combination of the L×K traffic signal estimates $Z_{K,L}^{(s)}$ to generate a set $Y_K$ of K (de-spread) received signals (one for each of the K transmitters) having reduced interference. As stated earlier, those skilled in the art will recognize that the interference reducer 16 may be configured to operate on chip-level (before de-spreading) signals. In such embodiments, a de-spreader may be provided following the interference reducer and at least some of the functions performed by traffic signal correlators 26 may not be required.

As discussed above, a bit slicer 18 may be used to generate bit estimates $\hat{b}_K$ from the set $Y_K$ of K received signals. In some embodiments, the slicer 18 may be implemented as a comparator whose output is sampled at times based on the time delay $\tau_k$ for each of the K transmitters.

Figure 11:
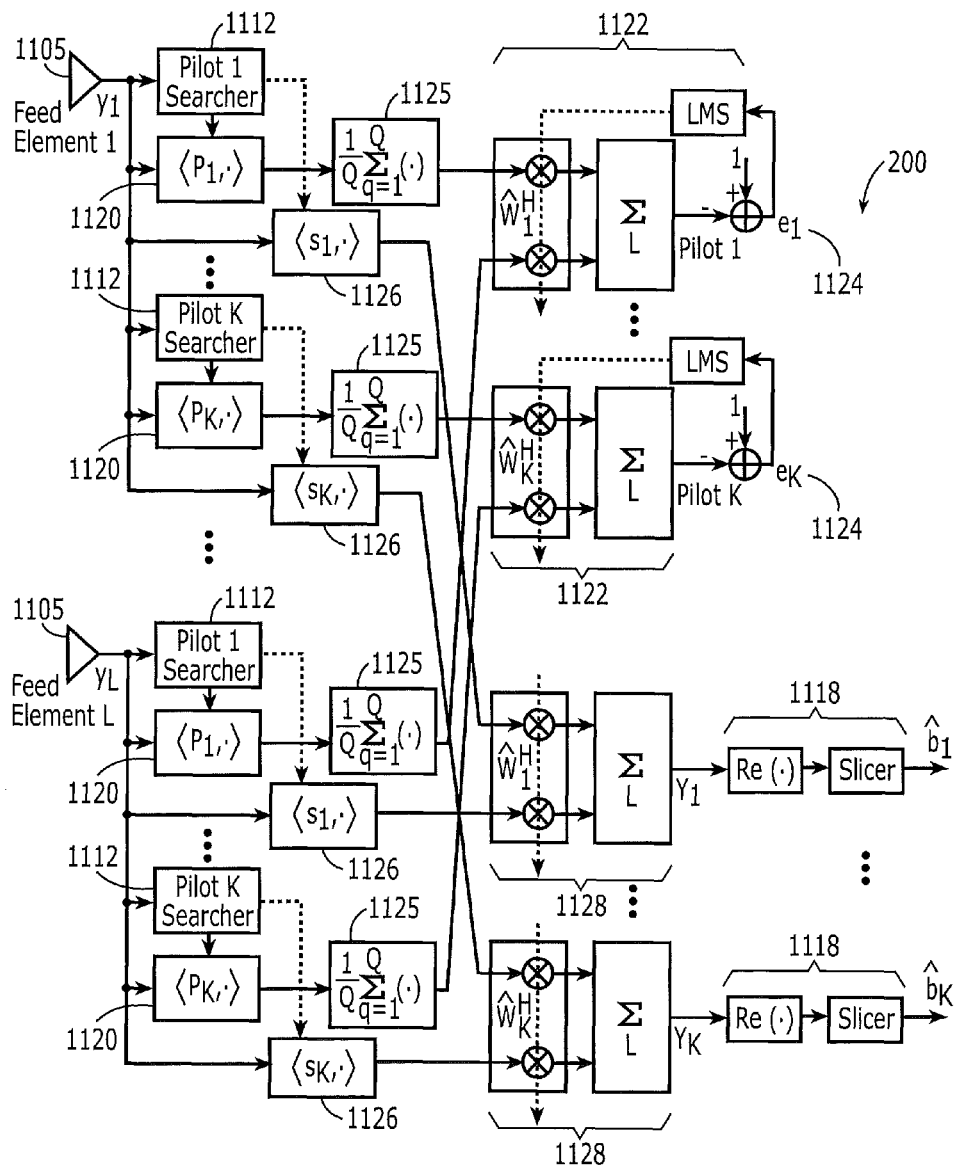
FIG. 11 is a block diagram of a single-user interference cancellation detector according to embodiments of the invention.

An interference reducing detector 200 is illustrated in more detail in FIG. 11. As illustrated therein, the interference reducing detector 200 includes L feed elements 1105 which supply L signals to the detector 200. The L signals may be received, for example, by L antenna feed elements of an antenna (not shown). The L received signals are supplied to a bank of K pilot signal correlators 1120 which correlate the received signals with the known pilot signal spreading codes $p_K$. Timing information for the pilot signal correlators 1120 is provided by the K pilot searchers 1112. The de-correlated pilot signals are integrated over Q periods (such as Q periods of an information symbol) by integrators 1125 and spatially combined by combiners 1122 to generate K received pilot signal estimates. The pilot signal estimates are compared by error detectors 1124 with known values relating to pilot signals to generate K pilot signal error vector signals $e_K$, which are fed back to the spatial combiners 1122 and used to improve the weights. It will be understood that the L feed elements 1105 may be located at a space-based component and at least some other element of the interference reducing detector 200 may be located distant from the space-based component.

The L signals ($y_L$) supplied by the L feed elements 1105 are also provided to a bank of K traffic signal correlators 1126 which de-spread the signals based on known traffic signal spreading codes $s_K$. The de-spread information signals are then combined by a spatial combiner 1128 which uses the weights generated by the spatial combiners 1122 to generate K received information signals $Y_K$. Each of the K received information signals is then processed by a slicer 1118 to generate bit estimates (channel bit estimates).

An interference reducing detector 300 configured to perform co-channel interference reduction and multiple access interference reduction according to further embodiments of the invention is illustrated in FIGS. 3A-3B. Some elements of interference reducing detector 300 are similar to respective elements of the interference reducing detector 200 illustrated in FIG. 1A. That is, the detector 300 includes a pilot searcher 12 and a beam former 14. As in the detector 200, the pilot searcher 12 generates delay information $\tau_k$ for each of the K transmitters and provides the delay information to a beam former 14 along with a vector $y_L$ of L input signals received at L feed elements of an antenna. The beam former 14 also receives and/or has stored a vector of K pilot signal spreading codes and generates an L×K matrix $\hat{W}_{K,L}$ of complex weights $\hat{w}$. The complex weights $\hat{w}$ are adaptively/recursively improved by the beam former 14 according to an algorithm such as, for example, LMSE described above.

The matrix $\hat{W}_{K,L}$ of complex weights is provided to an interference reducer 30 (which may be similar to the interference reducer 16) along with the received signals $Y_L$ from each of the L feed elements of the antenna. In the system 300 the interference reducer 30 provides a de-spread signal $Y_K$, for each of the K signals, and also a chip-level signal $r_K$ for each of the K user signals. The chip-level signal is used by a channel estimator 32 to generate channel estimates $\hat{A}_{K,K}$ for each of the K user signals received at the antenna feed elements. The channel estimates $\hat{A}_{K,K}$ are provided along with K bit estimates $\hat{b}_K$ generated by a slicer 31 and the K chip-level signals $r_K$ to a Sequential ATC and MAI Interference Cancellation (SAMIC) detector 34. In accordance with some embodiments of the invention, the SAMIC detector 34 generates a MAI-cancelled version of the chip-level signals $r_K$. The chip-level signals $\tilde{r}_K$ generated by the SAMIC detector 34 are then processed by a traffic signal de-spreader 36 which has a priori knowledge of the spreading codes $s_K$ used by each of the K transmitters to generate a vector of K MAI-reduced bit estimates $\hat{\tilde{b}}_K$.

An interference reducer 30 according to some embodiments of the invention is illustrated in FIG. 3B. As shown therein, an interference reducer 30 may include a spatial combiner 38 which is configured to receive the received signal vector $y_L$ along with the matrix $\hat{W}_{K,L}$ of complex weights generated by the beam former 14. The spatial combiner 38 forms linear combinations of the input signal vector $Y_L$ values using the complex weights $\hat{W}_{K,L}$ to generate a vector of K received chip-level signals $r_K$, which is provided as a first output of the interference reducer 30. The interference reducer 30 may also include a traffic signal de-spreader 40 which is configured to de-spread the received information signal $r_K$ to generate a vector of K received signals $Y_K$, which is provided as a second output of the interference reducer 30. The received signals $Y_K$ may be processed by the slicer 31 (FIG. 3A) to provide k bit estimates $\hat{b}_K$.

Figure 12:
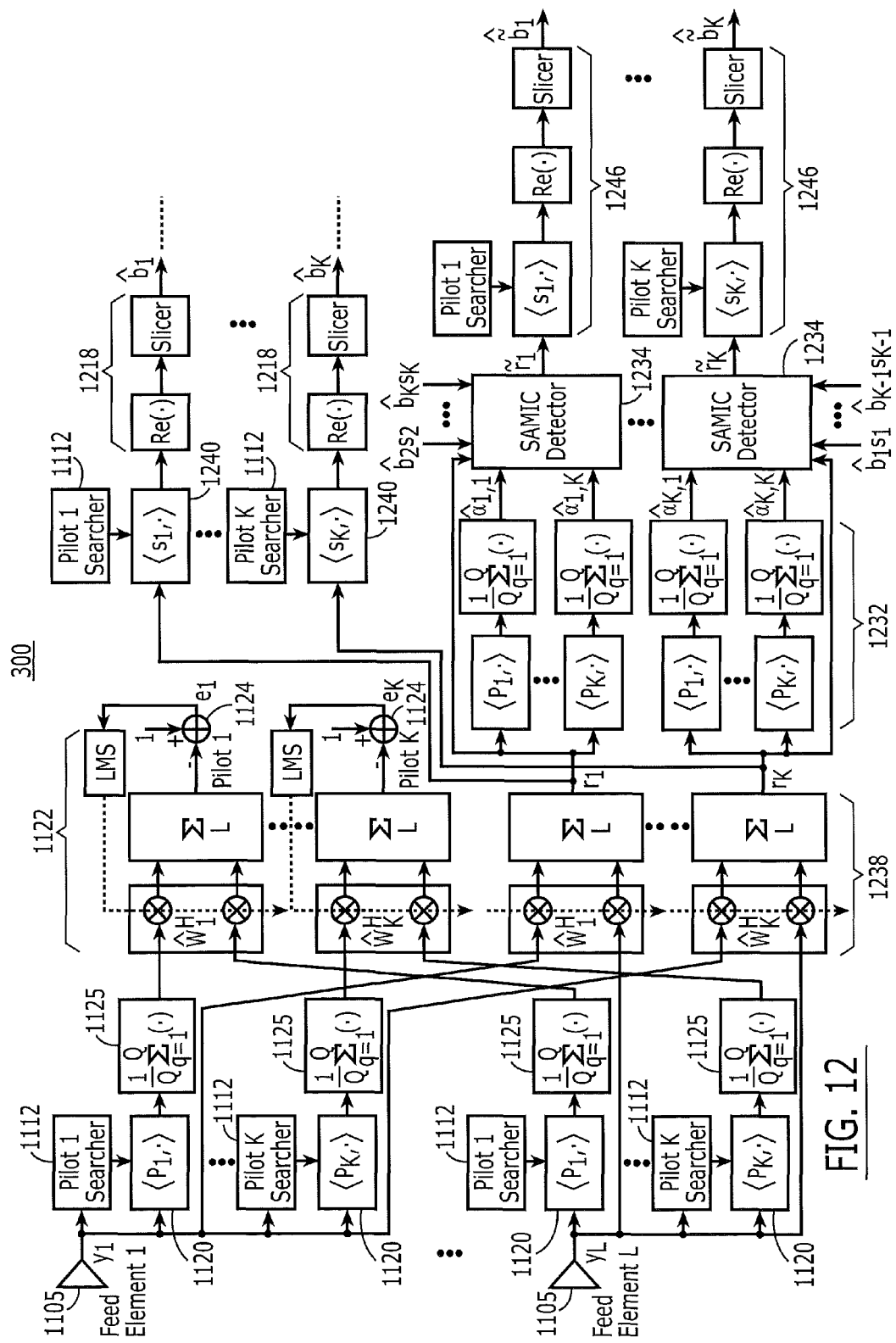
FIG. 12 is a block diagram of a multi-user interference cancellation detector according to embodiments of the invention.

An interference reducing detector 300 is illustrated in more detail in FIG. 12. As illustrated therein, as in the interference reducing detector illustrated in FIG. 11, the interference reducing detector 300 includes L feed elements 1105 which supply L signals to the detector 300. The L signals may be received, for example, by L antenna feed elements of an antenna (not shown). The L received signals are supplied to a bank of K pilot signal correlators (de-spreaders) 1120 which correlate the received signals with the known pilot signal spreading codes $p_K$. Timing information for the pilot signal correlators 1120 is provided by the K pilot searchers 1112. The de-correlated pilot signals are integrated over Q periods by integrators 1125 and spatially combined by combiners 1122 to generate K received pilot signal estimates. The pilot signal estimates are compared by error detectors 1124 with known pilot signal values to generate K pilot signal error vector signals $e_K$, which are fed back to the spatial combiners 1122 and used to improve the weights.

The L signals ($y_L$) supplied by the L feed elements 1105 are also provided to a bank of K spatial combiners 1238 which use the weights generated by the spatial combiners 1122 to generate K received chip level signals $r_K$ having reduced co-channel interference. The K interference reduced chip level signals are then processed by K traffic signal correlators 1240 and slicers 1218 to generate K bit estimates $\hat{b}_K$ for the K detected signals.

The K interference reduced chip level signals $r_K$ are also provided to a bank of channel estimators 1232 which generate K channel estimates $\alpha_K$ for each of the K signals. The channel estimates $\alpha_{K,K}$ are provided along with the chip level signals $r_K$ and the bit estimates $\hat{b}_K$ generated by the slicers 1218 to a bank of SAMIC detectors 1234 which perform multiple access interference cancellation on the interference reduced chip level signals $r_K$ using the channel estimates $\alpha_{K,K}$ and the bit estimates $\hat{b}_K$. The resulting MAI reduced received chip level signals $\tilde{r}_K$ are then processed by a bank of K traffic signal correlator/slicers 1246 which generate MAI-reduced bit estimates $\hat{\tilde{b}}_K$.

Figure 4A:
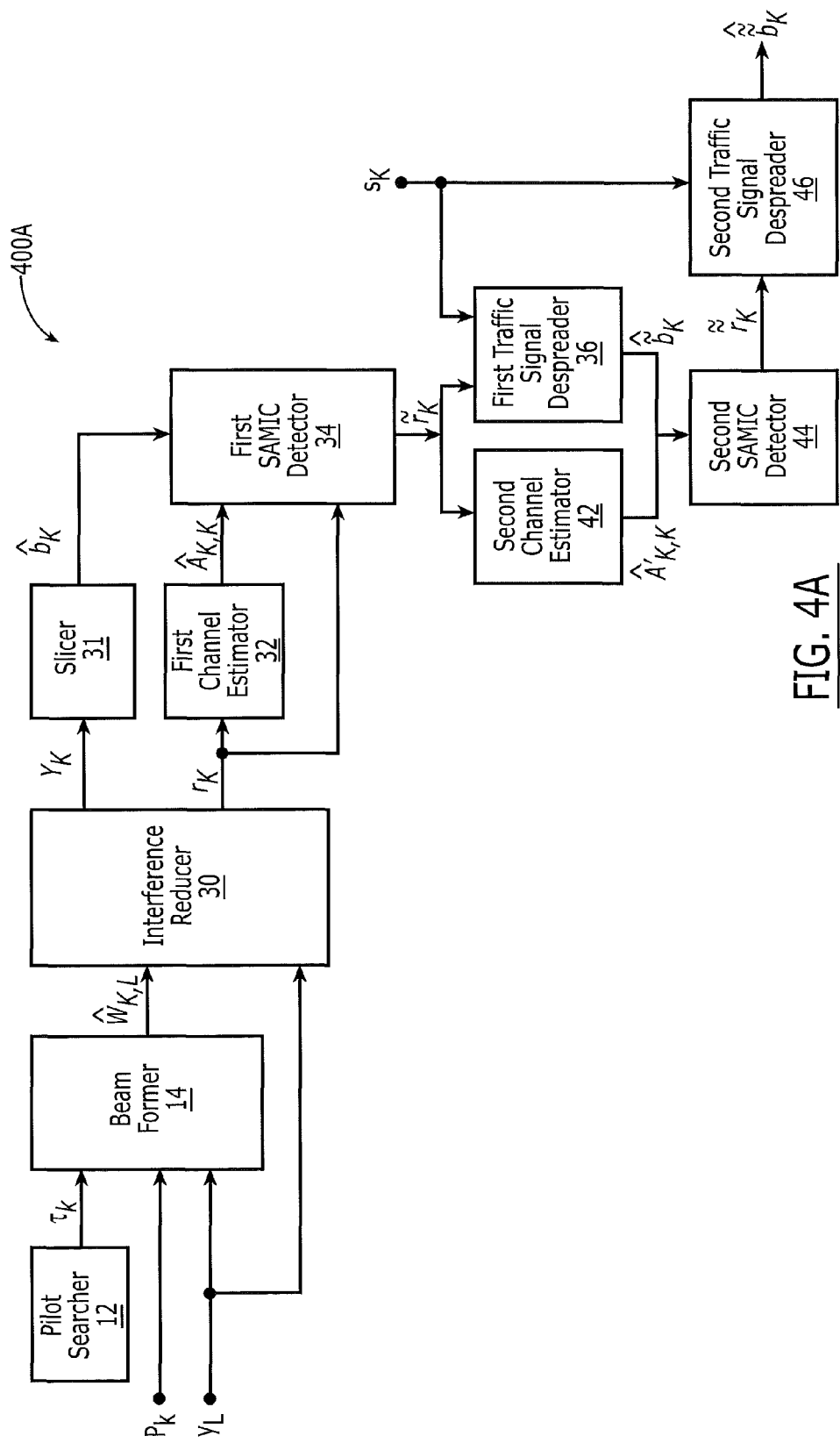
FIG. 4A-4B are block diagrams of interference reducers according to embodiments of the invention.

In some embodiments of the invention, a second SAMIC detector may be employed to further improve interference reduction. As illustrated in FIG. 4A, an interference reducing detector 400A configured to perform co-channel interference reduction and multiple access interference reduction according to further embodiments of the invention is illustrated. System 400A may include elements from system 300, namely, a beam former 14 which generates a matrix of complex weights $\hat{W}_{K,L}$ based on analysis of received pilot signals, an interference reducer 30 which is configured to generate bit estimates $\hat{b}_K$ (via the slicer 31) and received chip level signals $r_K$, a first channel estimator 32 configured to generate channel estimates $\hat{A}_{K,K}$ from the received chip level signals $r_K$, and a first SAMIC detector 34 configured to receive the bit estimates $\hat{b}_K$, the channel estimates $\hat{A}_{K,K}$ and the received chip level signals $r_K$, and generate preliminary interference reduced chip level signals $\tilde{r}_K$. Interference-reduced bit estimates $\hat{\tilde{b}}_K$ are generated by a first traffic signal de-spreader 36.

In addition to the first SAMIC detector 34, the system 400A further includes a second channel estimator 42, a second SAMIC detector 44 and a second traffic signal de-spreader 46. The second channel estimator 42 receives the preliminary MAI-reduced chip level signals $\tilde{r}_K$ and generates a matrix of second channel estimates $\hat{A}'_{K,K}$. Since the second channel estimates are generated based on preliminary MAI-reduced signals $\tilde{r}_K$ generated by the first SAMIC detector 34, they may be more accurate estimates of the transmission channels. In the system 400A, the first traffic signal de-spreader 36 generates MAI-reduced preliminary bit estimates $\hat{\tilde{b}}_K$ which are provided to the second SAMIC detector 44 along with the second channel estimates $\hat{A}_{K,K}$ generated by the second channel estimator 42. The second SAMIC detector 44 uses the MAI-reduced preliminary bit estimates $\hat{\tilde{b}}_K$ and the second channel estimates $\hat{A}'_{K,K}$ to generate second MAI-reduced chip level signals $\tilde{\tilde{r}}_K$, which are then processed by a second traffic signal de-spreader (correlator/slicer) 46 to provide final MAI-reduced bit estimates $\hat{\tilde{\tilde{b}}}_K$. It will be understood that the above procedure relating to the first and second SAMIC stages may be repeated, in some embodiments, to provide additional SAMIC stages.

Figure 4B:
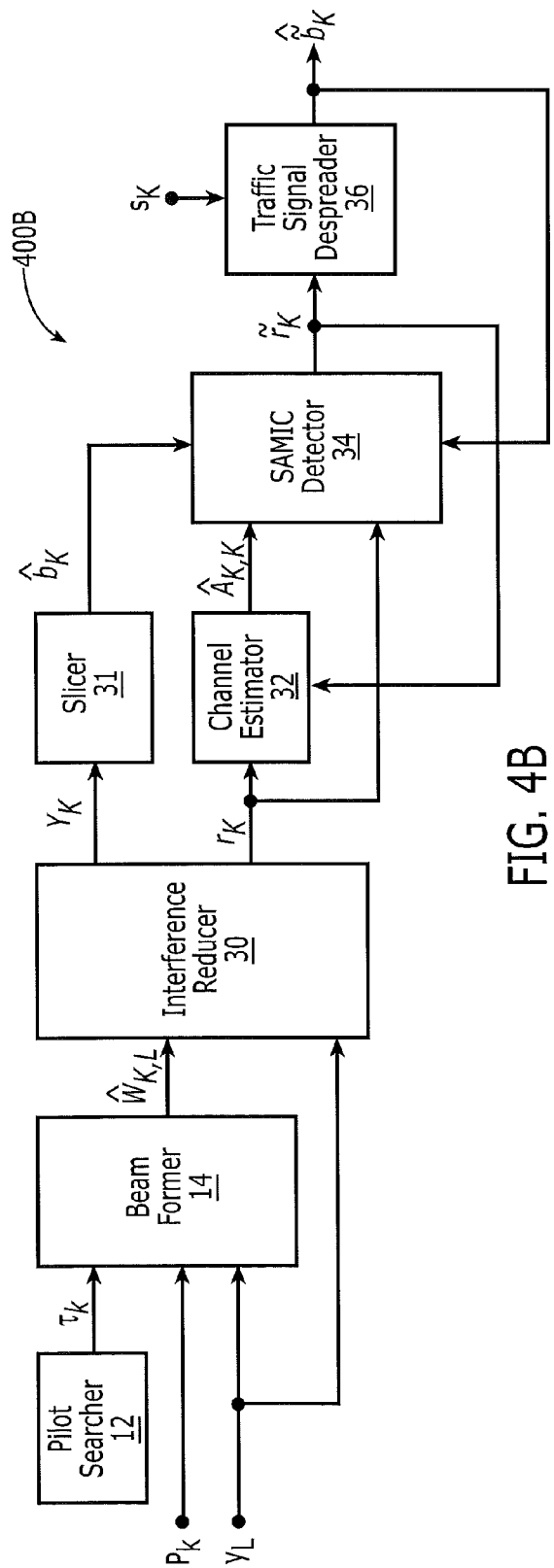

Further embodiments of the invention are illustrated in FIG. 4B which shows a detector 400B. In the detector 400B, multi-level interference reduction using a SAMIC detector is illustrated. As shown therein, a detector 400B may include a single SAMIC detector 34. Multi-level SAMIC detection may be accomplished by feeding the MAI-reduced received chip level signal $\tilde{r}_K$ generated by the SAMIC detector 34 back to the channel estimator 32, and feeding back the MAI-reduced bit estimate $\hat{\tilde{b}}_K$ generated by the traffic signal de-spreader 36 back to the SAMIC detector 34. The MAI-reduced received chip level signal $\tilde{r}_K$ may be fed back to the channel estimator 32 one or more times, and the bit estimate signal $\hat{\tilde{b}}_K$ generated by the traffic signal de-spreader 36 may be fed back to the SAMIC detector 34 one or more times. Each iteration of the feedback loop may generate a subsequent interference reduced chip level signal $\tilde{r}_K$ by the SAMIC detector 34.

Figure 5:
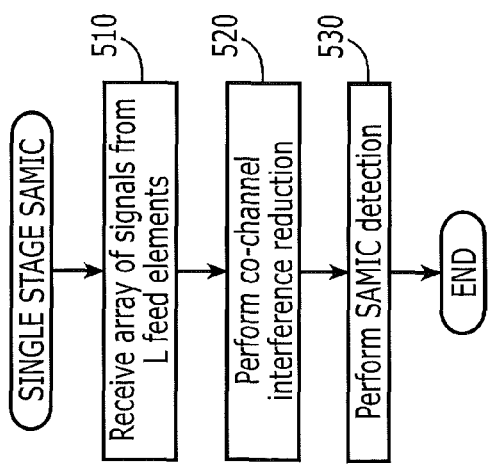

Some embodiments of the invention are illustrated in FIGS. 5-8. As illustrated in the embodiments of FIG. 5, in a process for single stage SAMIC detection, an array of signals is received via L feed elements (block 510). Co-channel interference reduction is performed on the received signals (block 520) to detect signals from K transmitters. Finally, SAMIC detection is performed on the K interference-reduced signals to reduce multiple-access interference in the received signals (block 530).

Figure 6:
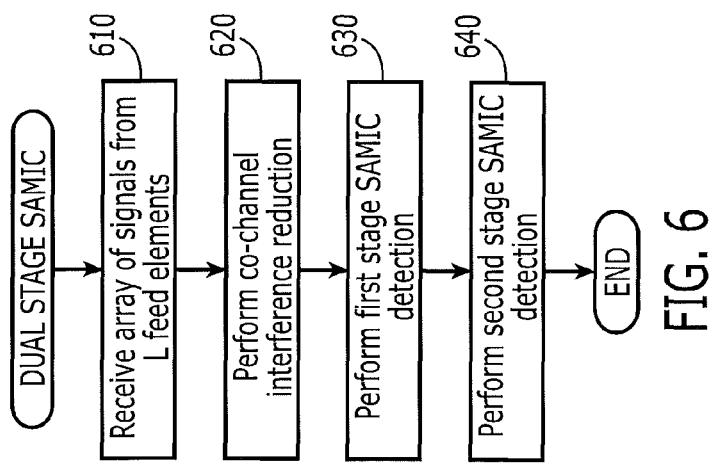

Dual-stage SAMIC detection is illustrated in FIG. 6. As shown therein, an array of signals is received via L feed elements (block 610). Co-channel interference reduction is performed on the received signals (block 620) to detect signals from K transmitters. A first stage of SAMIC detection is performed on the K interference-reduced signals to reduce multiple-access interference in the received signals (block 630). A second stage of SAMIC detection is then performed using the interference-reduced signals as inputs to a second stage SAMIC detector (block 640). Accordingly, the second stage SAMIC detector uses preliminary bit estimates $\hat{\tilde{b}}_K$ from the first stage SAMIC detector and second channel estimates $\hat{A}'_{K,K}$ to generate second MAI-reduced chip level signals $\tilde{\tilde{r}}_K$ which are then processed to provide final (provided there are no additional SAMIC stages) MAI-reduced bit estimates $\hat{\tilde{\tilde{b}}}_K$.

Figure 7:
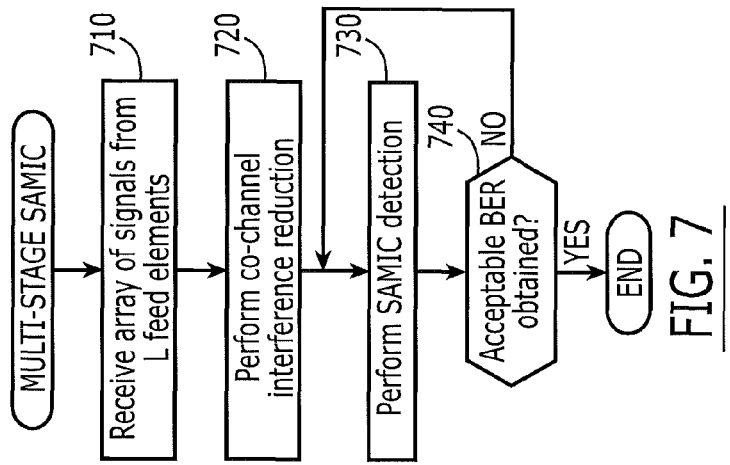
FIGS. 5-8 are flowcharts illustrating systems and methods for reducing interference according to embodiments of the invention.

Multi-stage SAMIC detection is illustrated in the flowchart of FIG. 7. As in single- and dual-stage SAMIC detection, an array of signals is received via L feed elements (block 710), and co-channel interference reduction is performed on the received signals (block 720) to detect signals from K transmitters. SAMIC detection is performed on the MAI-reduced signals to provide interference-reduced bit estimates (block 730). A bit error rate (BER) is calculated and compared to a threshold (block 740). If the calculated bit error rate is acceptable, the calculated bit estimates are used. If not, a subsequent stage of SAMIC detection is performed using the interference-reduced bit estimates as inputs. The process may repeat until a predetermined exit criterion is met. For example, the process may repeat until an acceptable BER is obtained, a maximum number of iterations has occurred, the BER has converged, or some other criterion is met.

Figure 8:
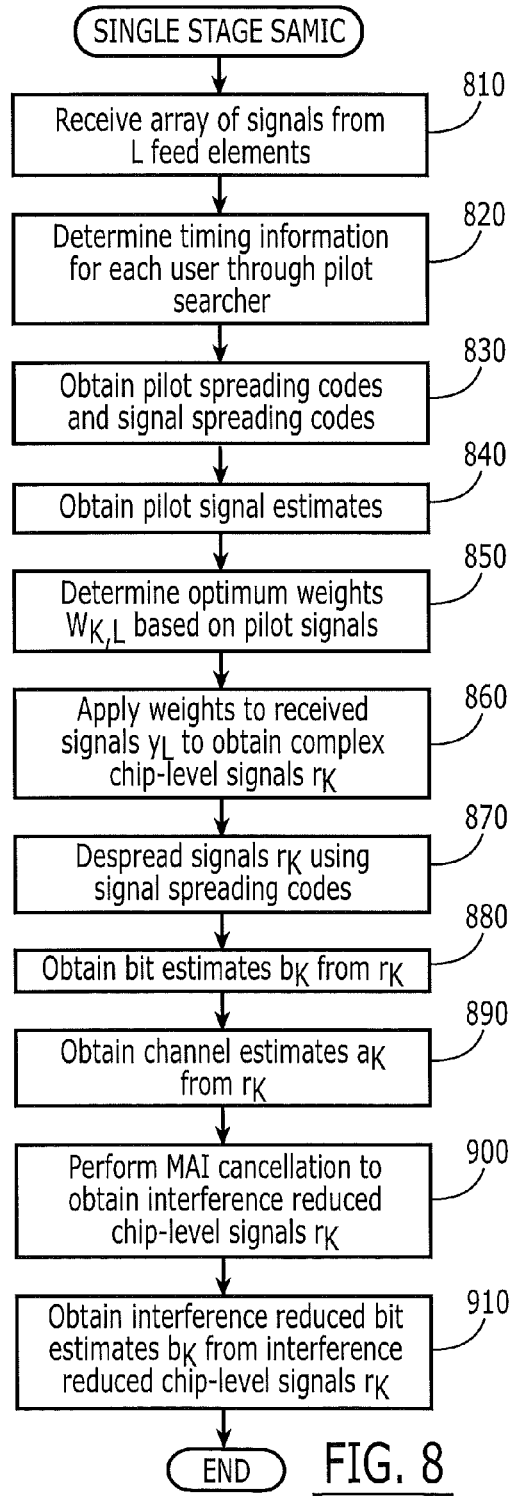

Single stage SAMIC detection is illustrated in more detail in FIG. 8. As shown therein, an array of signals is received via L feed elements of an antenna system (block 810). Timing information for each of the K users is determined by a pilot searcher (block 820). Pilot spreading codes and signal spreading codes for each of the K users are obtained (block 830). It will be understood that in some cases, the pilot spreading codes and/or signal spreading codes may be known in advance and need not be dynamically obtained. Furthermore, the pilot spreading codes and/or signal spreading codes may be stored in an interference reducer, a receiver, and/or at a remote database. Thus, obtaining the spreading codes may include retrieving the spreading codes from a local and/or remote database.

Once the pilot signal spreading codes are known, pilot signal estimates are obtained (block 840). In particular, K pilot signal estimates (one for each of the K transmitters) may be obtained for each of the L antenna feed elements. In some cases, the pilot signal estimates may be averaged over Q periods in order to increase the signal-to-noise ratio of the pilot signals. The pilot signal estimates may be spatially combined to provide a single pilot signal estimate for each of the K transmitters. Based on the pilot signal estimates, optimum weights $\hat{W}_{K,L}$ are determined (block 850). In some cases, the weights $\hat{W}_{K,L}$ may be selected to provide an LMS error of pilot signal estimates. The calculated weights are applied to the L received signals to obtain K complex received chip level signals $r_K$ (block 860), which are then de-spread using the known signal spreading codes (block 870).

Once the received chip level signals $r_K$ are detected, bit estimates are obtained (block 880). Channel estimates $\hat{A}_{K,K}$ may also be obtained from the received chip level signals $r_K$ (block 890). MAI interference reduction may then be performed using a SAMIC detector based on the received chip level signals $r_K$, the interference-reduced bit estimates $\hat{b}_K$, and the channel estimates $\hat{A}_{K,K}$ (block 900). The resulting MAI-reduced chip level signals $\tilde{r}_K$ may be used to obtain second bit estimates $\hat{\tilde{b}}_K$ (block 910).

Methods and systems according to some embodiments of the invention will now be described in greater detail. The following description is organized as follows. In Section 1, a system model and a problem of interest are formulated. A pilot-based Minimum Mean-Squared Error (MMSE) interference canceling single-user detector is then developed in Section 2. In Section 3, a SAMIC multi-user detector according to some embodiments of the invention is presented. In Section 4, simulation results are provided illustrating the performance of the interference cancellation algorithm by using a representative satellite system design and an ATN footprint over CONUS.

1. System Model

Figure 9:
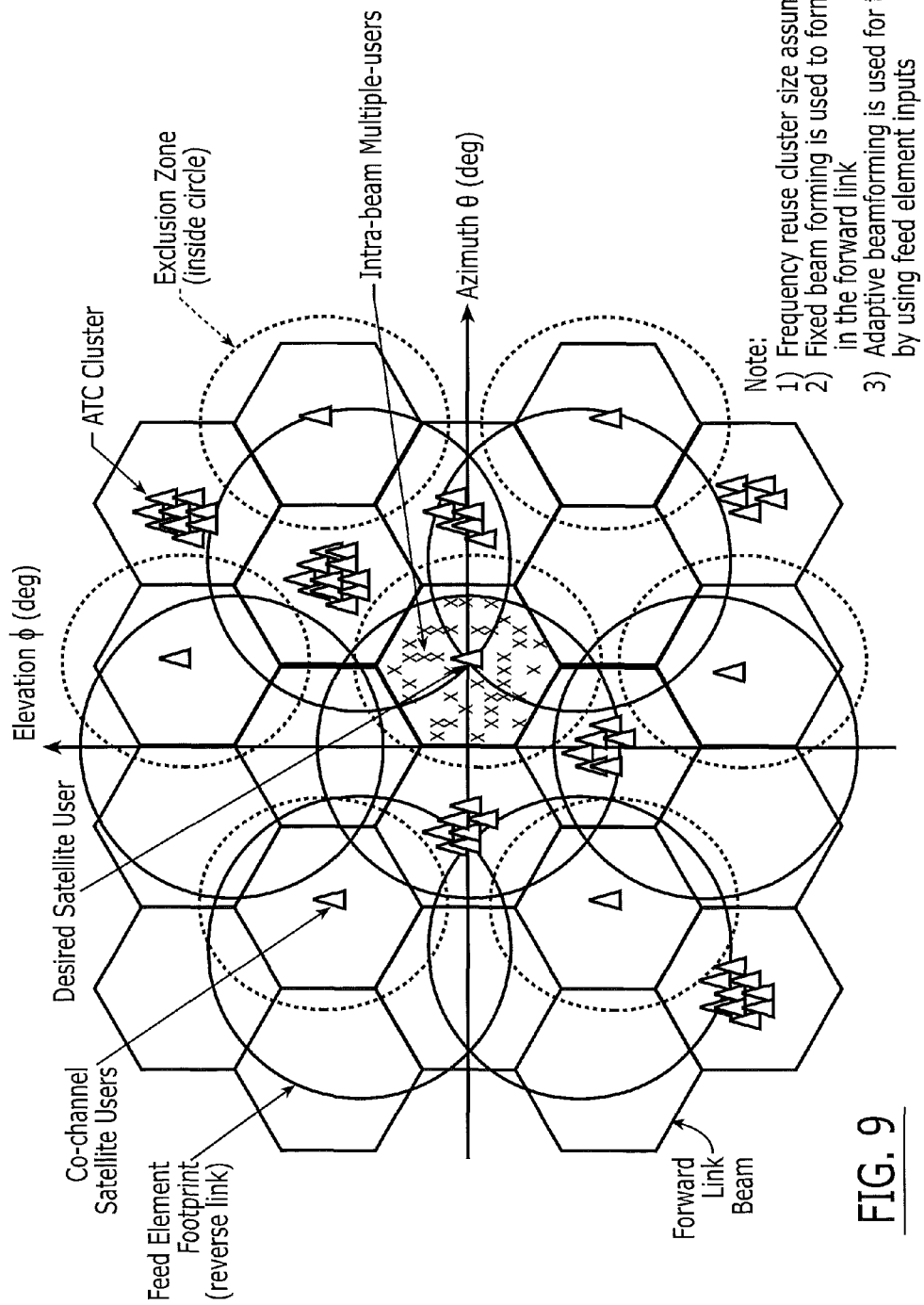
FIG. 9 illustrates satellite spot beams, some of which include ATC infrastructure configurations.

In the satellite system model discussed herein, the satellite forward links are assumed to form fixed spot beams. Each of the fixed forward link spot beams is analogous to a terrestrial cell, though much bigger geographically. A three-cell frequency reuse cluster size is assumed, as depicted in FIG. 9. As shown in FIG. 9, a number of ATC towers may exist within a spot beam. The ATCs and the wireless terminals communicating therewith may use frequencies of adjacent spot beams in order to increase or maximize the isolation between the terrestrial and satellite reuse of the available satellite band frequencies. FIG. 9 also shows "exclusion" zones (dotted circles) inside of which the frequencies of the encircled satellite cell may not be made available to any ATC contained therein. FIG. 9 also illustrates the typically larger geographic footprints of return-link satellite antenna feed elements. The signals provided to the satellite gateway by such return-link antenna feed elements may be used to perform adaptive (return-link) signal processing comprising beam-forming, interference cancellation, channel estimation and multi-user detection.

Figure 10:
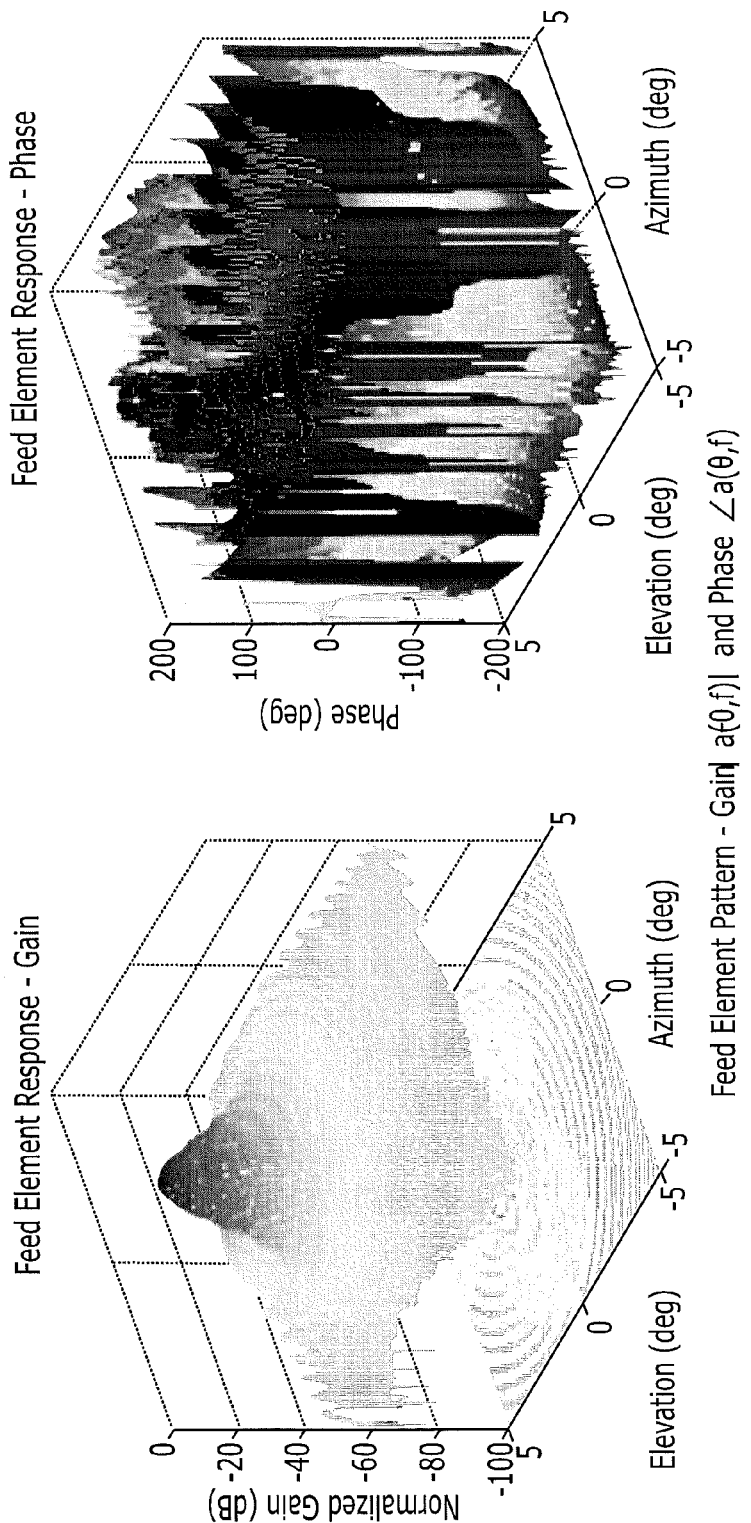
FIG. 10 illustrates a gain and phase pattern of an antenna feed element.

The satellite communications channel is assumed to be Rician flat-fading, however, other channel models may also be assumed. For the $k^{th}$ return-link satellite user, the vector channel impulse response across L feed elements may be written as $$h_k(\tau,t)=a_k(\theta_k,\phi_k)\beta_k(t)\delta(\tau-\tau_k) \quad (1)$$

where $$a_k(\theta_k,\phi_k)=[a_{k,1}(\theta_k,\phi_k),\ldots a_{k,L}(\theta_k,\phi_k)]^T \in C^{L \times 1} \quad (2)$$

is the satellite return-link antenna feed element complex response vector for the $k^{th}$ user located at elevation angle $\theta_k$ and azimuth angle $\phi_k$. A typical 3-D complex gain plot of a feed element is shown in FIG. 10. The quantity $$\beta_k(t)=\rho_k\exp\{j(2\pi f_k t+\psi_k)\} \quad (3)$$

is the return-link path gain for the $k^{th}$ user, $f_k$ is the Doppler shift, $\psi_k$ is a fixed phase shift, and $\tau_k$ is a time delay of the $k^{th}$ user.

With the model of vector channel impulse response, for a general multi-user system with a total of K users, the data vector of the L feed element output can be expressed as $$y(t) = \sum_{k=1}^{K} [g_s b_k(t) s_k(t) + g_p p_k(t)] * h_k(\tau, t) + \qquad (4)$$

$$\sum_{n=1}^{N} a_n(\theta_n, \varphi_n) g_n v_n(t) + n(t) \in C^{L \times 1}$$

$$= \sum_{k=1}^{K} [a_k(\theta_k, \varphi_k) \beta_k(t) g_s b_k(t-\tau_k) s_k(t-\tau_k) +$$

$$a_k(\theta_k, \varphi_k) \beta_k(t) g_p p_k(t-\tau_k)] \leftarrow (K \text{ users}) +$$

$$\sum_{n=1}^{N} a_n(\theta_n, \varphi_n) g_n v_n(t) \leftarrow (N ATC \text{ interferers}) +$$

$$n(t) \leftarrow (\text{Gaussian thermal noise})$$

where $b_k(t)$ and $s_k(t)$ are the $k^{th}$ user's information bit and spreading sequence, respectively, with M chips/bit; $p_k(t)$ is the $k^{th}$ user's pilot chip sequence; and $g_s$ and $g_p$ are the amplitudes of the traffic data signal and the pilot signal, respectively (same for all K users). The quantity $v_n(t)$ denotes the aggregate interference signal of the $n^{th}$ ATC service area modeled as complex Gaussian noise, and $g_n$ is an associated amplitude. Finally, $n(t) \in C^{L \times 1}$ represents an additive complex Gaussian noise vector.

For the $l^{th}$ antenna feed element, if matched filtering is performed on the received signal by correlating the received signal with the chip waveform for each chip interval, the received signal in the $l^{th}$ element can be written as:

$$y_l = \qquad (5)$$

$$\sum_{k=1}^{K} [a_{k,l}(\theta_k, \varphi_k) \beta_k (g_s b_k s_k + g_p p_k)] + \sum_{n=1}^{N} a_{n,l}(\theta_n, \varphi_n) g_n v_n + n_l \in C^{M \times l}$$

where $s_k$ and $p_k$ are the chip matched-filter M-vectors corresponding to $s_k(t-T_k)$ and $p_k(t-T_k)$ respectively. It is assumed that the spreading codes for the signal and pilot are normalized to have unit energy: $\|s_k\|=1$, $\|p_k\|=1$, and that they are orthogonal for a given user (i.e., $\langle s_k, p_k \rangle = 0$); $v_n$ is the complex M-vector Gaussian noise corresponding to the $n^{th}$ ATC interference, and $n_l$ is the complex M-vector corresponding to the Gaussian noise at the $l^{th}$ antenna feed element.

By introducing some new matrix notation, Equation (5) may be rewritten as:

$$y_l = SA_l b g_s + PA_l 1_K g_p + VA_l^{(n)} 1_N g_n + n_l \qquad (6)$$

where:
S=$[s_1 \, s_2 \ldots s_K] \in C^{M \times K}$≡data spreading code matrix
$A_{l=diag\{a_{1,l}(\theta_1,\phi_1)\beta_1 \ldots a_{K,l}(\theta_K,\phi_K)\beta_K\}} \in C^{K \times K}$≡$l^{th}$ feed element/channel matrix
b=$[b_1 \ldots b_K]^T \in \mathcal{R}^{K \times 1}$≡K-vector of data bits
P=$[p_1 \, p_2 \ldots p_K] \in C^{M \times K}$≡pilot spreading code matrix
$1_u = [1 \ldots 1]^T \in \mathcal{R}^{u \times 1}$≡u-vector of ones
V=$[v_1 \, v_2 \ldots v_N] \in C^{M \times N}$≡ATC interference matrix
$A_l^{(n)}$=diag$\{a_{1,l}(\theta_1,\phi_1) \ldots a_{N,l}(\theta_N,\phi_N)\} \in C^{N \times N}$≡$l^{th}$ feed element matrix for N ATCs The noise vector $n_l \in C^{M \times 1}$ is a zero-mean complex Gaussian vector whose distribution can be written in terms of real and imaginary components:

$$\begin{bmatrix} \text{Re}(n_l) \\ \text{Im}(n_l) \end{bmatrix} \sim \eta \left\{ \begin{bmatrix} 0_M \\ 0_M \end{bmatrix}, \sigma^2 \begin{bmatrix} I_M & 0_{M \times M} \\ 0_{M \times M} & I_M \end{bmatrix} \right\} \qquad (7)$$

Real and imaginary components for matrices and vectors are defined as Re(X)=(X+X*)/2 and Im(X)=(X−X*)/2 where "*" denotes complex conjugate.

The ATC interference vector $v_n \in C^{M \times 1}$ (for the $n^{th}$ ATC, n=1, 2, . . . N) is modeled as a zero-mean complex Gaussian vector. Assuming each of all N ATCs has the same power (variance=$\lambda^2$), the distribution of the ATC interference vector may be written as:

$$\begin{bmatrix} \text{Re}(v_n) \\ \text{Im}(v_n) \end{bmatrix} \sim \eta \left\{ \begin{bmatrix} 0_M \\ 0_M \end{bmatrix}, \lambda^2 \begin{bmatrix} I_M & 0_{M \times M} \\ 0_{M \times M} & I_M \end{bmatrix} \right\} \qquad (8)$$

The problem of interest herein is to estimate $b_k$ (k=1, 2, . . . K) from the $y_l$ (l=1, 2, . . . L).

2. Pilot based MMSE Interference Cancellation

This section describes how estimates for the combining weights may be obtained subject to an error reducing criterion such as, for example, a minimum mean squared error (MMSE) criterion in the cdma2000 satellite return link according to some embodiments of the invention. Since the MMSE criterion is applied to the received signal with ATC interference, the resulting solution may be optimal for ATC interference cancellation in the sense of minimum mean squared error.

2.1 Pilot Spatial Channel MMSE Estimator

Let $z_l^{(p)}$ be the K-complex vector output from a bank of K filters matched to users' delayed pilot signal $p_1 \, p_2 \ldots p_K$, whose input $(y_L)$ is the received baseband signal at feed element l. The timing estimate for each of these users is assumed to be obtained though a pilot searcher. For the $l^{th}$ element, the K-complex vector output from the bank of K matched filters is the de-spread version of received pilot signals, which is given by $$z_l^{(p)} = P^H y_l = R^{(p)} A_l 1_K g_p + R^{(ps)} A_l b g_s + R^{(pv)} A_n 1_N g_n + P^H n_l \in C^{K \times 1} \qquad (9)$$

where $(\bullet)^H$ denotes the complex conjugate transpose, and
$R^{(p)} = P^H P \in C^{K \times K}$≡pilot correlation matrix with ones along the main diagonal
$R^{(ps)} = P^H S \in C^{K \times K}$≡pilot/signal cross-correlation matrix with zeros along main diagonal
$R^{(pv)} = P^H V \in C^{K \times N}$≡pilot/ATC cross-correlation matrix From Equation (9), the normalized de-spread pilot channel output vector may be derived as:

$$d_l^{(p)} = \frac{z_l^{(p)}}{g_p} = \underset{|(\text{desired})|}{A 1_K} + \underset{(MAI)}{(R^{(p)} - I_k) A 1_K} + \qquad (10)$$

$$\underset{|ATC \text{ interference}|Noise|}{R^{(ps)} A b \frac{g_s}{g_p} + R^{(pv)} A_n 1_N \frac{g_n}{g_p} + \frac{1}{g_p} P^H n_l}$$

Assuming the feed element and channel responses do not change over a period of Q symbols, the pilot estimate can be improved by averaging Q successive instances of $d_l^{(p)}$. In the simulation study, the following approximation for the averaged estimate using long codes is used:

$$\hat{d}_1^{(p)} = \frac{1}{Qg_p} \sum_{q=1}^{Q} z_{1,q}^{(p)} \qquad (11)$$

$$= A_l 1_K + \frac{1}{\sqrt{Q}} (R^{(p)} - I_k) A_l 1_K + \frac{1}{\sqrt{Q}} R^{(ps)} A_l b \frac{g_s}{g_p} +$$

$$\frac{1}{\sqrt{Q}} R^{(pv)} A_n 1_N \frac{g_n}{g_p} + \bar{n}_1$$

where the complex Gaussian noise term has distribution given as:

$$\bar{n}_1 \sim \eta\{0_K; g_p^{(-2)} \sigma^2 R^{(p)}/Q\}.$$

From Equation (11) it may be seen that averaging the pilot signal estimates over a window of Q symbols reduces the variances of MAI, ATC interference and noise by a factor of Q. Another interesting aspect is that if short codes are used, there would be no $1/\sqrt{Q}$ factor for the pilot interference term $(R^{(p)}-I_k)A1_K$ (because the values remain constant over window. Therefore, the pilot estimates suffer in the long code case. But this potential disadvantage can be removed by introducing the $1/\sqrt{Q}$ factor with known pilot sequence.

Since the pilot signal estimates contain ATC interference and MAI, the next issue is to mitigate ATC interference by taking advantage of multiple feed elements and known pilot signals (removing MAI will be taken care of later). If the estimate of the $k^{th}$ user's pilot vector across L feed elements is defined as $$y_k^{(p)} = [\hat{d}_1^{(p)}(k) \hat{d}_2^{(p)}(k) \ldots \hat{d}_L^{(p)}(k)]^T \in C^{L \times 1} \qquad (12)$$

where $\hat{d}_l^{(p)}$ is defined in (10), then the pilot-based MMSE interference cancellation criterion may be derived.

The MMSE criterion attempts to minimize the difference between the output of the beam former and the desired user's response. More specifically, for the $k^{th}$ user, the weight is given as:

$$w_k = \underset{w_k}{\operatorname{argmin}}\{J(w_k)\} \qquad (13)$$

$$= \underset{w_k}{\operatorname{argmin}}\{E[|w_k^H y_k^{(p)} - d_k|^2]\}$$

$$= \sigma_d^2 - w_k^H r_k - r_k^H w_k + w_k^H R_k w_k$$

where $y_k^{(p)}$ is the array output, $d_k$ is the desired response, $\sigma_d^2 = E\{|d_k|^2\}$, $$R_k = E[y_k^{(p)}(y_k^{(p)})^H] \qquad (14)$$

is the spatial covariance matrix for the $k^{th}$ user and $$r_k = E[y_k^{(p)} d_k^*] \qquad (15)$$

is the cross-correlation vector between the input data and the desired $d_k$. The optimal solution that minimizes the MSE is given by $$w_k = R_k^{-1} r_k \qquad (16)$$

The MMSE interference canceller can be implemented, for example, with a computationally efficient Least Mean Square (LMS) adaptive algorithm. The gradient vector of the error surface is $$\nabla_{w_k(n)} = \frac{\partial}{\partial w_k} J(w_k)\bigg|_{w_k = w_k(n)} = -2r_k + 2R_k w_k(n) \qquad (17)$$

Adjusting the weight vector in the steepest descent gradient direction leads to an LMS adaptive algorithm that is given by:

$$w_k(n+1) = w_k(n) + \mu y_k^{(p)}(n) e_k^*(n) \in C^{L \times 1} \qquad (18)$$

where $e_k(n) = d_k(n) - w_k^H(n) y_k^{(p)}(n)$ is the error signal, and $\mu$ is the step-size coefficient that should be chosen as $$0 < \mu < \frac{1}{\operatorname{Trace}[R_k]}.$$

The convergence rate is governed by the eigenvalue spread of $R_k$.

Applying the weight $\hat{w}_k$ to the $k^{th}$ user's pilot vector $y_k^{(p)}$ yields an estimate of the pilot symbol after adaptive beam forming for ATC interference cancellation as follows:

$$\hat{p}_{(symb)_k} = \hat{w}_k^H y_k^{(p)} = \hat{w}_k^H [\hat{d}_1^{(p)}(k) \hat{d}_2^{(p)}(k) \ldots \hat{d}_L^{(p)}(k)]^T = \sum_{l=1}^{L} \hat{w}_k^H(l) \hat{d}_l^{(p)}(k) \qquad (19)$$

2.2. Single-user Traffic Signal Detector

The resulting weight vector $\hat{w}_k$ for the $k^{th}$ user may represent a spatial MMSE solution that reduces the ATC co-channel interference plus thermal noise based on the pilot channel. Since the pilot signal and traffic data signal are received through the same feed element and propagation channel, the estimated weight $\hat{w}_k$ may be applied to the traffic data channel to perform the interference cancellation as well. As shown in FIG. 11, the interference reducer is a generalization of a bank of K correlators 1126 (one for each user) per feed element, followed by a spatial combiner 1128 for interference cancellation.

The K correlators are matched to the spreading code $s_1$ $s_2 \ldots s_K$. At feed element l, the resulting K vector output is given as:

$$z_l^{(s)} = S^H y_l = R^{(s)} A_l b g_s + R^{(sp)} A_l 1_K g_p + R^{(sv)} A_l^{(n)} 1_N g_n + S^H n_l \in C^{K \times 1} \qquad (20)$$

where
$R^{(s)} = S^H S \in C^{K \times K} \equiv$ traffic signal correlation matrix with ones along the main diagonal
$R^{(sp)} = S^H P \in C^{K \times K} \equiv$ traffic signal and pilot cross-correlation matrix with zeros along the main diagonal
$R^{(sv)} = S^H V \in C^{K \times N} \equiv$ traffic signal and ATC cross-correlation matrix The correlator output for the $k^{th}$ user at feed element l is weighted by $(\hat{w}_k^H)_l$. By defining the interference cancellation weighting matrix $$\hat{W}_l = \operatorname{diag}\{(\hat{w}_1)_l (\hat{w}_2)_l \ldots (\hat{w}_K)_l\} \in C^{K \times K} \qquad (21)$$

where $(\bullet)_l$ denotes the $l^{th}$ element of a vector, the weighted and combined output for all K users may be derived as follows:

$$Y = \operatorname{Re}\left(\sum_{l=1}^{L} \hat{W}_l^H z_l^{(s)}\right) \qquad (22)$$

-continued $$= \text{Re}\left(\sum_{l=1}^{L} \hat{W}_l^H R^{(s)} A_l b g_s + \sum_{l=1}^{L} \hat{W}_l^H R^{(sp)} A_l 1_K g_p + \sum_{l=1}^{L} \hat{W}_l^H R^{(sv)} A_l^{(n)} 1_N g_n + \sum_{l=1}^{L} \hat{W}_l^H S^H n_l\right)$$

To simplify the expression, the following definitions may be provided:

$$X^{(s)} \equiv \text{Re}\left(\sum_{l=1}^{L} \hat{W}_l^H R^{(s)} A_l\right) \quad (23)$$

$$X^{(sp)} \equiv \text{Re}\left(\sum_{l=1}^{L} \hat{W}_l^H R^{(sp)} A_l\right) \quad (24)$$

$$X^{(sv)} \equiv \text{Re}\left(\sum_{l=1}^{L} \hat{W}_l^H R^{(sv)} A_l^{(n)}\right) \quad (25)$$

$$n \equiv \text{Re}\left(\sum_{l=1}^{L} \hat{W}_l^H S^H n_l\right) \quad (26)$$

Then, equation (22) can be rewritten as $$Y = \text{Re}\left(\sum_{l=1}^{L} \hat{W}_l^H z_l^{(s)}\right) = X^{(s)} b g_s + X^{(sp)} 1_K g_p + X^{(sv)} 1_N g_n + n \in \mathcal{R}^{K \times 1} \quad (27)$$

and the single-user data symbol estimate for the $k^{th}$ user is given by the algebraic sign of the $k^{th}$ component as follows:

$$\hat{b}_k = \text{sgn}(Y_k) \quad (28)$$

Note that $n \sim \eta(0_k, \sigma^2 \hat{X}^{(n)})$, where $$\hat{X}^{(n)} \equiv \text{Re}\left(\sum_{l=1}^{L} \hat{W}_l^H R^{(s)} \hat{W}_l\right),$$

and the bit error rate (BER) for the $k^{th}$ user is given by $$P_k(\sigma) = Q\left(\frac{(X^{(s)} I_k b g_s + X^{(sp)} 1_K g_p)_k}{g_n (X^{(sv)} 1_N)_k + \sigma \sqrt{(\hat{X}^{(n)})_k}}\right) \quad (29)$$

As can be seen, the BER is dependent on other user's bits, number and levels of ATC interference, the feed element/channel coefficients, and interference cancellation weight estimates.

The single-user detector that has been derived above is an ATC interference cancellation version of a single-user detector. For cases involving more than one users (K>1), the single-user detector will generally suffer from multiple access interference from other users. Mathematically, this MAI results in non-zero components off the main diagonal of the cross-correlation matrix $R^{(s)}$. Further embodiments of the invention, as derived below, provide a multi-user detection algorithm to remove MAI by taking advantage of formed-beam/channel estimates that become available from the pilot channel after the cancellation of ATC-induced co-channel interference.

3. Multi-User Detection in Conjunction with ATC Interference Cancellation

ATC induced interference includes inter-beam, co-channel interference that may be effectively addressed by an adaptive interference reducing detector. Unlike ATC interference, multiple access interference (MAI) includes intra-beam interference that may not be removed effectively by spatial-only processing techniques. Some embodiments of the invention provide algorithms for the efficient reduction of MAI after ATC interference reduction. In performing ATC interference reduction and single-user detection, timing information and formed-beam/channel estimates are obtained. Thus, it is possible to reconstruct the MAI and subtract it from the signal after beam-forming.

Assuming for now that for the $k^{th}$ user, after beam-forming, the formed-beam/channel estimates ($\hat{\alpha}_{k,j}, j \neq k$) are available and considering parallel interference cancellation for the $k^{th}$ user, the MAI due to all interferers (j=1 . . . K, j≠k) may be reconstructed by using their corresponding formed beam/channel estimates ($\hat{\alpha}_{k,j}, j \neq k$) and bit estimates ($\hat{b}_j, j \neq k$). The reconstructed MAI may be subtracted from the beam-formed signal $r_k$. The chip level beam-formed signal can be obtained by applying the weight $\hat{w}_k^H$ in (18) to $y_l$ in (6) as follows:

$$r_k = \sum_{l=1}^{L} (\hat{w}_k^H)_l y_l \in C^{M \times 1} \quad (30)$$

$$= \sum_{l=1}^{L} (\hat{w}_k^H)_l S A_l b g_s + \sum_{l=1}^{L} (\hat{w}_k^H)_l P A_l 1_K g_p + \sum_{l=1}^{L} (\hat{w}_k^H)_l V A_l^{(n)} 1_N g_n + \sum_{l=1}^{L} (\hat{w}_k^H)_l n_l$$

$$= S \tilde{A}_k b g_s + P \tilde{A}_k 1_K g_p + V \tilde{A}_k^{(n)} 1_N g_n + \tilde{n}_k$$

where $$\tilde{A}_k = \sum_{l=1}^{L} (\hat{w}_k^H)_l A_l \quad (31)$$

$$\tilde{A}_k^{(n)} = \sum_{l=1}^{L} (\hat{w}_k^H)_l A_l^{(n)} \quad (32)$$

$$\tilde{n}_k = \sum_{l=1}^{L} (\hat{w}_k^H)_l n_l \quad (33)$$

Note that this beam-formed signal for the $k^{th}$ user is just the ATC cancelled signal, but still has MAI which is contributed from other K−1 co-beam/co-frequency users.

As shown in FIG. 12, the interference canceller for the $k^{th}$ user is a spatial combiner 1238 which uses weights $\hat{w}_k$ as in (30) followed by the correlator 1240 which correlates the received signals $r_k$ with the spreading codes $s_k$. The interference cancelled bit estimate can be obtained by $$\hat{b}_k = \text{Sgn}(x_k^{(s)}) \quad (34)$$

where $$x_k^{(s)} = \text{Re}(s_k^H r_k) \quad (35)$$

3.1. Formed-beam/Channel Estimation

In order to mitigate the MAI, it is first desirable to estimate the formed-beam/channel for each user using the pilot signal. The beam-formed signal $r_k$ may be applied to a bank of K filters matched to users' delayed pilot signals $p_1, p_2, \ldots, p_K$ (as follows:

$$\hat{z}_k^{(p)} = P^H r_k = R^{(p)} \tilde{A}_k 1_K g_p + R^{(ps)} \tilde{A}_k b g_s + R^{(pv)} \tilde{A}_k^{(n)} 1_N g_n + P^H \tilde{n}_k \in C^{K \times 1} \quad (36)$$

If the K-vector $\hat{\alpha}_k = [\hat{\alpha}_{k,1}, \hat{\alpha}_{k,2}, \ldots, \hat{\alpha}_{k,K}]^T \in C^{K \times 1}$ is defined as the formed-beam/channel estimates for the $k^{th}$ user, then the $\hat{\alpha}_k$ can be obtained by normalizing $\hat{z}_k^{(p)}$ by the pilot amplitude:

$$\hat{\alpha}_k = \frac{\hat{z}_k^{(p)}}{g_p} = \tilde{A}_k 1_K + (R^{(p)} - I_K) \tilde{A}_k 1_K + R^{(ps)} \tilde{A}_k b \frac{g_s}{g_p} + R^{(pv)} \tilde{A}_k^{(n)} 1_N \frac{g_n}{g_p} + \frac{1}{g_p} P^H \tilde{n}_k \quad (37)$$

The formed-beam/channel estimates can be improved by integrating over a period of Q pilot symbols so that the residual ATC interference and MAI as well as the noise are low-pass filtered:

$$\hat{\alpha}_k = \frac{1}{Q g_p} \sum_{q=1}^{Q} \hat{z}_{k,q}^{(p)} \quad (38)$$

$$= \tilde{A}_k 1_K + \frac{1}{\sqrt{Q}} (R^{(p)} - I_K) \tilde{A}_k 1_K + \frac{1}{\sqrt{Q}} R^{(ps)} \tilde{A}_k b \frac{g_s}{g_p} + \frac{1}{\sqrt{Q}} R^{(pv)} \tilde{A}_k^{(n)} 1_N \frac{g_n}{g_p} + \frac{1}{\sqrt{Q} g_p} P^H \tilde{n}_k$$

With the formed-beam/channel estimates for the $k^{th}$ user ($\hat{\alpha}_{k,j}, j \neq k$) and bit estimates ($\hat{b}_j, j \neq k$) as well as spreading chip vector ($s_j, j \neq k$), the MAI term may be reconstructed for interference cancellation.

3.2. Sequential ATC and MAI Interference Cancellation (SAMIC) Detector

A sequential ATC and MAI Interference Cancellation (SAMIC) detector that may be configured to reduce interference on a set of multiple access signals, according to embodiments of the invention, is based at least partially on a realization that MAI cancellation may be more effective following a reduction of ATC-induced co-channel (and/or non-co-channel) interference and/or other (non ATC-induced) interference that is independent of the set of multiple access signals. Instead of relying on detecting a final information associated with a $k^{th}$ multiple access user on the interference reduced signal $r_k$, the SAMIC detector detects the final information associated with the $k^{th}$ multiple access user based on a further reduction of interference on the interference reduced signal, obtained by subtracting an estimate of MAI from the interference reduced signal as illustrated by the formula below:

$$\tilde{r}_k = r_k - \sum_{j=1, j \neq k}^{K} \hat{\alpha}_{k,j} s_j g_s \hat{b}_j \in C^{M \times l} \quad (k = 1, \ldots, K) \quad (39)$$

where the channel estimates $\hat{\alpha}_k$ are obtained as in equation (38) from the pilot channel following interference reduction (e.g., following stage 1238 in FIG. 12, at stage 1232), and the bit estimates are obtained as in equation (34) following interference reduction (e.g., following stage 1238 in FIG. 12, at stage 1218). Submitting $\hat{\alpha}_k$ and $\hat{b}_j$, $s_j$ ($j \neq k$) to equation (39) yields $\tilde{r}_k$. The MAI-reduced $\tilde{r}_k$ is provided to a correlator that is matched to the spreading code $s_k$. Thus, the maximum-likelihood detected signal for the $k^{th}$ user is as follows:

$$s_k^H \tilde{r}_k = \quad (40)$$

$$s_k^H S \tilde{A}_k b g_s + s_k^H P \tilde{A}_k 1_K g_p + s_k^H V \tilde{A}_k^{(n)} 1_N g_n + \bar{n}_k - \sum_{j=1, j \neq k}^{K} \hat{\alpha}_{k,j} \rho_{k,j} g_s \hat{b}_j$$

where $$\rho_{k,j} = s_k^H s_j, \quad (k \neq j) \quad (41)$$

$$\bar{n}_k = s_k^H \tilde{n}_k = s_k^H \sum_{l=1}^{L} (\hat{w}_k^H)_l n_l \quad (42)$$

The slicer input provided by the SAMIC detector is given as:

$$\tilde{x}_k^{(s)} = \text{Re}(s_k^H \tilde{r}_k) = \gamma_k g_s + \varepsilon_k g_p + v_k g_n + \tilde{n}_k - \delta_k g_s \quad (43)$$

where $$\gamma_k = \text{Re}(s_k^H S \tilde{A}_k b)$$

$$\varepsilon_k = \text{Re}(s_k^H P \tilde{A}_k 1_K) \quad (44)$$

$$v_k = \text{Re}(s_k^H V \tilde{A}_k^{(n)} 1_N) \quad (45)$$

$$\delta_k = \text{Re}\left(\sum_{j=1, j \neq k}^{K} \hat{\alpha}_{k,j} \rho_{k,j} \hat{b}_j\right) \quad (46)$$

$$\tilde{n}_k = \text{Re}(\bar{n}_k) \quad (47)$$

The final decision for the interference cancelled symbol/bit is the output of the slicer, namely:

$$\hat{b}_k = \text{sgn}(\tilde{x}_k^{(s)}) \quad (48)$$

Assuming the noise term has the statistics distribution: $\tilde{n}_k \sim \eta(0, \|\hat{w}_k\|^2 \sigma^2)$, the final BER for the $k^{th}$ user is given by $$P_k(\sigma) = Q\left[\frac{|\gamma_k g_s + \varepsilon_k g_p - \delta_k g_s|}{\sqrt{\sigma^2 \|\hat{w}_k\|^2 + g_n \text{Var}(v_k)}}\right] \quad (49)$$

4. Simulation Examples

Figure 13:
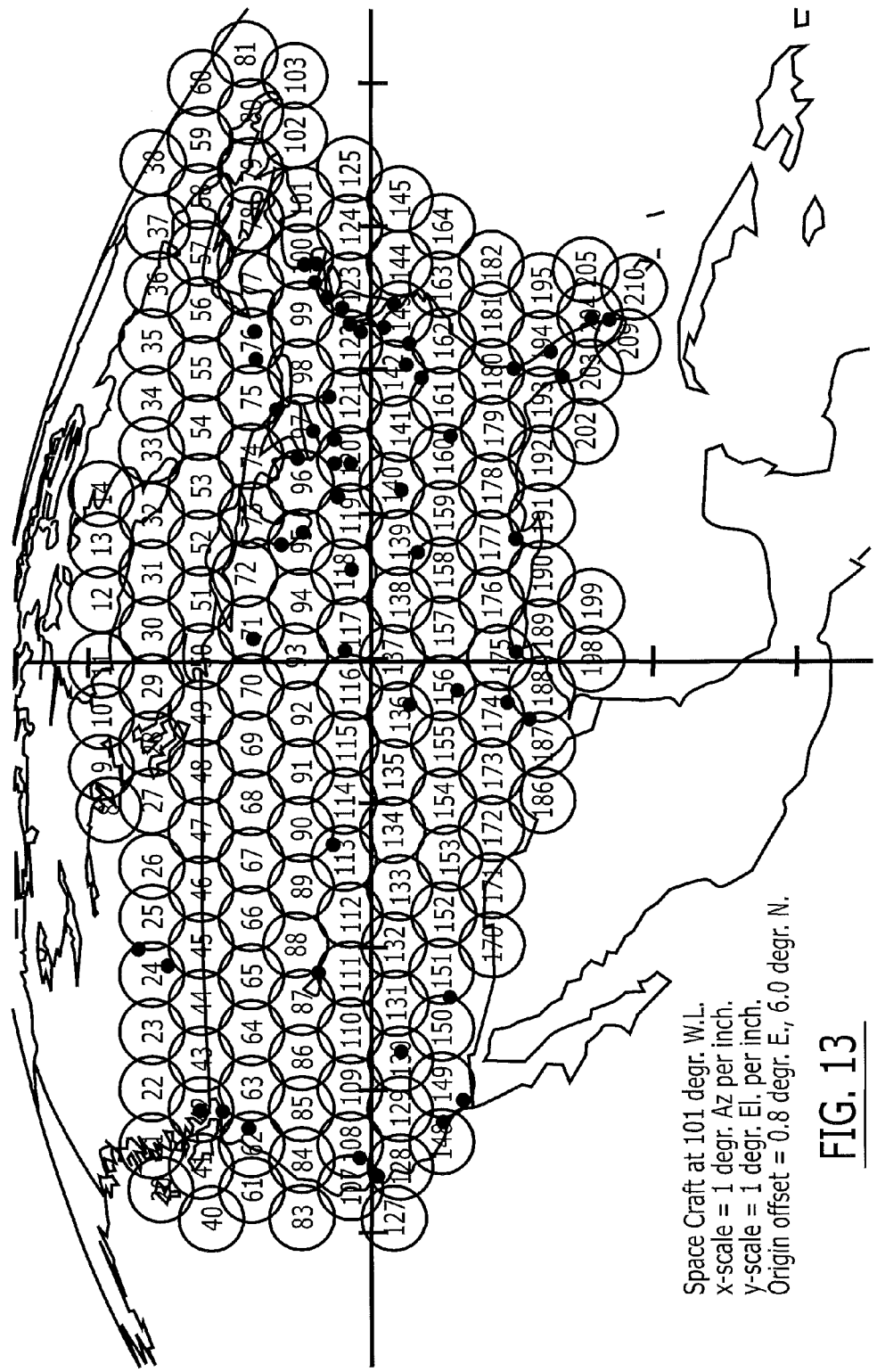
FIG. 13 is a map of the continental United States showing a configuration of forward link satellite spot beams and locations of transmitters of an ancillary terrestrial network.
Figure 14:
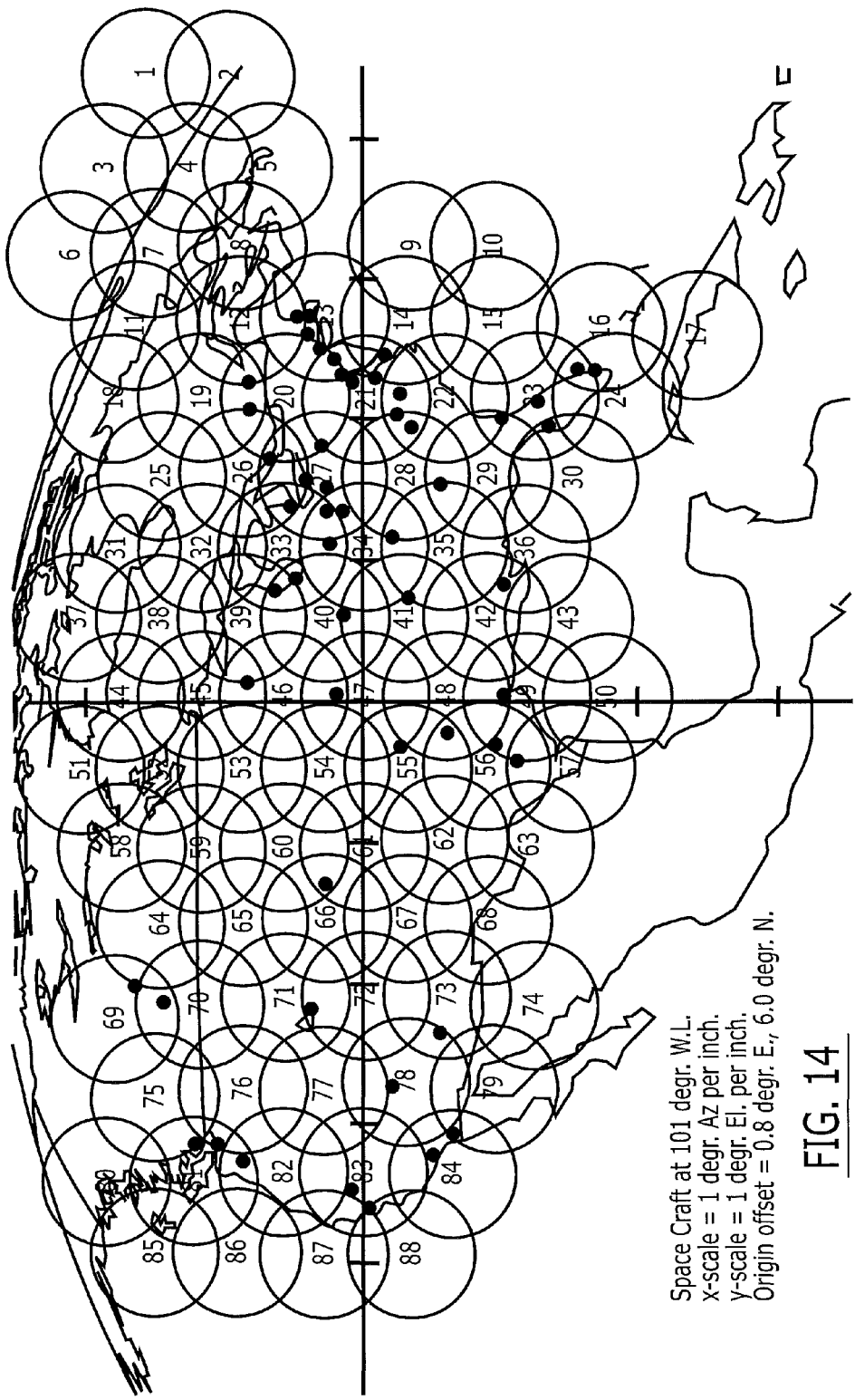
FIG. 14 is a map of the continental United States showing a configuration of return link service areas formed by return link feed elements of a space-based component and locations of transmitters of an ancillary terrestrial network.

In this section, simulation examples showing the performance of an ATC interference canceller for single-user detection and the SAMIC detector for multi-user detection according to some embodiments of the invention are presented. Return link adaptive beam-forming with signal inputs from the satellite antenna feed elements is considered. The simulation uses the feed element gain/phase data provided by a satellite manufacturer and a representative ATC footprint over CONUS. The satellite spot-beams in the forward link are based on fixed beam-forming as provided by the satellite manufacturer. The forward link fixed spot-beams are only used here to illustrate the frequency reuse concept and determine the exclusive zone regions where the co-frequency ATC may be forbidden. FIG. 13 illustrates the forward-link spot-beam contours and the location of ATCs, while FIG. 14 illustrates the return-link feed element contours and the locations of ATCs over CONUS.

4.1 Assumptions and Parameters

The simulation results described herein are based on the cdma2000 1XRTT standard with Radio Configuration 3 & 4 at rate of 78.6 ksps. The 1XRTT cdma2000 operates at a chip rate of 1.2288 Mcps with channel bandwidth of 1.25 MHz. The spreading gain for the traffic channel is equal to 16 (M=16 chips/bit). In particular, for cdma2000, the chip sequence vector for pilot channel and traffic signal channel satisfy $s_k = W_4^{16} \bullet p_k$, where, $W_4^{16} = [+1\ +1\ +1\ +1\ -1\ -1\ -1\ -1\ +1\ +1\ +1\ +1\ -1\ -1\ -1\ -1]^T$ is the 16 chips of Walsh cover, and (●) denotes the element by element product of two same dimension vector or matrix. Other assumptions and parameters include:

1) All ATC interference sources are located at the positions according to the ATC footprint across CONUS.
2) Each ATC source is modeled as an independent point source of Gaussian noise.
3) Each ATC transmits equal power. The total power transmitted by all ATCs is referred to as "total ATC power that is launched toward satellite."
4) A total of 175 fixed spot beams for the forward link cover the continental US, as shown in FIG. 13.
5) The frequency reuse cluster size of 3 is considered. The co-frequency beams are shown in FIG. 13.
6) The co-frequency ATC exclusion zone for a beam is defined as a zone of radius 0.3 (each beam has a radius of 0.2). All ATCs within an exclusion zone are not allowed to reuse the frequencies of the satellite beam that is encircled by the corresponding exclusion zone.
7) The return link adaptive beam-forming uses multiple inputs chosen among 88 feed elements, as shown in FIG. 14.
8) The number of receivers (or inputs) is varied from 7 to 35 by using the feed elements that pick up the most ATCs in each case.
9) The maximum signal-to-noise (Eb/No) for the first receiver is 8.4 dB.
10) All simulations run 200 frames (20 ms/frame) after convergence for each point, which is equivalent to a 4 second length of data.

The traffic channel amplitude $g_s$ and the pilot channel amplitude $g_p$ are set according to cdma2000 standard. In the case where only a traffic channel and a pilot channel are transmitted, $P_{traffic}$ is given as:

$$P_{traffic}(dBm) = P_{pilot}(dBm) + 0.125 \times 30\ dB = P_{pilot}(dBm) + 3.75\ dB \quad (50)$$

With the amplitude of the traffic channel $g_s$ set to 1.0, the amplitude of the pilot channel $g_p$ should be set to 0.65 from equation (50). All involved feed element gains are normalized against the maximum gain of the feed element that picks the most for the desired user.

The ATC interference power is determined by the interference gain $g_n$ and variance $\lambda^2$. Since it is assumed that each ATC has equal power, it is possible to set $g_n=1$, $(n=1, \ldots, N)$. The relationship between $\lambda^2$ and SIR (i.e., the ratio of traffic signal to ATC interference power launched toward the satellite) is given by:

$$SIR = 10\log_{10}\left(\frac{1}{N\lambda^2}\right) \quad (51)$$

The thermal noise variance $\sigma^2$ is determined by $$\frac{E_b}{N_o}.$$

With the processing gain equal to M (M=16), the ratio of $$\frac{E_b}{N_o}$$

is given as:

$$\frac{E_b}{N_o} = 10\log_{10}\left(\frac{M}{\sigma^2}\right) \quad (52)$$

Subject to the above assumptions, simulation results for example cases may be given.

4.2. Single-user Interference Cancellation Detector

In this section, simulation results based on the single-user interference cancellation detector according to some embodiments of the invention are presented. The case where the ATC at each of 50 cities is modeled as a single point-source will be analyzed first. Then, the case where ATCs are modeled as spread point-source clusters will be analyzed. The performance issues will focus on the BER and ΔT/T versus SIR and number of feed elements being used for adaptive beam-forming. In addition to the assumptions and parameters in 4.1, the simulation results are based on K=1, μ=0.0001, and Q=1 (i.e., only using 16 chips integration for pilot symbol). Though using different μ and/or Q may yield slightly better or worse performance, the step-size μ is set to μ=0.0001 unless otherwise noted.

Case A—Point-ATC

Assuming the desired mobile user terminal (MT) is located at the center of the footprint of Feed Element #21 [2.1, 0.05] (i.e., θ=2.1°, φ=0.05°), a total of 16 ATCs are included as co-channel ATCs after exclusion zone elimination. The feed elements that were used as inputs for the interference canceller are as below:

a) 7 Feeds: Feeds #21, 20, 13, 14, 22, 28, 27
b) 17 Feeds: in addition to 7 Feeds in a), Feeds #33, 34, 35, 29, 23, 26, 19, 12, 15, 9
c) 23 Feeds: in addition to 17 Feeds in b), Feeds #46, 47, 82, 84, 70, 78

Figure 15:
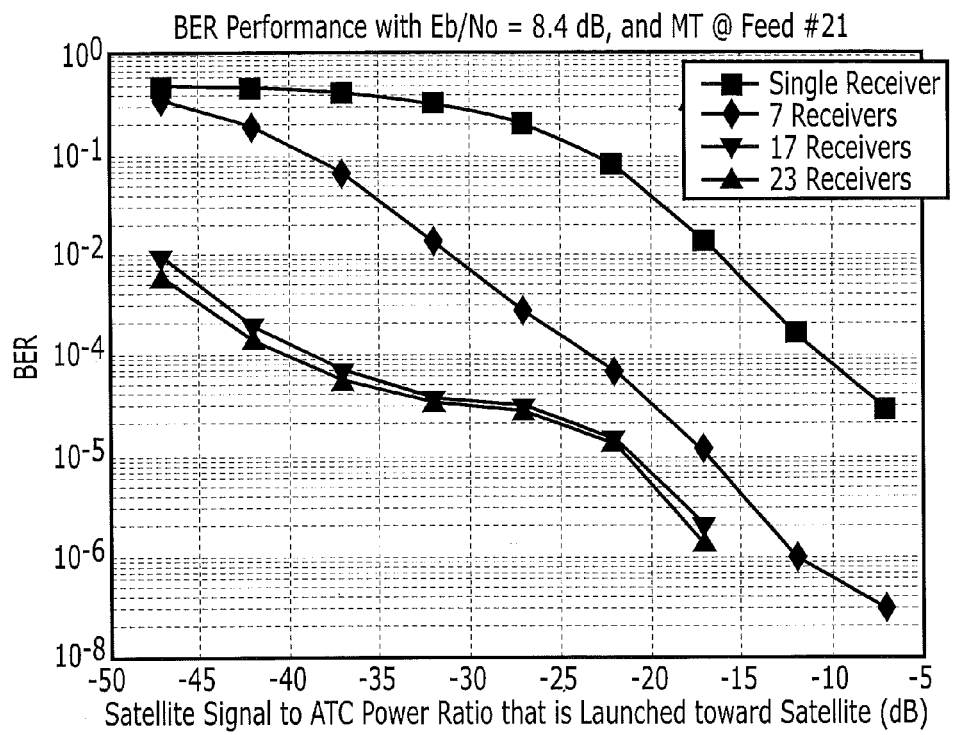
FIGS. 15 and 16 are graphs of bit error rate (BER) versus signal to interference ratio (SIR) for various receiver configurations according to embodiments of the invention.

FIG. 15 shows the impact of the number of receivers (or feed elements) on BER performance. The performance improves as the number of return-link antenna feed elements (receivers) that are utilized increases. However, the case of 23 receivers offers only very slightly (if any) better performance than the case of 17 receivers. This is because 17 receivers provide enough degrees of freedom to mitigate co-channel interference from 16 ATCs. As shown in FIG. 15, no errors are detected when the signal to interference ratio (SIR) is greater than −17 dB for the 17 receiver case, and the interference reducer does well in the region of high interference.

Figure 16:
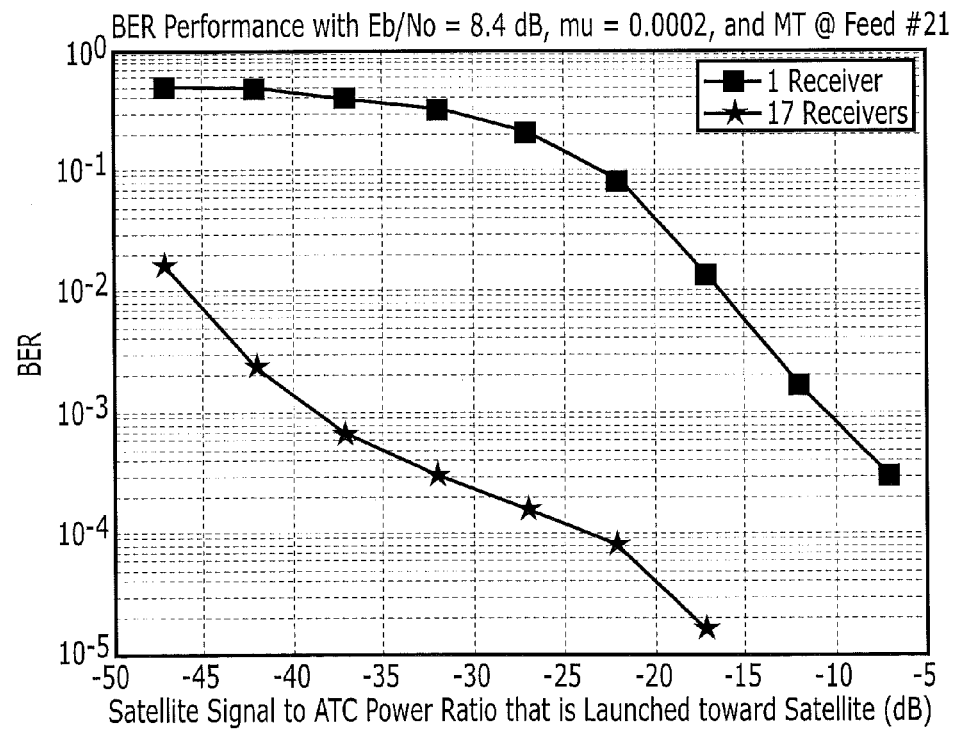
Figure 17:
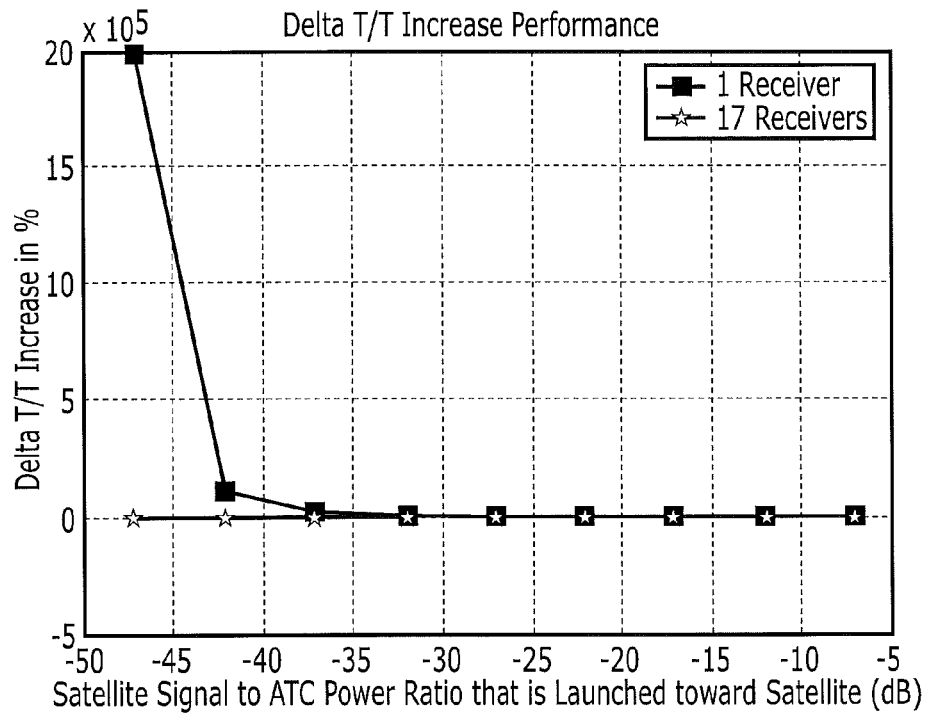
FIG. 17 is a graph of Delta T/T increase versus SIR for various receiver configurations according to embodiments of the invention.

To show the best performance, the BER with 17 receivers is presented in FIG. 16. The step-size μ is set to 0.0002 to improve the performance in the low interference region. The corresponding ΔT/T vs. SIR plot is shown in FIG. 17. Table 1 gives the values of corresponding ΔT/T.

TABLE 1

| | ΔT/T vs. SIR | | | | | | | | |
|---|---|---|---|---|---|---|---|---|---|
| | SIR (dB) | | | | | | | | |
| Rxs | −47 | −42 | −37 | −32 | −27 | −22 | −17 | −12 | −7 |
| 1 | 1.9829e+006 | 1.068e+005 | 19426 | 5902.8 | 1878.2 | 594.65 | 185.35 | 59.727 | 17.437 |
| 17 | 203.94 | 73.211 | 34.186 | 17.25 | 6.8503 | −2.7462 | −19.997 | −80.043 | −80.043 |

It's noteworthy that ΔT/T is negative until SIR becomes less than −22 dB. This appears to be a consequence of desired signal aggregation from the plurality of antenna feed elements that are processed.

Figure 18:
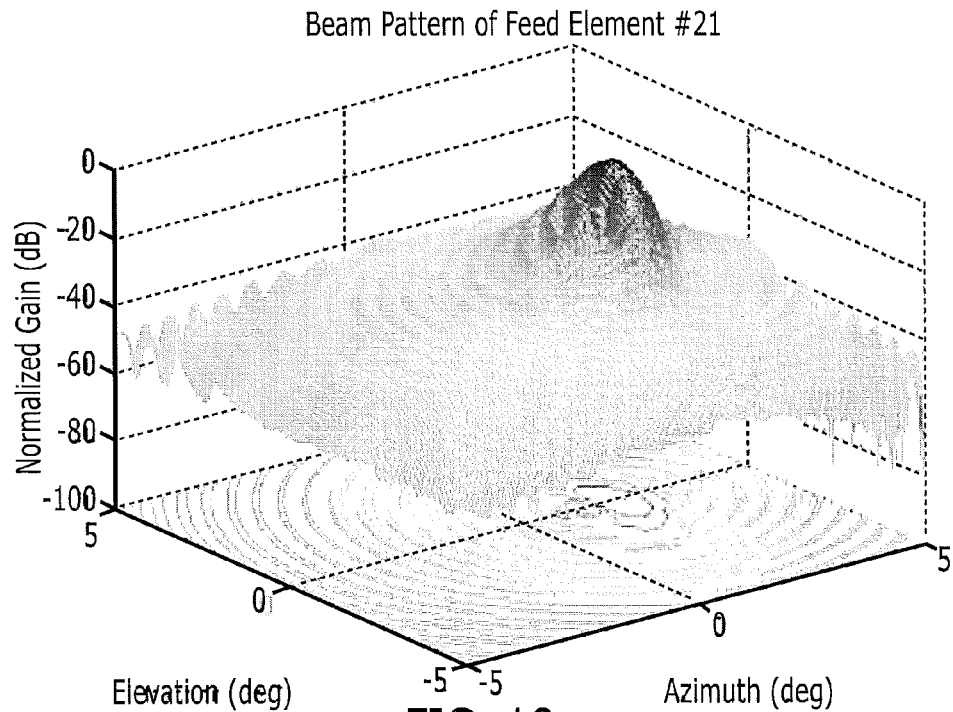
FIG. 18 is a three dimensional graph of gain versus azimuth/elevation for an antenna pattern formed by an antenna feed element of a space-based component.
Figure 19:
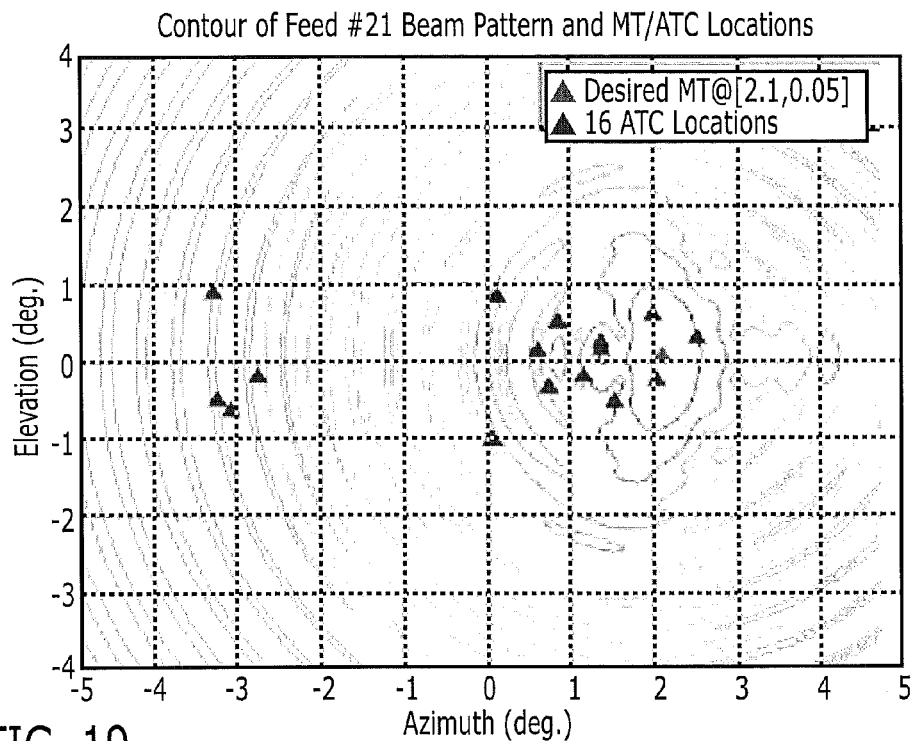
FIG. 19 is a gain contour pattern of the graph of FIG. 18.
Figure 20:
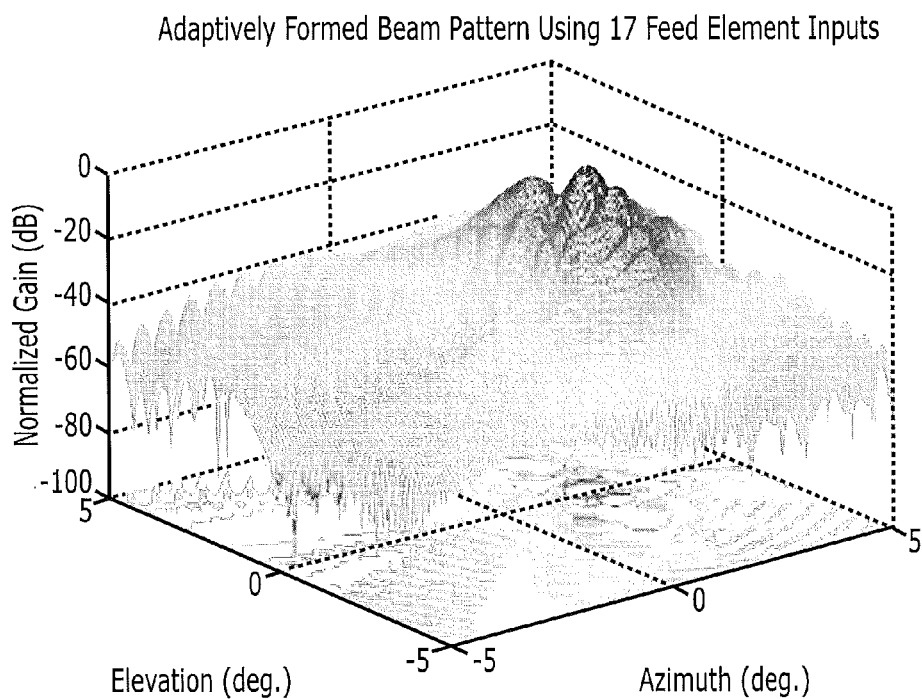
FIG. 20 is a three dimensional graph of gain versus azimuth/elevation for an adaptively-formed antenna pattern using a plurality of antenna feed elements.
Figure 21:
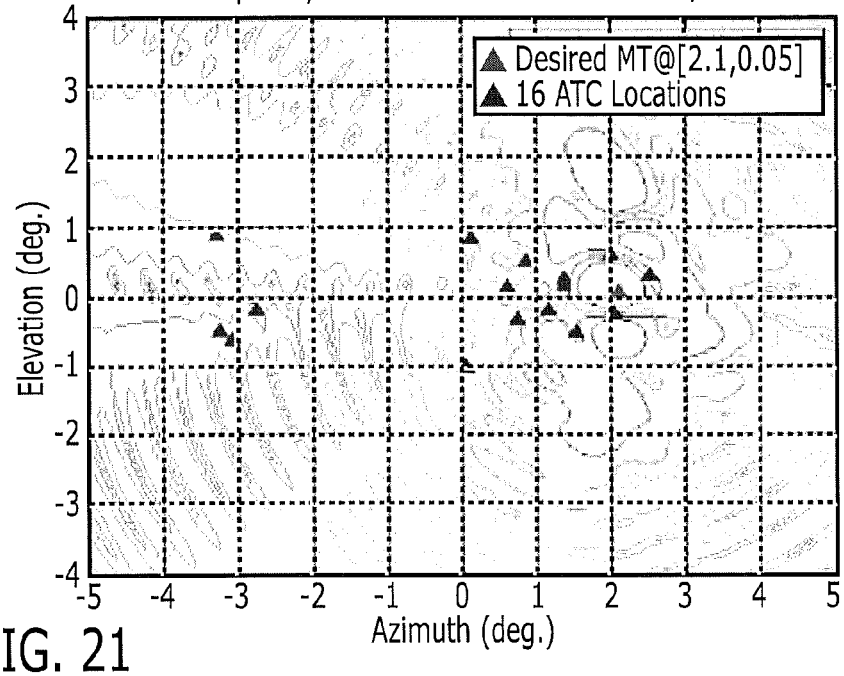
FIG. 21 is a gain contour pattern of the graph of FIG. 20.

Return link adaptive beam-forming is accomplished by generating an optimal beam (i.e., antenna pattern) to null out as many ATC interferes as possible. For the 17 feed elements case, the adaptive beam-former converges to a set of weights as shown in Table 2. One complex weight is generated for each feed element. These weights form a beam that will create a null for each ATC interferer as long as there are sufficient degrees of freedom. FIGS. 18 and 19 show the beam pattern and contour as well as the ATC distribution before beam-forming (i.e., using one feed element—Feed #21). With adaptive beam-forming, the formed-beam pattern and contour is shown in FIGS. 20 and 21 respectively. In the contour plots, each contour ring represents a 10 dB of reduction from the very next inner contour. The effect of interference cancellation is clearly demonstrated by comparing the plots before and after beam-forming. At least one receive antenna feed element of a receive antenna of a space-based component may be configured to provide two signals corresponding to two different polarizations of the antenna feed element. A beam former and/or interference reducer may be configured to take advantage of the two signals to provide polarization diversity processing, as will be recognized by those skilled in the art. The simulation results presented herein do not include polarization diversity processing.

TABLE 2

Beamforming Weights Generated by Interference Canceller

| Feed Element # | Weight ŵ | |
|---|---|---|
| | Real part | Imaginary part |
| 21 | −0.4854 | 0.025192 |
| 20 | 0.062945 | −0.41016 |
| 13 | 0.26479 | 0.11987 |
| 14 | −0.057827 | 0.089882 |
| 22 | 0.56276 | −0.12025 |
| 28 | 0.064258 | −0.17147 |
| 27 | −0.15822 | −0.10951 |
| 33 | 0.025661 | 0.074413 |
| 34 | −0.0038039 | 0.041193 |
| 35 | −0.035036 | −0.072591 |
| 29 | −0.014305 | −0.02951 |
| 23 | −0.22125 | 0.31089 |

TABLE 2-continued

Beamforming Weights Generated by Interference Canceller

| Feed Element # | Weight ŵ | |
|---|---|---|
| | Real part | Imaginary part |
| 26 | 0.21934 | 0.019156 |
| 19 | 0.078774 | 0.35891 |
| 12 | 0.060931 | 0.063156 |
| 15 | −0.021302 | −0.054671 |
| 9 | 0.072839 | −0.17757 |

Case B—Spread ATC

In this case, the performance of the interference canceller is investigated by expanding each point-source ATC of the previous case to a cluster of 9 ATCs. Each cluster of spread ATCs is uniformly distributed over a geographic area of 0.05°× 0.05° (about 25 Miles×25 Miles).

Figure 22:
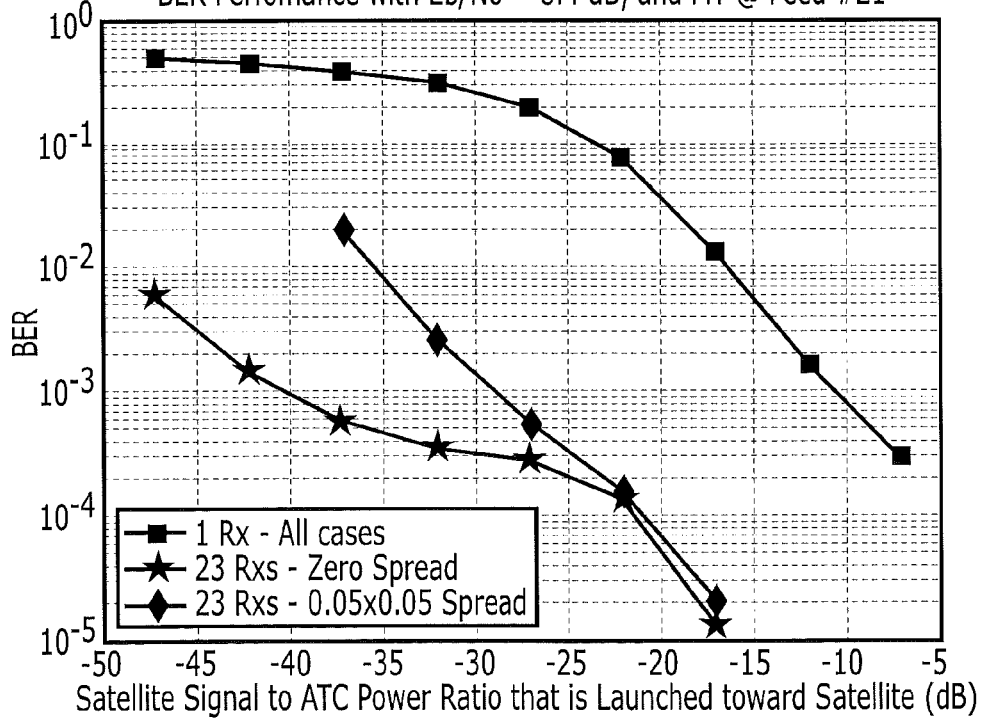
FIGS. 22-24 are graphs of bit error rate (BER) versus signal to interference ratio (SIR) for various receiver configurations according to embodiments of the invention.

The results for the spread ATC case are compared with the results for the point-source ATC case by using 23 feed elements in FIG. 22. It can be seen that the spread ATC does not have much impact on performance when SIR is greater than −22 dB. However, when interference is getting stronger than that, the ATC spread effect becomes evident. The corresponding ΔT/T vs. SIR is given in Table 3.

TABLE 3

ΔT/T vs. SIR

| Rxs | SIR (dB) | | | | | | |
|---|---|---|---|---|---|---|---|
| | −37 | −32 | −27 | −22 | −17 | −12 | −7 |
| 1 | 19426 | 5902.8 | 1878.2 | 594.65 | 185.35 | 59.727 | 17.437 |
| 23 (Point ATC) | 30.557 | 20.319 | 16.035 | 4.5041 | −21.782 | −80.043 | −80.043 |
| 23 (spread ATC) | 224.06 | 77.623 | 29.784 | 5.8623 | −17.988 | −80.043 | −80.043 |

Note that the above results were obtained by using μ=0.0001. The ΔT/T value reaches about 6% when SIR is approximately −22 dB for the spread ATC case. If μ is doubled to 0.0002, the results improve as in the case shown in Table 2.

Case C—Moving MT Location

Here the mobile terminal location is moved from the maximum feed element gain location [2.1, 0.05] in Case A to [2.2, 0.15] in this case. Assuming the MT still transmits the same power, the received $E_b/N_o$ from Feed #21 is reduced by 0.8 dB due to the MT now being off the peak of Feed #21. Hence in this case $E_b/N_o$ is 7.6 dB. The feed elements used for beam-forming remain the same as in Case A.

Figure 23:
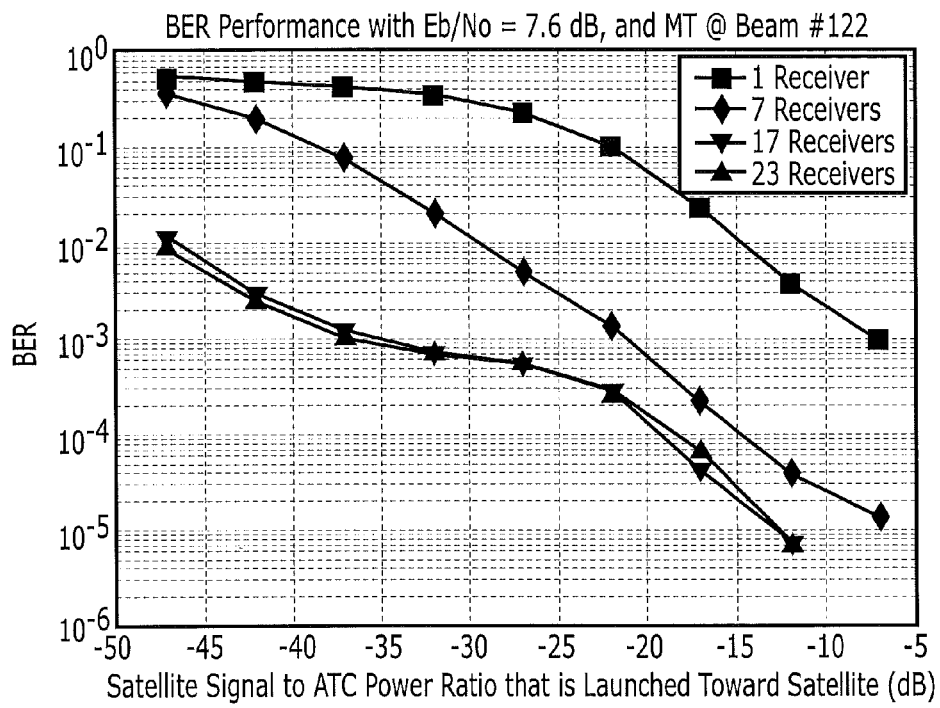
Figure 24:
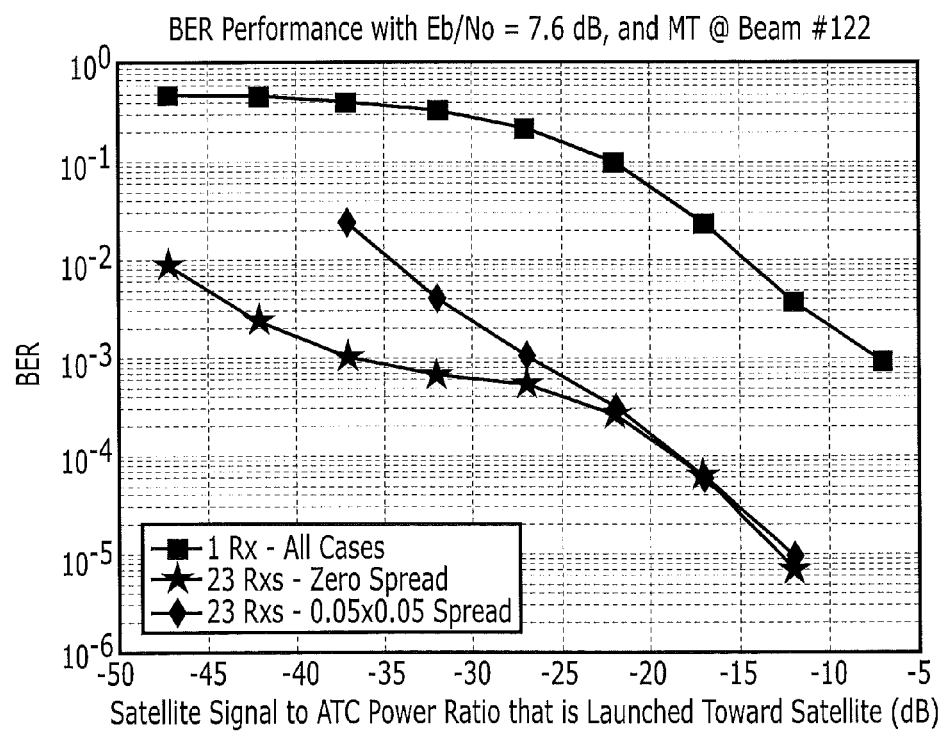

FIG. 23 shows BER performance versus SIR as the number of feed elements varies from 1 to 23. Again when the number of feed elements is greater than 17, the performance very much converges. The spread ATC effect is shown in FIG. 24 for the 23 feed elements case. Table 4 lists the ΔT/T vs. SIR for both point-ATC and spread ATC with 23 feed elements.

TABLE 4

ΔT/T vs. SIR

| Rxs | SIR (dB) | | | | | | |
|---|---|---|---|---|---|---|---|
| | −37 | −32 | −27 | −22 | −17 | −12 | −7 |
| 1 | 19725 | 5939.8 | 1885.5 | 595.58 | 187.15 | 60.028 | 19.196 |
| 23 (Point ATC) | 20.954 | 12.18 | 7.1505 | −4.6035 | −21.398 | −39.007 | −83.4 |
| 23 (spread ATC) | 195.34 | 63.775 | 21.837 | −1.3111 | −22.366 | −36.728 | −83.4 |

4.3 SAMIC Multi-User Detector

In this section, simulation results for the use of a SAMIC multi-user detector in a multi-user environment under ATC interference are presented. It is assumed that the co-beam multiple users are randomly uniform-distributed inside Beam #122. The ATC interference footprint and satellite feed elements remain the same as in the previous single user case. In addition to considering the cdma2000 reverse traffic channel with spreading gain of 16 at data rate of 78.6 kbps with the assumptions and parameters of section 4.1, simulation results are also included for spreading gains of 32 and 64 (M=32 chips/bit and 64 chips/bit) at data rates of 38.4 kbps and 19.2 kbps, respectively. For the case of spreading gain of 32, it is assumed that the chip sequence vector for pilot channel and traffic signal channel satisfy $S_k=W_8^{32} \bullet p_k$, where $W_8^{32}$ is the 32 chips of Walsh cover, and ($\bullet$) denotes the element by element product of two same dimension vector or matrix. Similarly, for the case of spreading gain of 64, the chip sequence vector for pilot channel and traffic signal channel satisfy $S_k=W_{16}^{64} \bullet p_k$, where $W_{16}^{64}$ denotes the 64 chips of Walsh cover. All K users inside Beam #122 are assumed to have equal EIRP. It is further assumed that each user has the same $$\frac{E_b}{N_o} = 8.4 \text{ dB}.$$

Figure 25:
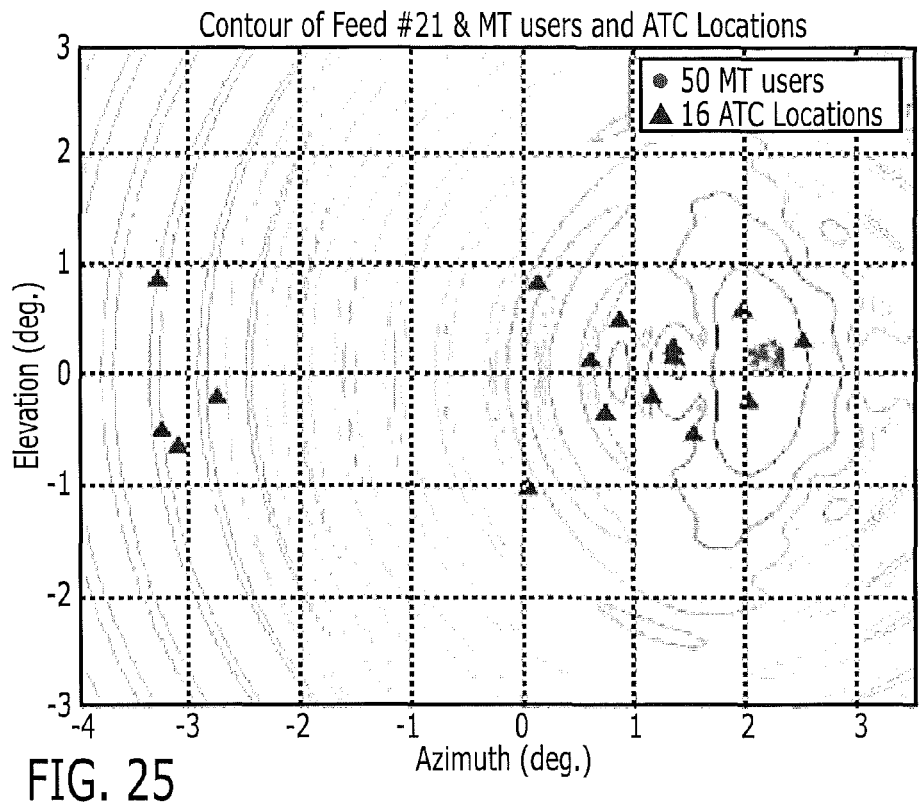
FIG. 25 is a gain contour pattern of an antenna feed element.

FIG. 25 shows the uniformly distributed random locations of 50 users inside beam #122 (overlapping with Feed #21) along with ATC footprint and Feed #21 gain pattern contour. A total of 16 co-frequency ATCs are included after exclusion zone elimination. The feed elements that were used as inputs for the interference canceller are as below:

a) For the one receiver, i.e., L=1 case: Feeds #21.
b) For the 17 receivers, i.e., L=17 case: Feeds: #21, 20, 13, 14, 22, 28, 27, 33, 34, 35, 29, 23, 26, 19, 12, 15, and 9.

Case A—Spreading Gain M=16 (cdma2000 RC 3 & 4)

Figure 26:
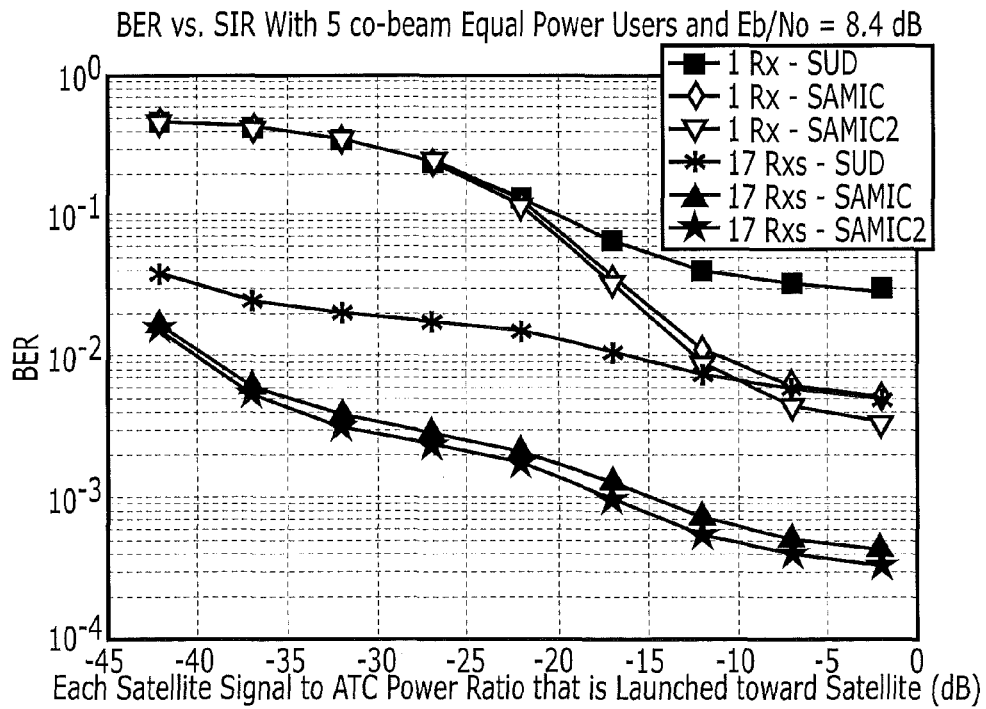
FIGS. 26-33 are graphs of BER under various simulation conditions according to embodiments of the invention.

This is the case defined by cdma2000 Radio Configuration 3 & 4 for the data rate of 78.6 kbps. A situation of 5 co-beam MT users (K=5) that have the same EIRP is addressed initially. FIG. 26 shows an average of BERs for all five users versus SIR that is defined as satellite signal to ATC power ratio that is launched toward a satellite. In FIG. 26 the simulation results from the single user detector (SUD) and SAMIC and SAMIC2 detectors with one receiver and 17 receivers are given. The SAMIC2 detector is a two-stage SAMIC detector where the second stage SAMIC uses the bit estimate from the first stage SAMIC as its bit estimate input. Unlike the SAMIC detector whose bit estimate input is from the output decision of the ATC interference canceller, the second stage SAMIC uses the bit estimates from the first stage SAMIC to further improve the multi-user detection performance. In the one receiver case, the SAMIC detector only shows advantage over SUD when the ATC interference decreases to certain level. However, in the case of 17 receivers, the benefit of the SAMIC is significant compared with the SUD detector.

Figure 27:
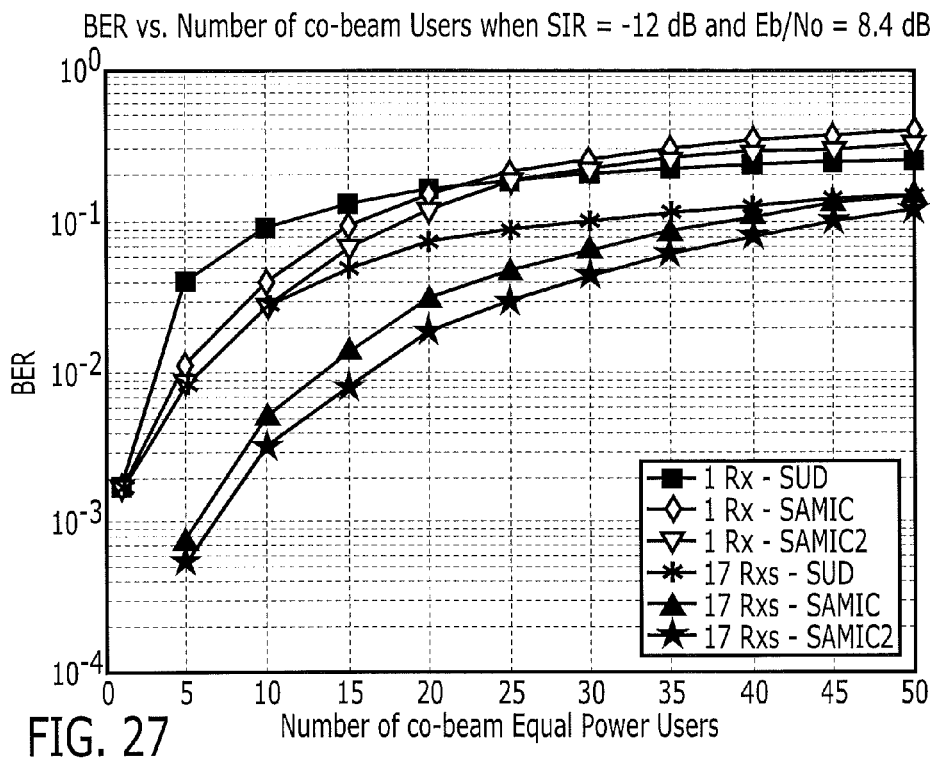

The performance of SAMIC2 detector is slightly improved over the SAMIC detector. To optimize the performance in this scenario, we set μ=0.0002, and Q=1 (i.e., using 16 chips integration for pilot symbol) for the LMS algorithm, and Q=96 (i.e., using 1536 chips, or 1 PCG integration for channel estimation) for the SAMIC detector. FIG. 27 gives the average of BERs versus the number of active users when SIR=−12 dB. For the one receiver case (without ATC interference cancellation), the SAMIC and SAMIC2 detectors would be worse than SUD when K is greater that 25 this is because the combination of ATC and MAI interference would make the SAMIC detector produce more errors when there is no ATC interference cancellation. With ATC interference cancellation (i.e., the 17 receivers case), the SAMIC detector demonstrates superior performance over SUD. The best performing SAMIC2 detector exceeds 1% BER when K is greater than 20. To improve the capacity, it may be desirable to increase the spreading gain.

Case B—Spreading Gain M=32

Figure 28:
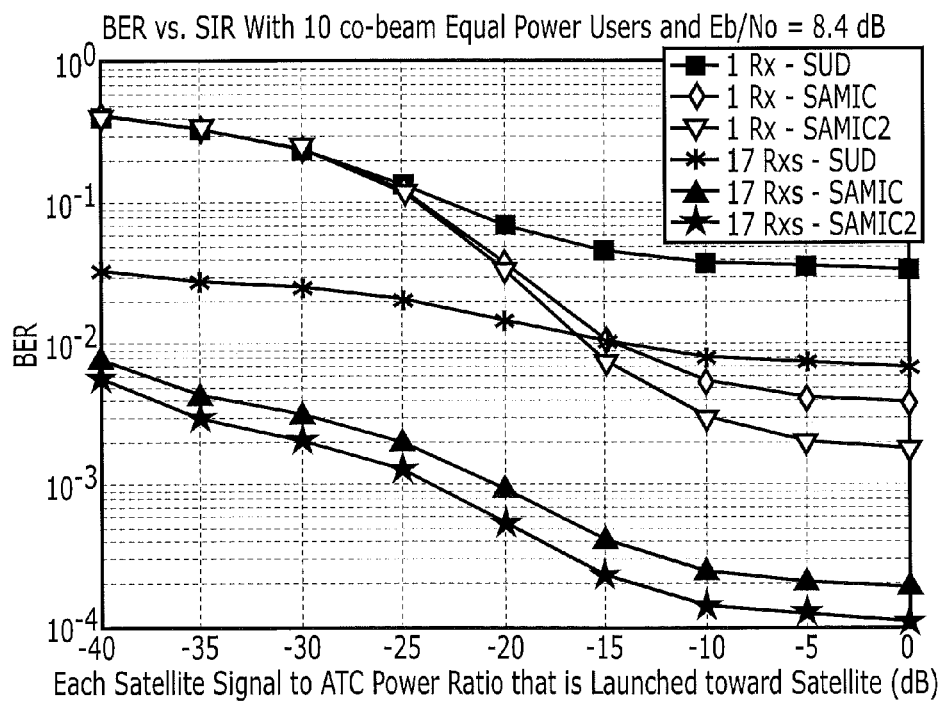
Figure 29:
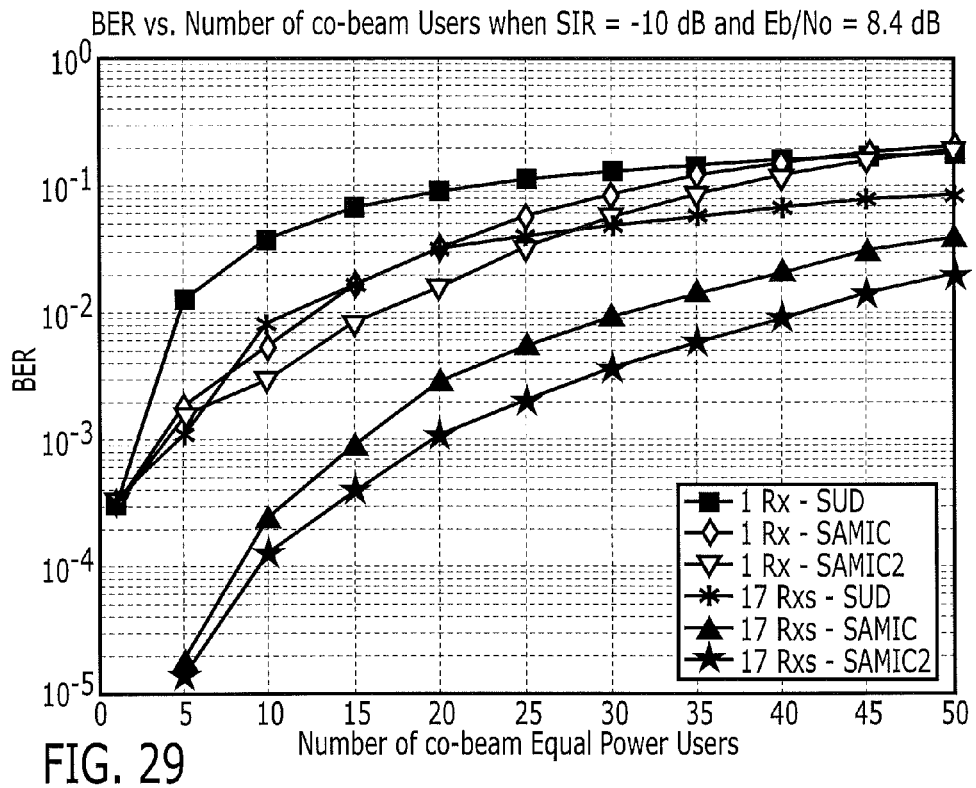
Figure 30:
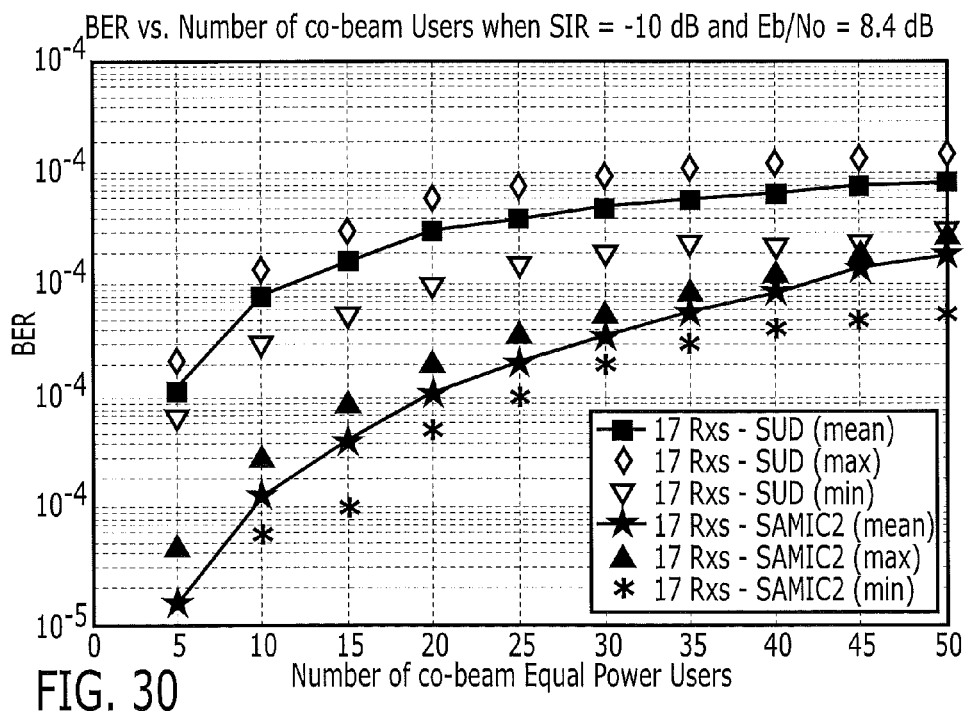

In this case, the spreading gain is increased to 32, which effectively leads to the traffic data rate of 38.4 kbps. The same simulation assumptions and parameters as in Case A are used, except that the chip integration length for LMS is optimized to 32 chips and the chip integration length for channel estimation is optimized to 3072 chips (2 PCGs) with proportion to the spreading gain because $$\frac{E_b}{N_o}$$

is fixed to 8.4 dB for each user. Considering the first 10 active co-beam equal power users from the 50 user profile, the average of BERs for the 10 users versus SIR is shown in FIG. 28. It appears that the SAMIC and SAMIC2 detectors provide better performance than SUD across the SIR range for the 17 receivers case. The average of BERs for the SAMIC2 detector ranges from $10^{-4}$ for SIR=0 dB to $6 \times 10^{-3}$ for SIR=−40 dB. FIG. 29 shows the average of BERs versus the number of active co-beam users when SIR=−10 dB. Comparing with the M=16 case, it is clear that increasing the spreading gain makes the SAMIC/SAMIC2 detector more effective in both one receiver and 17 receivers. The average BERs for the SAMIC2 detector is still under 1% when K=40. To look into the BER performance among all active users, the BER spread of the SAMIC2 detector is provided with the maximum and minimum on top of the averaged BER for L=17 case in FIG. 30. The significant performance improvement provided by SAMIC2 over SUD is demonstrated.

Case C—Spreading Gain M=64

Figure 31:
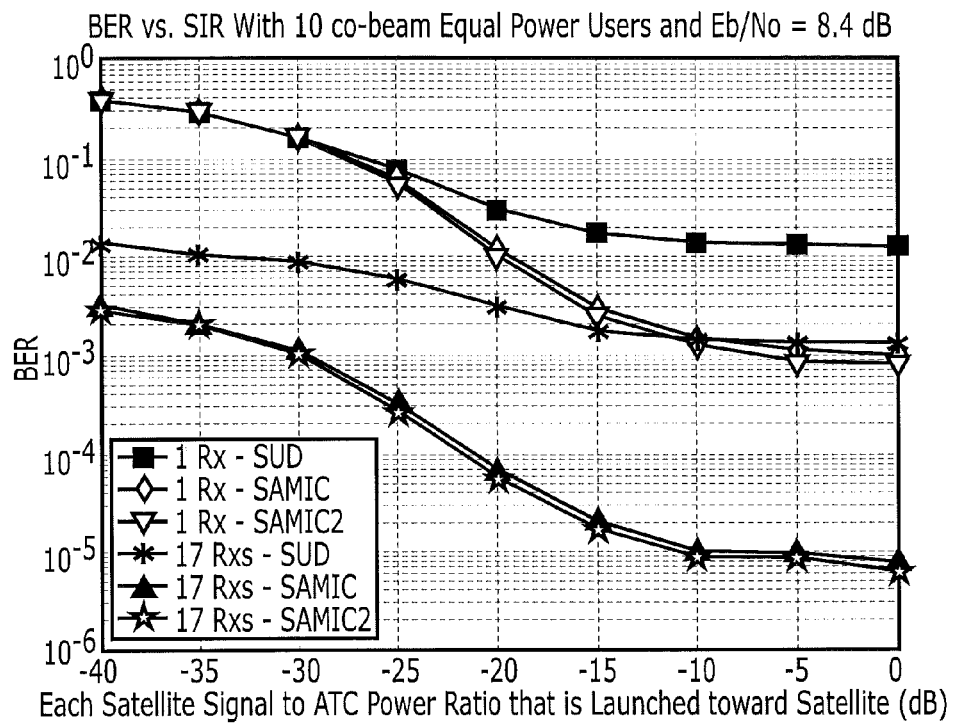
Figure 32:
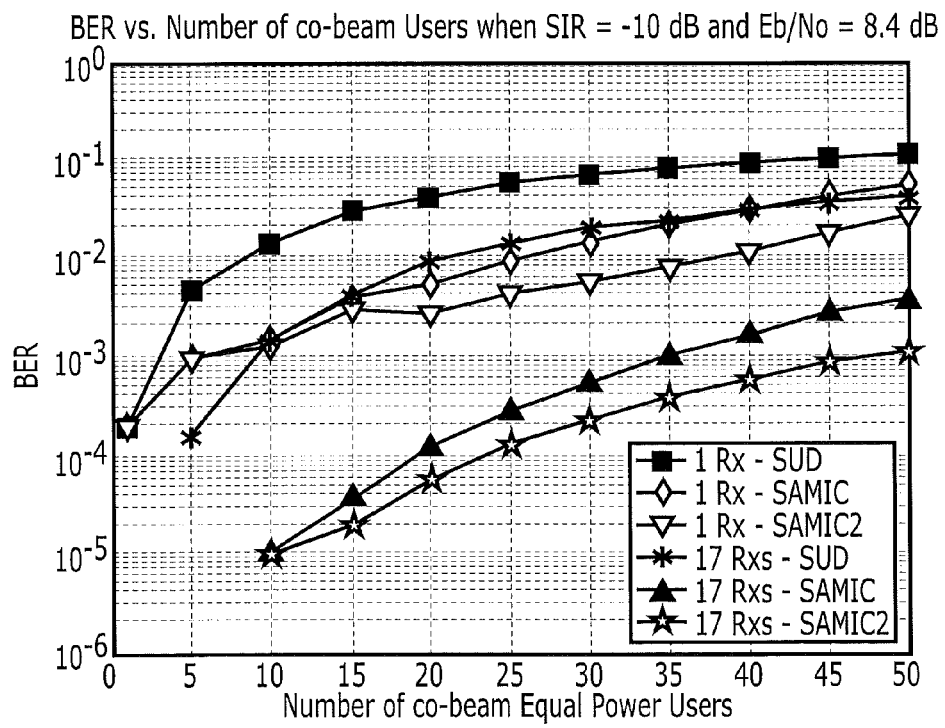

To further evaluate performance versus spreading gain, the spreading gain may be increased to 64 while still having a reasonable 19.2 kbps of traffic data rate. Again the simulation assumptions and parameters are the same as in Case B. To optimize the performance, the chip integration length for LMS can be increased to 64 chips and chip integration length for channel estimation to 6144 chips (4 PCGs, which appears only slightly better than 2 PCGs). FIG. 31 shows the average of BERs for the first 10 users from the 50 users profile versus SIR. The SAMIC and SAMIC2 detectors outperform the SUD detector significantly. Since only 10 users are considered, the benefit of the SAMIC2 detector over the SAMIC detector does not appear for the high processing case. However, the advantage of the SAMIC2 over the SAMIC detector can be more evident as the number of users increases. Both the SAMIC and SAMIC2 detectors perform better than SUD even with only one receiver because of high processing gain. The average BER versus number of users K is given for SIR=−10 dB in FIG. 32.

Figure 33:
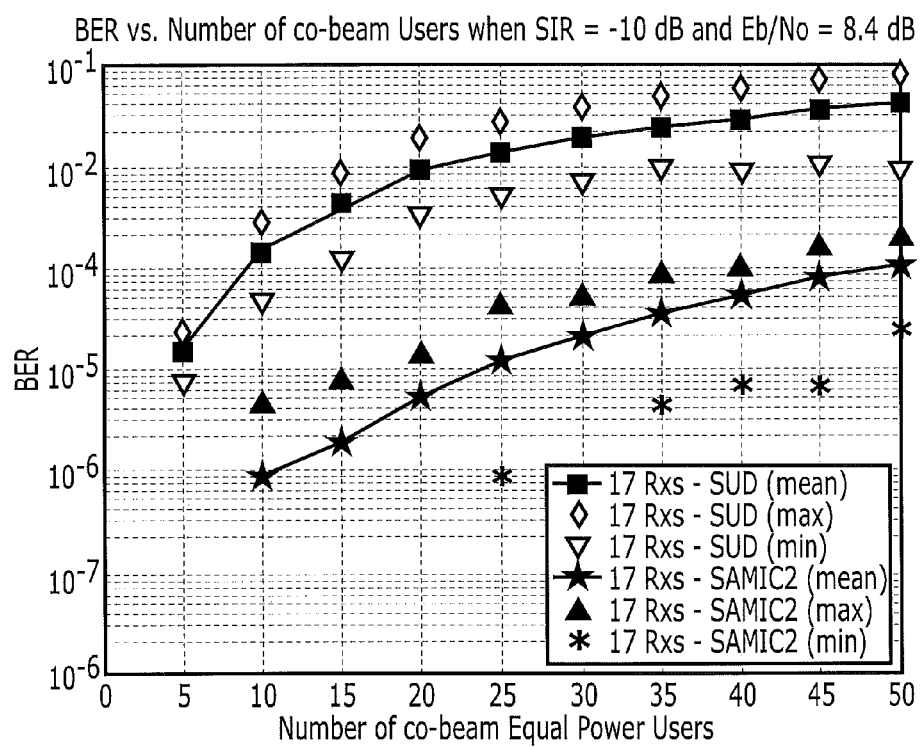

It can be seen that the more active users the more the apparent advantage of SAMIC2 over SAMIC for the number of users range that was considered. The SAMIC2 detector can keep average BER bellow $10^{-3}$ as the number of users approaches 50. FIG. 33 gives average BER along with the maximum and minimum of BERs among all involved users for the L=17 case. Again the SAMIC2 detector outperforms the SUD significantly across the range. In the best scenario, the SAMIC detector provides $6.5 \times 10^{-5}$ BER for K=45 and $2.3 \times 10^{-4}$ BER for K=50.

Return link adaptive beamforming has been analyzed in conjunction with multi-user detection for satellite based CDMA system. A set of equations has been presented to illustrate an algorithm to cancel both ATC interference and MAI interference under intra-beam multi-user environment. Several simulation examples have shown the performance of the ATC interference canceller for single-user and the SAMIC detector for multi-user with a set of satellite feed element inputs and the ATC footprint over CONUS.

The LMS interference algorithm is based on the use of a desired user's pilot signal to minimize the impact of spatial ATC interferers. It has been shown that the LMS algorithm can effectively mitigate ATC interference for both point-source ATC and spread ATCs. The interference canceller may use about 17 feed element inputs and proper step-size and integration length for LMS. Using more than 17 feed elements may only provide slight improvement and very much converges for performance. However, the spatially operated LMS does not appear to be able to cancel the multiple access interference. The SAMIC detector has been presented to provide sequential ATC interference cancellation and MAI cancellation. In the intra-beam multi-user situation, the SAMIC detector takes advantage of known ATC cancelled bit estimates and spreading code sequence/timing as well as channel estimates to efficiently enable ATC interference cancellation and MAI mitigation sequentially. In conjunction with the LMS algorithm, the SAMIC detector can significantly boost system capacity compared with the SUD detector, depending on spreading gain. By using a second stage SAMIC, the SAMIC2 detector can improve the performance even further. The channel estimation is obtained by using pilot matching filter on beam-formed chip level signal and integration over an interval of time. The integration length for channel estimation appears to be a number of PCGs in proportion with spreading gain when $E_b/N_o$ is fixed. For the M=16 case, the SAMIC2 detector may tolerate about 15 users for SIR=−12 dB. By doubling the spreading gain to 32, the SAMIC2 detector can increase capacity to 40 users for SIR=−10 dB. Finally for the case of a spreading gain of 64 with SIR=−10 dB, the SAMIC2 detector has the average BER of $10^{-3}$ for 50 users.

It will be understood that any air interface protocol may be used by a space-based component to provide space-based communications. Similarly, it will be understood that any air interface protocol may be used by an ancillary terrestrial network to provide terrestrial communications while using/reusing terrestrially at least some of the frequencies authorized for use by the space-based component. In some embodiments, the air interface protocol for the space-based component may be GSM-based while the air interface protocol for the ancillary terrestrial network may be CDMA-based.

In the drawings and/or the specification, there have been disclosed embodiments of the invention and, although specific terms are employed, they are used in a generic and descriptive sense only and not for purposes of limitation, the scope of the invention being set forth in the following claims.

What is claimed is:

1. A communications method comprising:
receiving at a transceiver of a given terminal over a frequency band a plurality of signals including multiple access interference that is dependent on transmissions of a plurality of terminals other than the given terminal, the plurality of terminals communicating with the transceiver over a geographic area, and receiving at the transceiver co-channel interference that is independent of the transmissions of the plurality of terminals other than the given terminal; and
reducing interference of the plurality of signals sequentially by first reducing the co-channel interference that is independent of the transmissions of the plurality of terminals other than the given terminal to generate a plurality of interference reduced signals, and then reducing the multiple access interference in the plurality of interference reduced signals that is dependent on the transmissions of the plurality of terminals other than the given terminal, after the first reducing the co-channel interference;
wherein reducing the multiple access interference that is dependent on the transmissions of the plurality of terminals other than the given terminal after the first reducing the co-channel interference comprises generating a set of channel estimates based on the co-channel interference reduced signals, generating a set of bit estimates from the co-channel interference reduced signals, and performing multiple access interference reduction on the co-channel interference reduced signals using the set of channel estimates and the bit estimates.

2. The method of claim 1 wherein the interference that is independent of the transmissions of the plurality of terminals other than the given terminal communicating with the transceiver over the geographic area comprises interference that is dependent on transmissions by an ancillary terrestrial network and/or by one or more terminals communicating with the ancillary terrestrial network, and wherein the ancillary terrestrial network and/or the one or more terminals communicating therewith use at least some frequencies of the transceiver.

3. The method of claim 1, wherein receiving at the transceiver comprises receiving using a plurality of antenna feed elements.

4. The method of claim 3, wherein reducing interference of the plurality of signals sequentially comprises processing pilot signals and determining weights for the plurality of antenna feed elements based on the processing of the pilot signals.

5. The method of claim 4, further comprising generating at least one pilot signal error based on the processing.

6. The method of claim 5, wherein the weights for the antenna feed elements are selected to reduce a mean squared measure of the at least one pilot signal error.

7. The method of claim 4, further comprising applying the weights to signals received by the antenna feed elements to obtain the interference reduced signals.

8. The method of claim 1, wherein performing interference reduction on the interference reduced signals using the channel estimates and the bit estimates comprises generating second interference reduced signals, and wherein the method further comprises determining a set of second channel estimates based on the second interference reduced signals, generating a set of second bit estimates from the second interference reduced signals, and performing interference reduction on the second interference reduced signals using the second channel estimates and the second bit estimates.

9. The method of claim 1, wherein receiving at the transceiver comprises receiving at the transceiver using at least two antenna patterns that differ in at least a polarization orientation.

10. The method of claim 1, wherein generating a set of bit estimates from the interference reduced signals comprises correlating an interference reduced signal with a spreading code.

11. The method of claim 1, further comprising transmitting at least some of the plurality of signals to at least one satellite gateway, wherein reducing interference of the plurality of signals is performed at the at least one satellite gateway.

12. The method of claim 11, wherein the at least one satellite gateway is terrestrially based.

13. The method of claim 1, wherein reducing interference of the plurality of signals is performed at least partially at the transceiver and at least partially at a satellite gateway that is terrestrially based.

14. A system comprising:
a transceiver;
a plurality of terminals that are configured to transmit a plurality of multiple access signals over a frequency band in a footprint of the transceiver;
the transceiver being configured to receive the plurality of multiple access signals over the frequency band, the transceiver also receiving interference along with the plurality of multiple access signals in the frequency band, the interference comprising a multiple access component that is dependent on the plurality of multiple access signals and a co-channel component that is independent of the plurality of multiple access signals; and
an interference reducing element that is responsive to the transceiver, and that is configured to sequentially perform interference reduction of the co-channel interference that is independent of the plurality of multiple access signals to generate a plurality of interference reduced signals and then to perform multiple access interference reduction on the plurality of interference reduced signals to reduce the multiple access interference that is dependent on the plurality of multiple access signals after performing the interference reduction of the co-channel interference,
wherein the interference reducing element is configured to generate a set of channel estimates based on the co-channel interference reduced signals, generate a set of bit estimates from the co-channel interference reduced signals, and perform multiple access interference reduction on the co-channel interference reduced signals using the set of channel estimates and the bit estimates.

15. The system of claim 14, further comprising:
an ancillary terrestrial network including a plurality of transmitters configured to transmit a plurality of waveforms over at least some of the frequency band, and wherein the interference that is independent of the plurality of multiple access signals comprises a component that is dependent on the plurality of waveforms.

16. The system of claim 14, wherein the transceiver includes an antenna having a plurality of antenna feed elements, and the transceiver is configured to receive the plurality of multiple access signals using the antenna having the plurality of antenna feed elements.

17. The system of claim 16, wherein the interference reducing element is further configured to perform interference reduction on a plurality of multiple access signals by processing pilot signals transmitted by a plurality of terminals and determining a set of weights for the antenna feed elements based on the processing of the pilot signals.

18. The system of claim 17, wherein the processing generates at least one pilot signal error.

19. The system of claim 18, wherein the interference reducing element is further configured to select a set of weights for the antenna feed elements to reduce a mean squared measure of the at least one pilot signal error.

20. The system of claim 19, wherein the interference reducing element is further configured to apply the set of weights to signals received by the plurality of antenna feed elements to obtain the interference reduced signals.

21. The system of claim 14, wherein the interference reducing element is further configured to determine a set of second channel estimates based on the second interference reduced signals, to generate a set of second bit estimates from the second interference reduced signals, and to perform interference reduction on the second interference reduced signals using the set of second channel estimates and the set of second bit estimates.

22. The system of claim 14, wherein the transceiver receives the plurality of multiple access signals using at least two antenna patterns that differ in at least a polarization orientation.

23. The system of claim 20, wherein the interference reducing element is further configured to generate a plurality of interference reduced bit estimates from the interference reduced signals, and to perform interference reduction using the plurality of interference reduced bit estimates.

24. The system of claim 14, wherein the transceiver is further configured to re-transmit the multiple access signals to a satellite gateway, and wherein the interference reducing element is located at the satellite gateway.

25. The system of claim 24, wherein the satellite gateway is terrestrially-based.

* * * * *

UNITED STATES PATENT AND TRADEMARK OFFICE
CERTIFICATE OF CORRECTION

| | | |
|---|---|---|
| PATENT NO. | : 8,744,360 B2 | Page 1 of 1 |
| APPLICATION NO. | : 12/689590 | |
| DATED | : June 3, 2014 | |
| INVENTOR(S) | : Zheng et al. | |

It is certified that error appears in the above-identified patent and that said Letters Patent is hereby corrected as shown below:

In the Claims:
Column 45, Claim 12, Line 32: correct "is terrestrially based,"
to read -- is terrestrially based. --

Signed and Sealed this
Sixteenth Day of December, 2014

Michelle K. Lee
*Deputy Director of the United States Patent and Trademark Office*